US012802619B2

(12) United States Patent
Her et al.

(10) Patent No.: US 12,802,619 B2
(45) Date of Patent: Nov. 17, 2026

(54) ELECTRONIC DEVICE, AND OPERATION METHOD THEREFOR

(71) Applicant: Samsung Electronics Co., Ltd., Suwon-si (KR)

(72) Inventors: Yongkoo Her, Suwon-si (KR); Kiwoo Kim, Suwon-si (KR); Seoungyong Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/938,918

(22) Filed: Nov. 6, 2024

(65) Prior Publication Data

US 2025/0061847 A1 Feb. 20, 2025

Related U.S. Application Data

(63) Continuation of application No. PCT/KR2023/005767, filed on Apr. 27, 2023.

(30) Foreign Application Priority Data

May 11, 2022 (KR) ........................ 10-2022-0057838
Jun. 3, 2022 (KR) ........................ 10-2022-0068259

(51) Int. Cl.

| | |
|---|---|
| ***G09G 3/32*** | (2016.01) |
| ***G09G 3/20*** | (2006.01) |
| ***G09G 3/3233*** | (2016.01) |

(52) U.S. Cl.

CPC ............. *G09G 3/32* (2013.01); *G09G 3/2014* (2013.01); *G09G 3/3233* (2013.01);
(Continued)

(58) Field of Classification Search

CPC ...... G09G 3/2014; G09G 3/2081; G09G 3/32; G09G 3/3233–3258; G09G 2300/0819;
(Continued)

(56) References Cited

U.S. PATENT DOCUMENTS

| | | | |
|---|---|---|---|
| 10,706,766 | B2 | 7/2020 | Kim et al. |
| 10,720,098 | B2 | 7/2020 | Valentine |

(Continued)

FOREIGN PATENT DOCUMENTS

| | | | |
|---|---|---|---|
| CN | 114341968 | A | 4/2022 |
| EP | 4 156 159 | A1 | 3/2023 |

(Continued)

OTHER PUBLICATIONS

International Search Report dated Jul. 26, 2023, issued in International Application No. PCT/KR2023/005767.

(Continued)

*Primary Examiner* — Amr A Awad
*Assistant Examiner* — Aaron Midkiff
(74) *Attorney, Agent, or Firm* — Jefferson IP Law, LLP

(57) ABSTRACT

An electronic device is provided. The electronic device includes a display including a plurality of pixels including a light-emitting element and a pixel drive circuit for the light emission of the light-emitting element, a display driver integrated circuit (DDI) for driving the display, memory storing one or more computer programs, and one or more processors communicatively coupled to the memory and the DDI wherein each of the plurality of pixels includes a first pixel drive circuit block for generating a pulse width modulation (PWM) signal configured to control the drive timing of the light-emitting device, and a second pixel drive circuit block configured to adjust the intensity of current supplied to the light-emitting element, wherein the first pixel drive circuit block includes a plurality of transistors and a first capacitor, and wherein the second pixel drive circuit block includes a plurality of transistors and a second capacitor.

11 Claims, 73 Drawing Sheets

(52) U.S. Cl.
CPC ............... *G09G 2300/0819* (2013.01); *G09G 2300/0852* (2013.01); *G09G 2300/0861* (2013.01); *G09G 2310/08* (2013.01); *G09G 2320/0242* (2013.01)

(58) Field of Classification Search
CPC ... G09G 2300/0842; G09G 2300/0852; G09G 2300/0861; G09G 2310/0251; G09G 2310/08; G09G 2320/0242; G09G 2300/0408; G09G 2310/0278; G09G 3/3283; G09G 3/3291; G09G 2300/08–0895; G09G 2320/043; G09G 2320/045; H05B 45/325; H05B 45/32–335
See application file for complete search history.

(56) References Cited

U.S. PATENT DOCUMENTS

| | | | |
|---|---|---|---|
| 10,964,254 | B2 | 3/2021 | Hung et al. |
| 11,120,733 | B2 | 9/2021 | Hashimoto |
| 11,423,867 | B2 | 8/2022 | Lim |
| 2015/0042692 | A1 | 2/2015 | Kim et al. |
| 2018/0182279 | A1 | 6/2018 | Sakariya et al. |
| 2020/0265777 | A1 | 8/2020 | Shigeta et al. |
| 2020/0394953 | A1 | 12/2020 | Kim et al. |
| 2021/0193785 | A1 | 6/2021 | Kim et al. |
| 2021/0210002 | A1 | 7/2021 | Kim et al. |
| 2021/0312855 | A1 | 10/2021 | Jeong et al. |
| 2021/0343244 | A1 | 11/2021 | Toyomura et al. |
| 2022/0139294 | A1 | 5/2022 | Kwon et al. |
| 2022/0301500 | A1 | 9/2022 | Shigeta et al. |
| 2022/0366850 | A1 | 11/2022 | Ji et al. |
| 2023/0237958 | A1 | 7/2023 | Kim et al. |

FOREIGN PATENT DOCUMENTS

| | | | |
|---|---|---|---|
| JP | 2014-066920 | A | 4/2014 |
| KR | 10-2072795 | B1 | 2/2020 |
| KR | 10-2020-0038735 | A | 4/2020 |
| KR | 10-2021-0081571 | A | 7/2021 |
| KR | 10-2021-0108742 | A | 9/2021 |
| KR | 10-2022-0045511 | A | 4/2022 |
| KR | 10-2022-0058362 | A | 5/2022 |
| KR | 10-2583109 | B1 | 9/2023 |
| WO | 2021/137663 | A1 | 7/2021 |
| WO | 2022/000315 | A1 | 1/2022 |

OTHER PUBLICATIONS

Extended European Search Report dated May 22, 2025, issued in a European Patent Application No. 23803733.7.

<BLOCK LIGHT EMISSION PATH>

<INITIALIZE GATE NODES OF DRIVING TFTS (T3 AND T6)>

<TURN ON LIGHT EMISSION PATH AND INPUT SWEEP SIGNAL>

<DRIVE DUTY (BLOCK LIGHT EMISSION PATH)>

<DRIVE DUTY (INITIALIZE GATE NODE OF DRIVING TFT (T6))>

<DRIVE DUTY (COMPENSATE FOR VTH OF DRIVING TFT)>

<DRIVE DUTY (LIGHT EMISSION)>

FIG. 23

| Vref | −3 | −2 | −1 | 0 |
|---|---|---|---|---|
| T.C. | 7.4uA | 6.2uA | 3.4uA | 1.3uA |

| Vref | 1 | 2 | 3 | 4 |
|---|---|---|---|---|
| T.C. | 307.7nA | 34.3nA | 1.1nA | 0 |

−IDENTIFY OPERATION OF NORMALLY CONTROLLING LUMINANCE

FIG. 26

| Vref | Vdata | T.C. |
|---|---|---|
| −2V | 2~8V | 6.3uA |

−IDENTIFY OPERATION OF NORMALLY CONTROLLING GRAYSCALE

FIG. 29

FIX VDATA (4 V) AND FIX VREF (−2 V)

TARGET CURRENT DIFFERENCE WHEN T3 VTH IS ±0.6V

| 11T2C | T3 | | | | | | |
|---|---|---|---|---|---|---|---|
| VTH DEVIATION | −0.6 | −0.4 | −0.2 | 0 | 0.2 | 0.4 | 0.6 |
| I_Avg | 2.733 | 2.73 | 2.73 | 2.725 | 2.725 | 2.723 | 2.722 |
| del(%) | 0.29 | 0.18 | 0.18 | | 0.00 | −0.07 | −0.11 |

− MAXIMUM OF 0.3% DIFFERENCE

FIG. 31

| 9T2C | T3 | | | | | | |
|---|---|---|---|---|---|---|---|
| VTH DEVIATION | -0.6 | -0.4 | -0.2 | 0 | 0.2 | 0.4 | 0.6 |
| I_Avg | 1.221 | 1.192 | 1.163 | 1.132 | 1.104 | 1.077 | 1.047 |
| del(%) | 7.86 | 5.30 | 2.74 | | -2.54 | -5.11 | -8.12 |

- MAXIMUM OF 8.1% DIFFERENCE

- IDENTIFY TR3 VTH COMPENSATION

FIG. 33

FIX VDATA (4 V) AND FIX VREF (−2 V)

− TARGET CURRENT DIFFERENCE WHEN T6 VTH IS ±0.6V

| 11T2C | T6 | | | | | | |
|---|---|---|---|---|---|---|---|
| VTH DEVIATION | −0.6 | −0.4 | −0.2 | 0 | 0.2 | 0.4 | 0.6 |
| I_Avg | 2.398 | 2.582 | 3.681 | 2.725 | 2.754 | 2.768 | 2.79 |
| del(%) | −12.00 | −5.25 | −1.61 | | 1.05 | 1.55 | 2.33 |

− MAXIMUM OF 12% DIFFERENCE

FIG. 35

| 9T2C | T6 | | | | | | |
|---|---|---|---|---|---|---|---|
| VTH DEVIATION | -0.6 | -0.4 | -0.2 | 0 | 0.2 | 0.4 | 0.6 |
| I_Avg | 0.417 | 0.601 | 0.841 | 1.134 | 1.481 | 1.886 | 2.346 |
| del(%) | -63.16 | -46.91 | -25.71 | | 23.57 | 39.98 | 51.75 |

- MAXIMUM OF 63% DIFFERENCE

- IDENTIFY TR6 VTH COMPENSATION

<BLOCK LIGHT EMISSION PATH>

<DRIVE DUTY (COMPENSATE FOR VTH OF DRIVING TFT (T6))>

FIG. 60

FIX VDATA (4 V), CONTROL VREF, CONTROL TARGET CURRENT

| Vref | 5 | 7 | 9 | 11 |
|---|---|---|---|---|
| T.C. | 1.75uA | 0.91uA | 0.49uA | 0 |

-IDENTIFY OPERATION OF NORMALLY CONTROLLING LUMINANCE

FIG. 63

FIX VREF (-2 V) AND ADJUST VDATA TO CONTROL GRAYSCALE

| Vref | Vdata | T.C. |
|---|---|---|
| 7V | -7~5V | 1.75uA |

-IDENTIFY OPERATION OF NORMALLY CONTROLLING GRAYSCALE

FIG. 66

FIX VDATA (−6 V) AND FIX VREF (−4.5 V)

− TARGET CURRENT DIFFERENCE WHEN T3 VTH IS ±0.6 V

| 13T3C | T3 | | | | | | |
|---|---|---|---|---|---|---|---|
| VTH DEVIATION | −0.6 | −0.4 | −0.2 | 0 | 0.2 | 0.4 | 0.6 |
| I_Avg | 0.357 | 0.355 | 0.354 | 0.353 | 0.351 | 0.350 | 0.348 |
| del(%) | 1.13 | 0.57 | 0.28 | | −0.57 | −0.86 | −1.44 |

− MAXIMUM OF 1.44% DIFFERENCE

FIG. 68

| 9T2C | T3 | | | | | | |
|---|---|---|---|---|---|---|---|
| VTH DEVIATION | -0.6 | -0.4 | -0.2 | 0 | 0.2 | 0.4 | 0.6 |
| I_Avg | 0.287 | 0.28 | 0.272 | 0.265 | 0.257 | 0.246 | 0.224 |
| del(%) | 8.30 | 5.66 | 2.64 | | -3.11 | -7.72 | -18.30 |

- MAXIMUM OF 18.3% DIFFERENCE

- IDENTIFY TR3 VTH COMPENSATION

FIG. 70

FIX VDATA (4 V) AND FIX VREF (−2 V)

− TARGET CURRENT DIFFERENCE WHEN T6 VTH IS ± 1V

| 13T3C | T6 | | | | | | |
|---|---|---|---|---|---|---|---|
| VTH DEVIATION | −0.6 | −0.4 | −0.2 | 0 | 0.2 | 0.4 | 0.6 |
| I_Avg | 0.327 | 0.335 | 0.344 | 0.353 | 0.362 | 0.371 | 0.381 |
| del(%) | −7.37 | −5.10 | −2.55 | | 2.49 | 4.85 | 7.35 |

− MAXIMUM OF 7.37% DIFFERENCE

FIG. 72

| 9T2C | T6 | | | | | | |
|---|---|---|---|---|---|---|---|
| VTH DEVIATION | -0.6 | -0.4 | -0.2 | 0 | 0.2 | 0.4 | 0.6 |
| I_Avg | 0.054 | 0.101 | 0.174 | 0.281 | 0.43 | 0.627 | 0.879 |
| del(%) | -80.78 | -64.06 | -38.08 | | 34.65 | 55.18 | 68.03 |

- MAXIMUM OF 80.78% DIFFERENCE

- IDENTIFY TR6 VTH COMPENSATION

ELECTRONIC DEVICE, AND OPERATION METHOD THEREFOR

CROSS-REFERENCE TO RELATED APPLICATION(S)

This application is a continuation application, claiming priority under § 365(c), of an International application No. PCT/KR2023/005767, filed on Apr. 27, 2023, which is based on and claims the benefit of a Korean patent application number 10-2022-0057838, filed on May 11, 2022, in the Korean Intellectual Property Office, and of a Korean patent application number 10-2022-0068259, filed on Jun. 3, 2022, in the Korean Intellectual Property Office, the disclosure of each of which is incorporated by reference herein in its entirety.

BACKGROUND

1. Field

The disclosure relates to an electronic device capable of improving a display quality of a display, and a method of operating the same.

2. Description of Related Art

A display may include an organic light emitting diode (OLED). The display including the OLED may implement the grayscale expression of OLEDs arranged in pixels through a pulse amplitude modulation (PAM) scheme. When the grayscale of OLEDs is expressed in the PAM scheme, a driving circuit that controls the luminance level of the display according to a grayscale data voltage.

The above information is presented as background information only to assist with an understanding of the disclosure. No determination has been made, and no assertion is made, as to whether any of the above might be applicable as prior art with regard to the disclosure.

SUMMARY

In the case of a display to which a micro LED or OLED is applied, a wavelength shift phenomenon occurs according to the luminance (luminance is proportional to an amount of current flowing in a device), which causes an image quality characteristic of varying a color according to a grayscale.

Aspects of the disclosure are to address at least the above-mentioned problems and/or disadvantages and to provide at least the advantages described below. Accordingly, an aspect of the disclosure is to provide an electronic device capable of improving an image quality characteristic of a display and a method of operating the same. A pulse width modulation (PWM) signal generation circuit is included in a driving circuit for driving the micro LED (or OLED) arranged in pixels of the display to control the luminance of the micro LED (or OLED) through a PWM scheme, thereby preventing a color from being changed according to the grayscale during driving.

Additional aspects will be set forth in part in the description which follows and, in part, will be apparent from the description, or may be learned by practice of the presented embodiments.

In accordance with an aspect of the disclosure, an electronic device is provided. The electronic device includes a display including a plurality of pixels including light-emitting diodes and pixel driving circuits for light emission of the light-emitting diodes, a display driver integrated circuit (DDI) configured to drive the display, memory storing one or more computer programs, and one or more processors communicatively coupled to the memory and the DDI, wherein each of the plurality of pixels includes a first pixel driving circuit block configured to generate a pulse width modulation (PWM) signal for controlling drive timing of the light-emitting diodes and a second pixel driving circuit block configured to control the intensity of a current supplied to the light-emitting diodes, wherein the first pixel driving circuit block includes a plurality of transistors and a first capacitor, and wherein the second pixel driving circuit block includes a plurality of transistors and a second capacitor.

An electronic device and a method of operating the same according to various embodiments of the disclosure improve an image quality characteristic of a display by preventing a color from being changed according to a grayscale during driving of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 23 is a diagram illustrating comparison between the operation result of pixels of the electronic device in the disclosure and the operation result of pixels in a comparative example according to an embodiment of the disclosure;

FIG. 26 is a diagram illustrating that the grayscale of the micro LED (or OLED) is normally controlled when the pixels of the electronic device operate according to an embodiment of the disclosure;

FIG. 29 is a diagram illustrating a Vth characteristic compensation value of a driving transistor (for example, a third transistor (T3)) when the pixels of the electronic device operate according to an embodiment of the disclosure;

FIG. 31 is a diagram illustrating a Vth characteristic compensation value of the driving transistor when the pixels of the comparative example operate according to an embodiment of the disclosure;

FIG. 33 is a diagram illustrating a Vth characteristic compensation value of a driving transistor (for example, a sixth transistor (T6)) when the pixels of the electronic device operate according to an embodiment of the disclosure;

FIG. 35 is a diagram illustrating a Vth characteristic compensation value of the driving transistor when the pixels in the comparative example operate according to an embodiment of the disclosure;

FIG. 60 is a diagram illustrating comparison between the operation result of pixels of the electronic device and the operation result of pixels in a comparative example according to an embodiment of the disclosure;

FIG. 63 is a diagram illustrating that the grayscale of the micro LED (or OLED) is normally controlled when the pixels of the electronic device of the disclosure operate according to an embodiment of the disclosure;

FIG. 66 is a diagram illustrating a Vth characteristic compensation value of the driving transistor (for example, the third transistor (T3)) during the operation of pixels of the electronic device according to an embodiment of the disclosure;

FIG. 68 is a diagram illustrating a Vth characteristic compensation value of the driving transistor when the pixels in the comparative example operate according to an embodiment of the disclosure;

FIG. 70 is a diagram illustrating a Vth characteristic compensation value of a driving transistor (for example, a sixth transistor (T6)) when the pixels of the electronic device operate according to an embodiment of the disclosure;

FIG. 72 is a diagram illustrating a Vth characteristic compensation value of the driving transistor when the pixels in the comparative example operate according to an embodiment of the disclosure.

The same reference numerals are used to represent the same elements throughout the drawings.

DETAILED DESCRIPTION

The following description with reference to the accompanying drawings is provided to assist in comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that singular forms “a,” “an,” and “the” include plural referents unless the context clearly dictates otherwise. Thus, for example, reference to “a component surface” includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
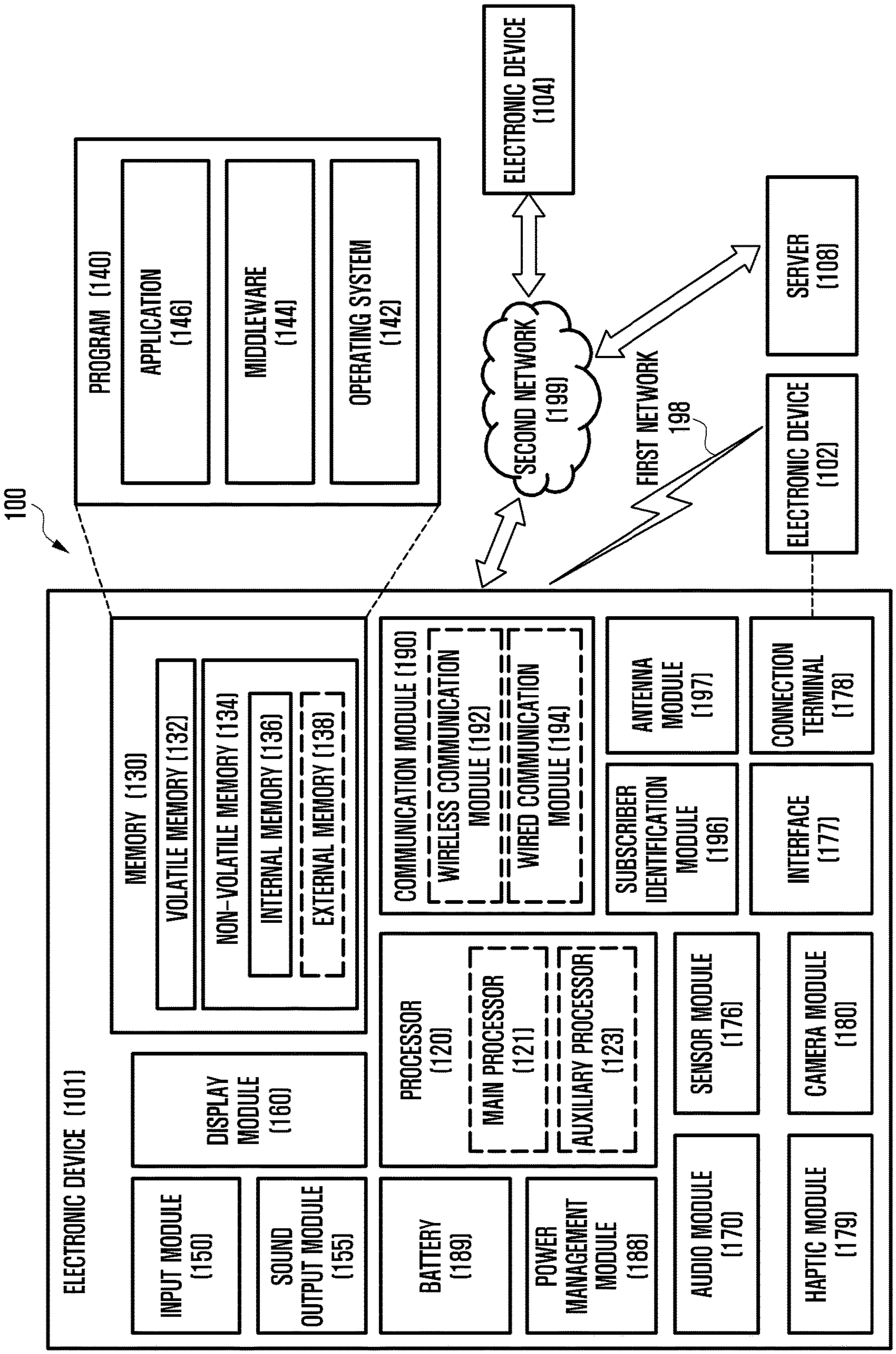
FIG. 1 is a block diagram illustrating an electronic device with a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, the display module 160 may include a flexible display configured to be folded or unfolded.

According to an embodiment, the display module 160 may include a flexible display arranged to be slidable and configured to provide a screen (for example, a display screen).

According to an embodiment, the display module 160 may be referred to as a variable display (for example, a stretchable display), an expandable display, or a slide-out display.

According to an embodiment, the display module 160 may include a bar-type or a plate-type display.

Figure 2:
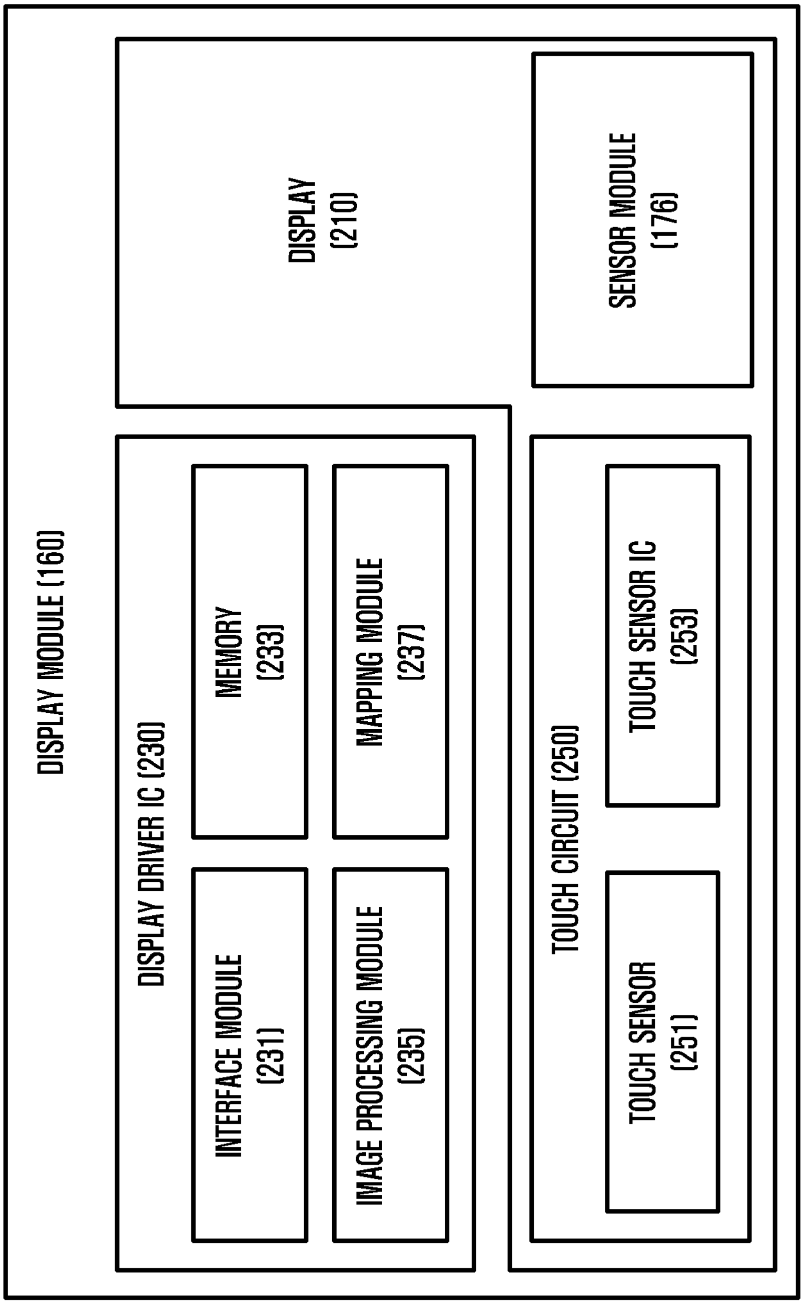
FIG. 2 is a block diagram illustrating a display module according to an embodiment of the disclosure.

FIG. 2 is a block diagram 200 of the display module 160 according to an embodiment of the disclosure.

Referring to FIG. 2, the display module 160 may include a display 210 and a display driver IC (DDI) 230 for controlling the same.

According to an embodiment, the DDI 230 may include an interface module 231, memory 233 (for example, a buffer memory), an image processing module 235, or a mapping module 237.

As an embodiment, the DDI 230 may receive image data or image information including an image control signal corresponding to a command for controlling the image data from another element of the electronic device (for example, the electronic device 101 of FIG. 1) through the interface module 231.

According to an embodiment, the image information may be received from a processor (for example, the processor 120 of FIG. 1) (for example, the main processor 121 of FIG. 1) (for example, an application processor) or an auxiliary processor (for example, the auxiliary processor 123 of FIG. 1) (for example, a graphics processing device) operating independently from the function of the main processor 121.

According to an embodiment, the DDI 230 may communicate with a touch circuit 250 or the sensor module 176 through the interface module 231. Further, the DDI 230 may store at least some of the received image information in the memory 233. As an example, the DDI 230 may store at least some of the received image information in the memory 233 in units of frames.

According to an embodiment, the image processing module 235 may preprocess or postprocess at least some of the image data (for example, control a resolution, a brightness, or a size), based on at least characteristics of the image data or characteristics of the display 210.

According to an embodiment, the mapping module 237 may generate a voltage value or a current value corresponding to the image data preprocessed or postprocessed through the image processing module 135. As an embodiment, the generation of the voltage value or the current value may be performed based on, for example, at least some of the attributes of pixels of the display 210 (for example, arrangement of the pixels (red, green, and blue (RGB) stripe, pentile structure), or size of each of subpixels).

According to an embodiment, at least some pixels of the display 210 are driven based on at least a part of, for example, the voltage value or the current value, and thus visual information (for example, text, images, or icons) corresponding to the image data may be displayed through the display 210.

According to an embodiment, the display module 160 may further include a touch circuit 250. The touch circuit 250 may include a touch sensor 251 and a touch sensor IC 253 for controlling the touch sensor 251.

As an embodiment, the touch sensor IC 253 may control the touch sensor 251 for detecting a touch input or a hovering input for a specific location of the display 210. For example, the touch sensor IC 253 may detect the touch input or the hovering input by measuring a change in a signal (for example, voltage, an amount of light, resistance, or an amount of charge) for the specific location of the display 210. The touch sensor IC 253 may provide the processor (for example, the processor 120 of FIG. 1) with information on the detected touch input or hovering input (for example, location, area, pressure, or time).

According to an embodiment, at least some of the touch circuit 250 (for example, the touch sensor IC 253) may be included as a part of the display driver IC 230 or the display 210.

According to an embodiment, at least a part of the touch screen 250 (for example, the touch sensor IC 253) may be included as a part of another element (for example, the auxiliary processor 123) arranged outside the display module 160.

According to an embodiment, the display module 160 may further include at least one sensor (for example, a fingerprint sensor, an iris sensor, a pressure sensor, or an illumination sensor) of the sensor module 176 or a control circuit therefor. In this case, the at least one sensor or the control circuit therefor may be embedded into a part of the display module 160 (for example, the display 210 or the DDI 230) or a part of the touch circuit 250. For example, when the sensor module 176 embedded into the display module 160 includes a biometric sensor (for example, a fingerprint sensor), the biometric sensor may acquire biometric information (for example, a fingerprint image) associated with a touch input through some areas of the display 210. In another example, when the sensor module 176 embedded into the display module 160 includes a pressure sensor, the pressure sensor may acquire pressure information associated with a touch input through some areas or all areas of the display 210. According to an embodiment, the touch sensor 251 or the sensor module 176 may be arranged between pixels of a pixel layer of the display 210 or above or below the pixel layer.

Figure 3:
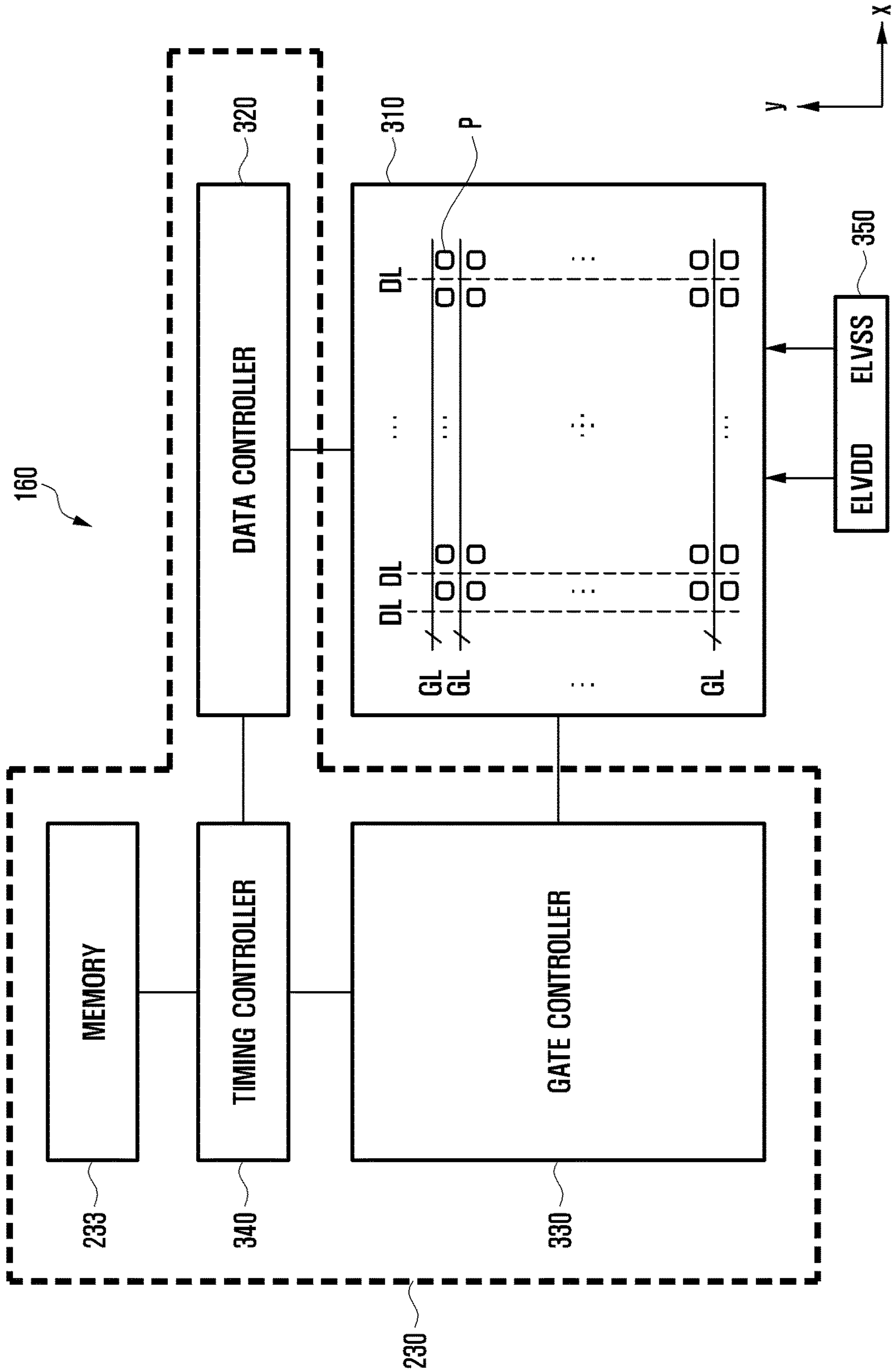
FIG. 3 is a block diagram illustrating the display module according to an embodiment of the disclosure.

FIG. 3 is a block diagram of the display module 160 according to an embodiment of the disclosure.

The display module 160 illustrated in FIG. 3 may include an embodiment that is at least partially similar to or different from the display module 160 illustrated in FIG. 1 and/or FIG. 2. Hereinafter, features of the display module 160 that was not described or becomes different are mainly described with reference to FIG. 3.

Referring to FIG. 3, the display module 160 according to an embodiment may include a display panel 310, a data controller 320, a gate controller 330, a timing controller 340, and/or the memory 233 (for example, the memory 233 of FIG. 2).

According to an embodiment, the DDI (for example, the DDI 230 of FIG. 2) may include the data controller 320, the gate controller 330, the timing controller 340, a power supply device 350, and/or the memory 233 (for example, the memory 130 of FIG. 1 or the memory 233 of FIG. 2).

According to various embodiments, at least some of the data controller 320, the gate controller 330, the timing controller 340, and/or the memory 233 (for example, the memory 233 of FIG. 2) may be included in the DDI 230 (for example, the DDI 230 of FIG. 2).

According to an embodiment, the data controller 320, the timing controller 340, and/or the memory 233 (for example, the memory 233 of FIG. 2) may be included in the DDI 230 (for example, the DDI 230 of FIG. 2), and the gate controller 330 may be arranged in a non-display area (for example, a bezel area) of the display panel 310.

According to an embodiment, the display panel 310 may include a plurality of gate lines (GL) and a plurality of data lines (DL). As an example, the plurality of data lines (DL) may be formed in, for example, a first direction (for example, a y-axis direction or a vertical direction in FIG. 3) and may be arranged at predetermined intervals. As an example, the plurality of gate lines (GL) may be formed in a second direction (for example, an x-axis direction or a horizontal direction in FIG. 5) substantially perpendicular to the first direction and may be arranged with predetermined intervals.

According to an embodiment, a pixel (P) may be arranged in each of some areas of the display panel 310 in which the plurality of gate lines (GL) and the plurality of data lines (DL) cross.

According to an embodiment, each pixel (P) is electrically connected to the gate line (GL) and the data line (DL) and thus may display a predetermined grayscale.

As an embodiment, the power supply device 350 may generate driving voltages (ELVDD and ELVSS) for light-emitting a plurality of pixels (P) arranged in the display panel 310. The power supply device 350 may supply the driving voltages (ELVDD and ELVSS) to the display panel 310.

Figure 4:
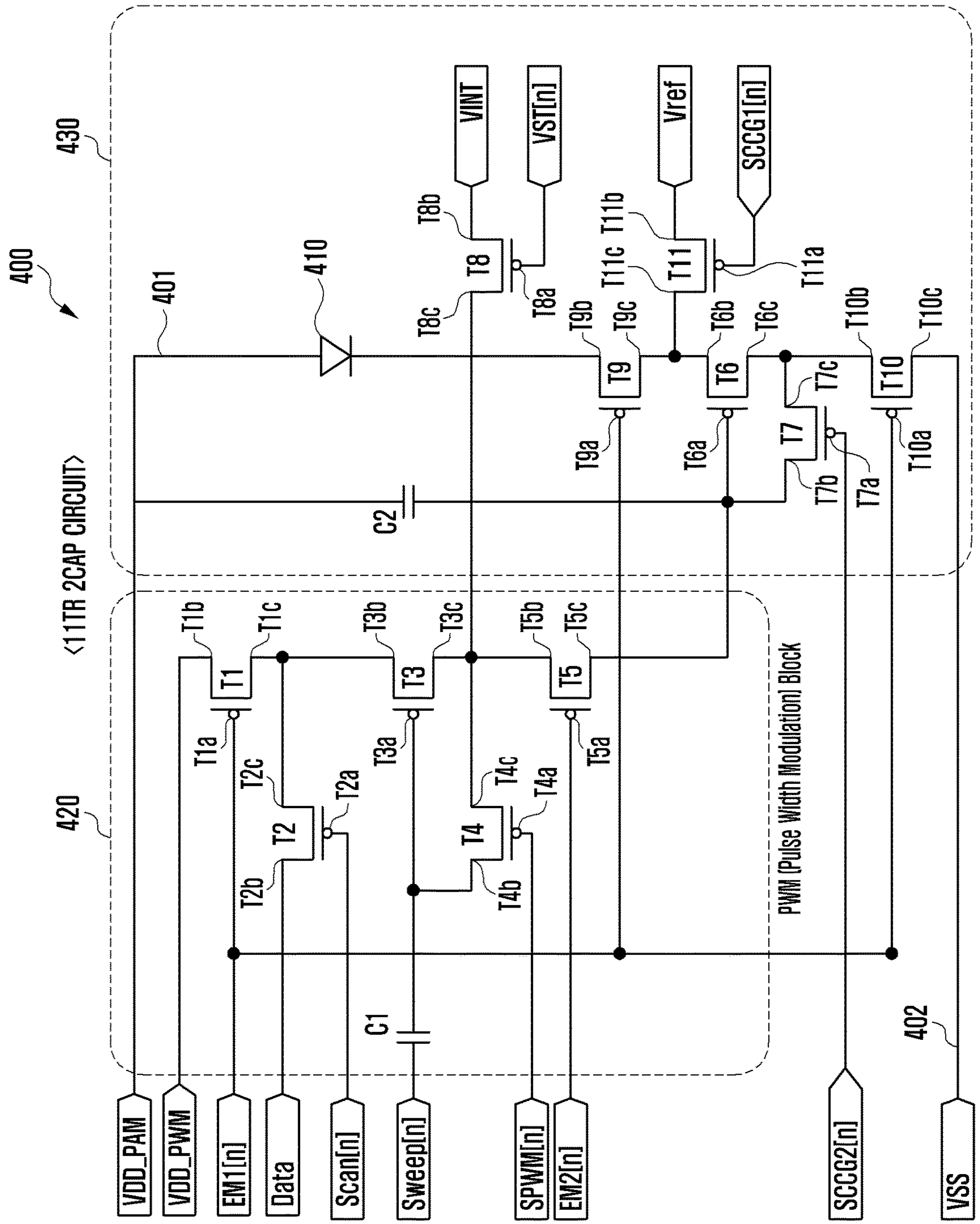
FIG. 4 is a circuit diagram illustrating a pixel driving circuit of each pixel according to an embodiment of the disclosure.

According to an embodiment, the pixels (P) may receive scan signals (for example, Scan[n] and SPWM[n] in FIG. 4) and light-emitting signals (for example, light-emitting signals (EM1 and EM2) in FIG. 4) through the gate lines (GL) and receive data signals through the data lines (DL). According to an embodiment, the pixels (P) are power sources for driving micro light emitting diodes (LEDs) (or organic light emitting diodes (OLEDs) and may receive a high-potential voltage (for example, an ELVDD voltage) and a low-potential voltage (for example, an ELVSS voltage).

According to an embodiment, each pixel (P) may include a micro LED (for example, a micro LED 410 in FIG. 4) and pixel driving circuits (for example, pixel driving circuits 420 and 430 in FIG. 4) for driving the micro LED 410.

According to an embodiment, the pixel driving circuits 420 and 430 arranged in each pixel (P) may control on (for example, an active state) or off (for example, an inactive state) of the micro LED 410, based on the scan signals (Scan[n] and SPWM[n]) and the light-emitting signals (EM1 and EM2). According to an embodiment, when the micro LED 410 of each pixel (P) becomes in the on state (for example, the active state), the micro LED may display a grayscale (for example, luminance) corresponding to a data signal during 1 frame period (or some of the 1 frame period).

According to an embodiment, the data controller 320 may drive the plurality of data lines (DL). According to an embodiment, the data controller 320 may receive at least one synchronization signal and a data signal (for example, digital image data) from the timing controller 340 or a processor (for example, the processor 120 of FIG. 1). According to an embodiment, the data controller 320 may determine a data voltage (Data) (for example, analog image data) corresponding to a data signal input using a reference gamma voltage and a predetermined gamma curve. According to an embodiment, the data controller 320 may supply the data voltage (Data) to each pixel (P) by applying the data voltage (Data) to the plurality of data lines (DL).

According to an embodiment, the gate controller 330 may drive the plurality of gate lines (GL). According to an embodiment, the gate controller 330 may receive at least one synchronization signal from the timing controller 340 or the processor 120. According to an embodiment, the gate controller 330 may sequentially generate a plurality of gate signals (Scan[n]) and sequentially generate a plurality of light-emitting signals (EM1 and EM2), based on the synchronization signal. The gate controller 330 may sequentially supply the generated gate signals (Scan[n]) and light-emitting signals (EM1 and EM2) to a first pixel (P1) and a second pixel (P2) through the gate lines (GL).

For example, each gate line (GL) may include scan signal lines to which the scan signals (Scan[n] and SPWM[n]) are applied and light-emitting signal lines to which the light-emitting signals are applied.

According to an embodiment, the timing controller 340 may control driving timing of the gate controller 330 and the data controller 320. According to an embodiment, the timing controller 540 may receive data signals for one frame from the processor 120. According to an embodiment, the timing controller 340 may convert the data signal (for example, digital image data) input from the processor 120 to correspond to a resolution of the display panel 310 and may supply the converted data signal to the data controller 320.

FIG. 4 is a circuit diagram illustrating a pixel driving circuit of each pixel according to an embodiment of the disclosure.

Referring to FIGS. 3 and 4, each of a plurality of pixels 400 according to an embodiment may include pixel driving circuits 420 and 430 and a micro LED 410 (or OLED). As an example, the pixel driving circuits 420 and 430 may include a first pixel driving circuit 420 and a second pixel driving circuit 430 for driving the LED 410. As an embodiment, the plurality of pixels 400 may operate in the structure from light emission to non-light emission (light emission→non-light emission).

According to an embodiment, the first pixel driving circuit 420 (for example, a pulse width modulation (PWM) signal block) may include a plurality of thin film transistors (TFTs) and at least one capacitor. The first pixel driving circuit 420 may generate a PWM signal for controlling light emission timing of the micro LED 410 and supply the PWM signal to the second pixel driving circuit 430.

According to an embodiment, the second pixel driving circuit 430 (for example, a constant current generation (CCG) block) may include a plurality of thin film transistors (TFTs) and at least one capacitor. The second pixel driving circuit 430 may apply the input light-emitting signals (EM1 and EM2) and the data voltage (Data) to the micro LED 410 to make the micro LED 410 emit light at a grayscale corresponding to the data voltage (Data).

According to an embodiment, the pixel driving circuits 420 and 430 of each pixel 400 may include 11 transistors (T1 to T11) and 2 capacitors (C1 and C2).

According to an embodiment, the first pixel driving circuit 420 (for example, the PWM signal block) of each pixel 400 may include a first transistor (T1), a second transistor (T2), a third transistor (T3), a fourth transistor (T4), a fifth transistor (T5), and a first capacitor (C1).

According to an embodiment, the second pixel driving circuit 430 (for example, the CCG block) of each pixel 400 may include a sixth transistor (T6), a seventh transistor (T7), an eighth transistor (T8), a ninth transistor (T9), a tenth transistor (T10), an eleventh transistor (T11), and a second capacitor (C2) (for example, a storage capacitor).

According to various embodiments, each of the first transistor (T1) to the eleventh transistor (T11) may be one of the PMOS transistor and the NMOS transistor. As an example, the first transistor (T1) to the eleventh transistor (T11) may be PMOS transistors in the same polarity type. As another example, the first transistor (T1) to the eleventh transistor (T11) may be NMOS transistors in the same polarity type.

According to various embodiments, the first transistor (T1) to the eleventh transistor (T11) may be implemented as one of a low temperature poly silicon (LTPS) TFT, an oxide TFT, or a low temperature polycrystalline oxide (LTPO) TFT.

According to an embodiment, a first terminal (T1*a*) of the first transistor (T1) of the first pixel driving circuit 420 (for example, the PWM signal block) may be electrically connected to a first light-emitting signal line to which the first light-emitting signal (EM1[*n*]) is supplied. A second terminal (T1*b*) of the first transistor (T1) may be electrically connected to a VDD_PWM signal line. A third terminal (T1*c*) of the first transistor (T1) may be electrically connected to a third terminal (T2*c*) of the second transistor (T2) and a second terminal (T3*b*) of the third transistor (T3). As an embodiment, the first light-emitting signal (EM1[*n*]) may be supplied to the first terminal (T1*a*) of the first transistor (T1). A DC signal for applying a high signal to a node (for example, a gate node) of a first terminal (T6*a*) of the sixth transistor (T6) may be supplied to the second terminal (T1*b*) of the first transistor (T1).

As an embodiment, the first transistor (T1) may block a VDD voltage in order to transfer the data signal (for example, grayscale data) input through the data line to a node (for example, a gate node of T3) of a first terminal (T3*a*) of the third transistor (T3).

According to an embodiment, a first terminal (T2*a*) of the second transistor (T2) of the first pixel driving circuit 420 (for example, the PWM signal block) may be electrically connected to a first signal line to which the first scan signal (scan[n]) is supplied. A second terminal (T2*b*) of the second transistor (T2) may be electrically connected to the data line to which the data signal is supplied. The third terminal (T2*c*) of the second transistor (T2) may be electrically connected to the third terminal (T1*c*) of the first transistor (T1) and the second terminal (T3*b*) of the third transistor (T3).

As an embodiment, the second transistor (T2) may enable the data signal (for example, grayscale data) input through the data line to be selected for each line. The second transistor (T2) may supply the data signal (for example, grayscale data) to the third transistor (T3).

According to an embodiment, the first terminal (T3*a*) of the third transistor (T3) of the first pixel driving circuit 420 (for example, the PWM signal block) may be electrically connected to a second terminal of the first capacitor (C1) and a second terminal (T4*b*) of the fourth transistor (T4). The second terminal (T3*b*) of the third transistor (T3) may be electrically connected to the third terminal (T1*c*) of the first transistor (T1) and the third terminal (T2*c*) of the second transistor (T2). A third terminal (T3*c*) of the third transistor (T3) may be electrically connected to a third terminal (T4*c*) of the fourth transistor (T4), a second terminal (T5*b*) of the fifth transistor (T5), and a third terminal (T8*c*) of the eighth transistor (T8). A sweep signal (for example, a sweep signal of FIG. 6) may be supplied to the first terminal (T3*a*) of the third transistor (T3).

As an embodiment, the third transistor (T3) may operate as a driving transistor of the first pixel driving circuit 420 (for example, the PWM signal block). The third transistor (T3) may control an amount of current flowing from VDD to the node (for example, the gate node of T6) of the first terminal (T6*a*) of the sixth transistor (T6) according to the input data signal (for example, grayscale data).

According to an embodiment, a first terminal (T4*a*) of the fourth transistor (T4) of the first pixel driving circuit 420 (for example, the PWM signal block) may be electrically connected to a second scan signal line to which a second scan signal (scan PWM(SPWM) signal) is supplied. The second terminal (T4*b*) of the fourth transistor (T4) may be electrically connected to the first capacitor (C1) and the first terminal (T3*a*) of the third transistor (T3). The third terminal (T4*c*) of the fourth transistor (T4) may be electrically connected to the third terminal (T3*c*) of the third transistor (T3), the second terminal (T5*b*) of the fifth transistor (T5), and the third terminal (T8*c*) of the eighth transistor (T8).

As an embodiment, the fourth transistor (T4) may constitute a diode connection circuit with the third transistor (T3) in order to compensate for a Vth characteristic of the third transistor (T3).

According to an embodiment, a first terminal (T5*a*) of the fifth transistor (T5) of the first pixel driving circuit 420 (for example, the PWM signal block) may be electrically connected to the second light-emitting signal line to which the second light-emitting signal (EM2[*n*]) is supplied. The second terminal (T5*b*) of the fifth transistor (T5) may be electrically connected to the third terminal (T3*c*) of the third transistor (T3), the third terminal (T4*c*) of the fourth transistor (T4), and the third terminal (T8*c*) of the eighth transistor (T8). A third terminal (T5*c*) of the fifth transistor (T5) may be electrically connected to the first terminal (T6*a*) of the sixth transistor (T6).

As an embodiment, the fifth transistor (T5) is turned on/off, based on the input second light-emitting signal (EM2[*n*]) and may control the current flowing from the VDD_PWM signal line via the first transistor (T1), the third transistor (T3), the fifth transistor (T5), and the sixth transistor (T6).

According to an embodiment, a first terminal of the first capacitor (C1) may be electrically connected to the sweep signal line to which the sweep signal is supplied. A second terminal of the first capacitor (C1) may be electrically connected to the first terminal (T3*a*) of the third transistor (T3) and the second terminal (T4*b*) of the fourth transistor (T4).

As an embodiment, the first capacitor (C1) may operate as a storage capacitor that stores the voltage of the node of the first terminal (T3*a*) of the third transistor (T3) for 1 frame. Further, the first capacitor (C1) may operate as a coupling capacitor that changes the voltage of the node (for example, the gate node of T3) of the first terminal (T3*a*) of the third transistor (T3) according to the input sweep signal.

According to an embodiment, the first terminal (T6*a*) of the sixth transistor (T6) of the second pixel driving circuit 430 (for example, the CCG block) may be electrically connected to a second terminal of the second capacitor (C2) (for example, the storage capacitor) and a second terminal (T7*b*) of the seventh transistor (T7). A second terminal (T6*b*) of the sixth transistor (T6) may be electrically connected to a third terminal (T9*c*) of the ninth transistor (T9) and a third terminal (T11*c*) of the eleventh transistor (T11). A third terminal (T6*c*) of the sixth transistor (T6) may be electrically connected to a third terminal (T7*c*) of the seventh transistor (T7).

As an embodiment, the sixth transistor (T6) may operate as a driving transistor of the second pixel driving circuit 430 (for example, the CCG block). The sixth transistor (T6) may control the current flowing from a VDD line 401 to a VSS line 402 via the micro LED 410. That is, the sixth transistor (T6) may control the light emission and the grayscale of the micro LED 410 by controlling the current flowing in a light emission path.

According to an embodiment, a first terminal (T7*a*) of the seventh transistor (T7) of the second pixel driving circuit 430 (for example, the CCG block) may be electrically connected to a second SCCG signal line to which a second scan constant current generation (SCCG) signal (SCCG2[*n*]) is supplied. The second terminal (T7*b*) of the seventh transistor (T7) may be electrically connected to the second terminal of the second capacitor (C2), the third terminal (T5*c*) of the fifth transistor (T5), and the first terminal (T6*a*) of the sixth transistor (T6). The third terminal (T7*c*) of the seventh transistor (T7) may be electrically connected to a third terminal (T6*c*) of the sixth transistor (T6) and a second terminal (T10*b*) of the tenth transistor (T10).

As an embodiment, the seventh transistor (T7) may constitute a diode connection circuit with the sixth transistor (T6) in order to compensate for a Vth characteristic of the sixth transistor (T6).

According to an embodiment, a first terminal (T8*a*) of the eighth transistor (T8) of the second pixel driving circuit 430 (for example, the CCG block) may be electrically connected to a reset signal line to which a reset signal (VST[n]) is supplied. A second terminal (T8*b*) of the eighth transistor (T8) may be electrically connected to an initialization voltage signal line to which an initialization voltage signal (VINT) is supplied. The third terminal (T8*c*) of the eighth transistor (T8) may be electrically connected to the third terminal (T3*c*) of the third transistor (T3), the third terminal (T4*c*) of the fourth transistor (T4), and the second terminal (T5*b*) of the fifth transistor (T5).

As an embodiment, the eighth transistor (T8) is turned on/off, based on the input reset signal (VST[n]) and may initialize the node (for example, the gate node of T3) of the first terminal (T3*a*) of the third transistor (T3) and apply bias.

According to an embodiment, a first terminal (T9*a*) of the ninth transistor (T9) of the second pixel driving circuit 430 (for example, the CCG block) may be electrically connected to the first light-emitting signal line to which the first light-emitting signal (EM1[*n*]) is supplied and a first terminal (T10*a*) of the tenth transistor (T10). A second terminal (T9*b*) of the ninth transistor (T9) may be electrically connected to a cathode terminal of the micro LED 410. The third terminal (T9*c*) of the ninth transistor (T9) may be electrically connected to the second terminal (T6*b*) of the sixth transistor (T6) and the third terminal (T11*c*) of the eleventh transistor (T11).

As an embodiment, the ninth transistor (T9) is turned on/off, based on the input first light-emitting signal (EM1[*n*]) and may control the current starting from the VDD line 401 and flowing to the VSS line 402 via the micro LED 410, the sixth transistor (T6), and the tenth transistor (T10). That is, the ninth transistor (T9) may control the current flowing in the light emission path.

According to an embodiment, the first terminal (T10*a*) of the tenth transistor (T10) of the second pixel driving circuit 430 (for example, the CCG block) may be electrically connected to the first light-emitting signal line to which the first light-emitting signal (EM1[*n*]) is supplied and the first terminal (T9*a*) of the ninth transistor (T9). The second terminal (T10*b*) of the tenth transistor (T10) may be electrically connected to the third terminal (T6*c*) of the sixth transistor (T6) and the third terminal (T7*c*) of the seventh transistor (T7). A third terminal (T10*c*) of the tenth transistor (T10) may be electrically connected to the VSS line 402 to which the VSS voltage is supplied.

As an embodiment, the tenth transistor (T10) is turned on/off, based on the first light-emitting signal (EM1[*n*]) and may control the current starting from the VDD line 401 and flowing to the VSS line 402 via the micro LED 410, the ninth transistor (T9), and the sixth transistor (T6). That is, the tenth transistor (T10) may control the current flowing in the light emission path.

According to an embodiment, a first terminal (T11*a*) of the eleventh transistor (T11) of the second pixel driving circuit 430 (for example, the CCG block) may be electrically connected to a first SCCG signal line to which a first scan constant current generation (SCCG) signal (SCCG1[*n*]) is supplied. A second terminal (T11*b*) of the eleventh transistor (T11) may be electrically connected to a compensation voltage line to which a compensation voltage (Vref) for compensating for the Vth characteristic of the sixth transistor (T6) is supplied. The third terminal (T11*c*) of the eleventh transistor (T11) may be electrically connected to the second terminal (T6*b*) of the sixth transistor (T6) and the third terminal (T9*c*) of the ninth transistor (T9). As an example, the compensation voltage (Vref) for compensating for the Vth characteristic of the sixth transistor (T6) may be input into each of a red pixel, a green pixel, and a blue pixel. As another example, the compensation voltage (Vref) for compensating for the Vth characteristic of the sixth transistor (T6) may be input into the red pixel, the green pixel, and the blue pixel in common.

According to an embodiment, the first terminal of the second capacitor (C2) may be electrically connected to the VDD line 401 to which the VDD voltage is supplied. The second terminal of the second capacitor (C2) may be electrically connected to the third terminal (T5*c*) of the fifth transistor (T5), the first terminal (T6*a*) of the sixth transistor (T6), and the second terminal (T7*b*) of the seventh transistor (T7).

As an embodiment, the second capacitor (C2) may hold a voltage of the node (for example, the gate node of T6) of the first terminal (T6*a*) of the sixth transistor (T6) for 1 frame.

As an embodiment, the second capacitor (C2) may be formed to have capacitance two times or more larger than the first capacitor (C1).

According to various embodiments, the micro LED 410 may be arranged in an area in which the second pixel driving circuit 430 (for example, the CCG block) is formed.

As an embodiment, the LED 410 may be located at one place in the light emission path starting from the VDD line 401 and continuing to the VSS line 402 via the ninth transistor (T9), the sixth transistor (T6), and the tenth transistor (T10).

As an embodiment, the micro LED 410 may be electrically connected to the ninth transistor (T9) in the light emission path starting from the VDD line 401 and continuing to the VSS line 402 via the ninth transistor (T9), the sixth transistor (T6), and the tenth transistor (T10) and may be arranged at a location adjacent to the ninth transistor (T9). As an example, an anode terminal of the micro LED 410 may be electrically connected to the VDD line 401 to which the VDD voltage is supplied. The cathode terminal of the micro LED 410 may be electrically connected to the second terminal (T9*b*) of the ninth transistor (T9).

As another embodiment, the micro LED 410 may be electrically connected to the tenth transistor (T10) in the light emission path starting from the VDD line 401 and continuing to the VSS line 402 via the ninth transistor (T9), the sixth transistor (T6), and the tenth transistor (T10) and may be arranged at a location adjacent to the tenth transistor (T10). As an example, the anode terminal of the micro LED 410 may be electrically connected to the third terminal (T10*c*) of the tenth transistor (T10). The cathode terminal of the micro LED 410 may be electrically connected to the VSS line 402 to which the VSS voltage is supplied.

According to an embodiment, the data signal (for example, grayscale data) is a signal for inputting a voltage value according to an image and may be supplied to the second transistor (T2) through the data line (DL).

According to an embodiment, the sweep signal (for example, the sweep signal of FIG. 6) may be a waveform having a triangular shape or a constant slope for the operation of the first pixel driving circuit 420 (for example, the PWM signal block).

According to an embodiment, the first light-emitting signal (EM1[*n*]) and the second light-emitting signal (EM2[*n*]) may control the light emission path to control light emission and non-light emission conditions of the pixels 400.

According to an embodiment, the first scan signal (Scan [n]) may be supplied to the second transistor (T2) to select the data signal (for example, grayscale data) for each line.

According to an embodiment, the reset signal (VST[n]) is input into the eighth transistor (T8) and may initialize the node (for example, the gate node of T3) of the first terminal (T3*a*) of the third transistor (T3).

According to an embodiment, the first constant current generation (SCCG) signal (SCCG1[*n*]) is supplied to the eleventh transistor (T11) and thus may enable the compensation voltage (Vref) to be supplied to the third terminal (T6*c*) (for example, a source terminal) of the sixth transistor (T6) when the Vth characteristic of the sixth transistor (T6) is compensated for.

According to an embodiment, the second constant current generation (SCCG) signal (SCCG2[*n*]) is supplied to the seventh transistor (T7) when the Vth characteristic of the sixth transistor (T6) is compensated for, and thus the sixth transistor (T6) and the seventh transistor (T7) may constitute a diode connection circuit.

According to an embodiment, the VDD_PAM signal may be a source power signal of the current that is supplied to the VDD line 401 and flows to the micro LED 410.

According to an embodiment, the VDD_PWM signal may be a DC signal for applying high to the node (for example, the gate node of T6) of the first terminal (T6*a*) of the sixth transistor (T6).

According to an embodiment, VSS may be a low potential power signal of the current used for light emission of the micro LED 410.

According to an embodiment, the initialization voltage signal (VINT) may be a signal that determines the initialization voltage of a node (for example, a gate node of T3) of the first terminal (T3*a*) of the third transistor (T3) and a node (T6) (for example, a gate node of T6) of the first terminal (T6*a*) of the sixth transistor (T6).

According to an embodiment, the compensation voltage (Vref) may be a reference voltage for compensating for Vth of the sixth transistor (T6). The compensation voltage (Vref) may be separately input into each of the red pixel, the green pixel, and the blue pixel or may be input into the red pixel, the green pixel, and the blue pixel in common.

Figure 5:
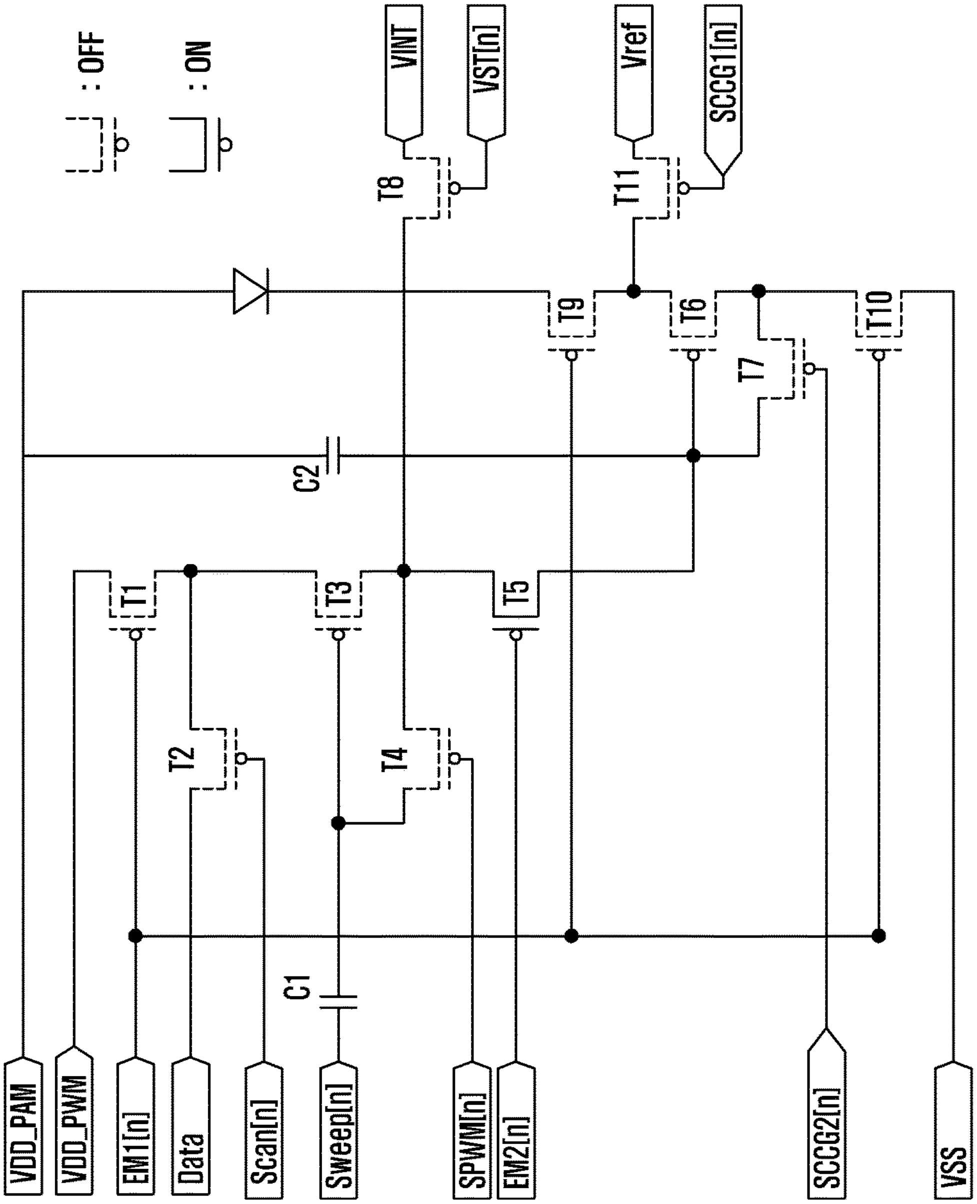
FIG. 5 is a diagram illustrating a method of operating a first period when pixels operate according to an embodiment of the disclosure.

FIG. 5 is a diagram illustrating a method of operating a first period when pixels operate according to an embodiment of the disclosure.

Figure 6:
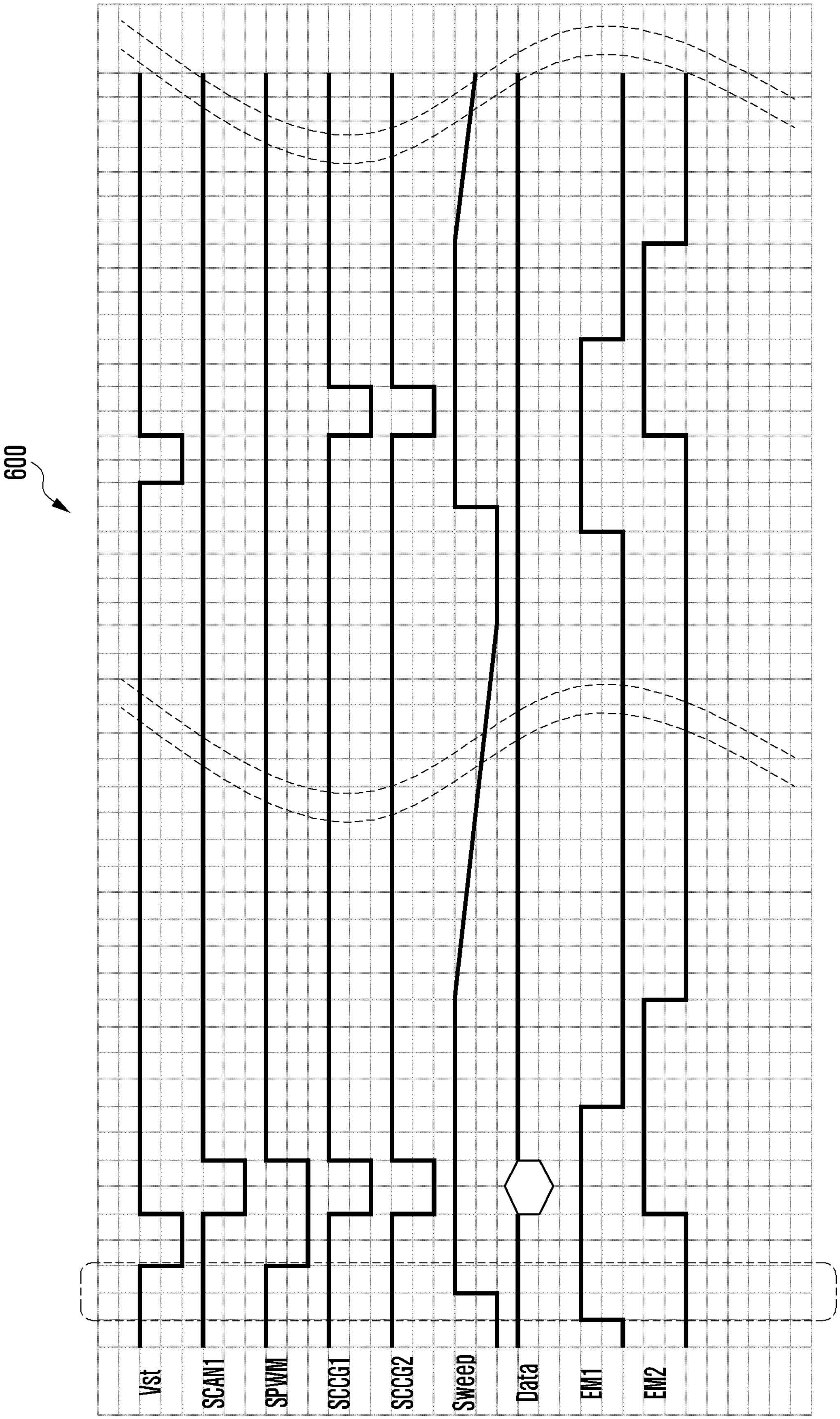
FIG. 6 is a diagram illustrating waveforms input into pixels during the first period according to an embodiment of the disclosure.

FIG. 6 is a diagram 600 illustrating waveforms input into pixels during the first period according to an embodiment of the disclosure.

Figure 21:
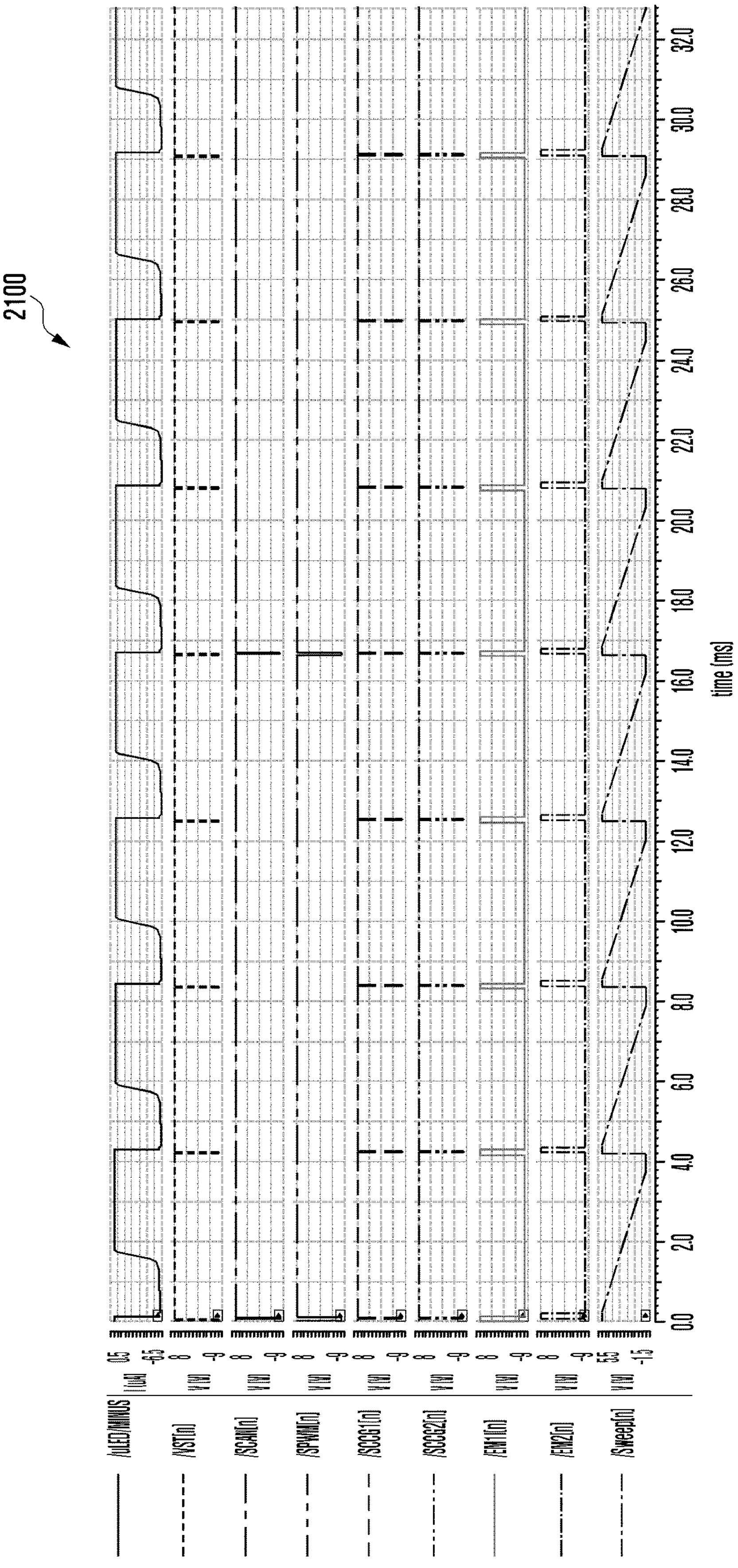
FIG. 21 is a diagram illustrating all waveforms of 2 cycles, as a simulation result of an operation of a pixel driving circuit according to an embodiment of the disclosure.

FIG. 21 is a diagram 2100 illustrating all waveforms of 2 cycles, as a simulation result of an operation of a pixel driving circuit according to an embodiment of the disclosure.

Figure 22:
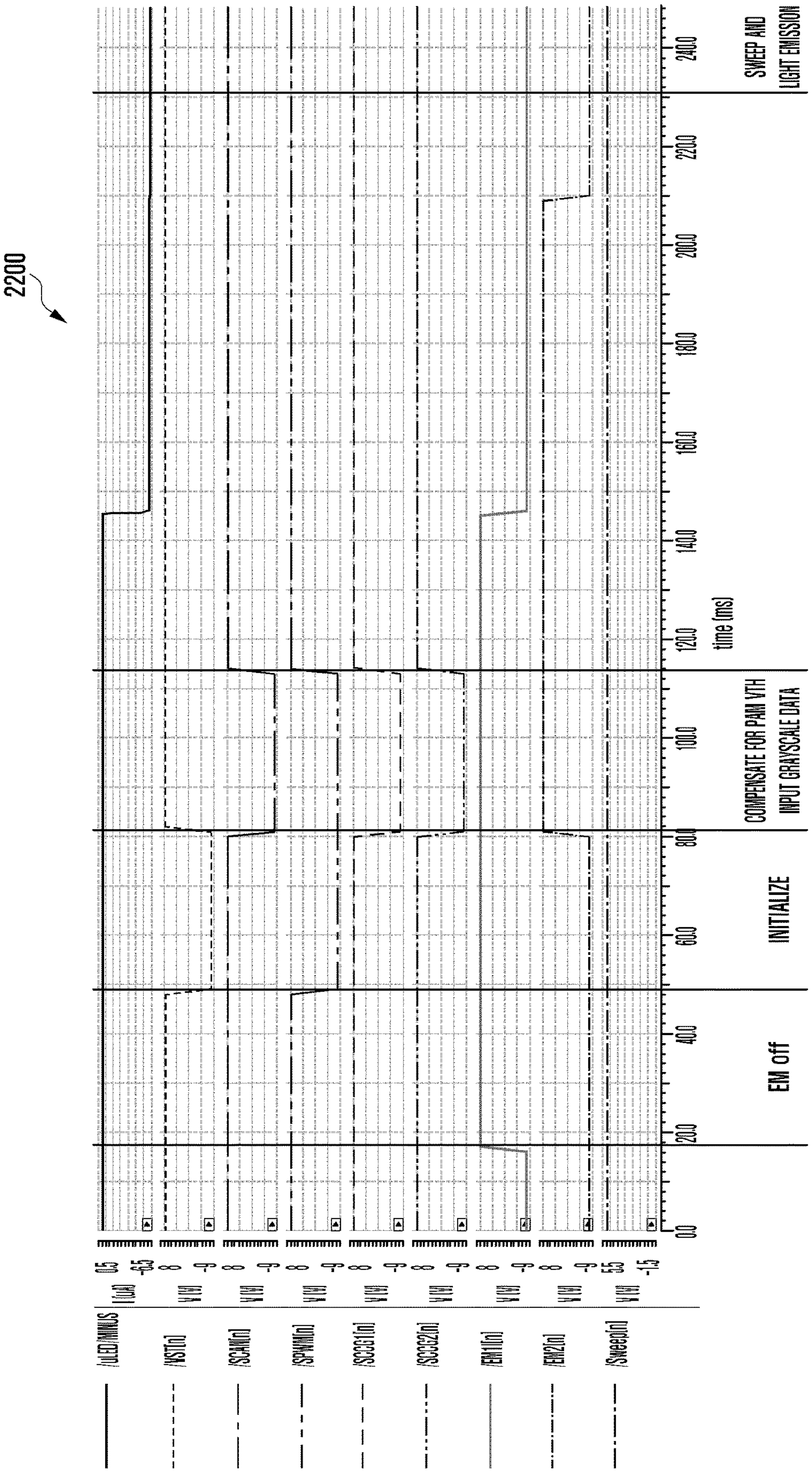
FIG. 22 is a diagram illustrating waveforms of 1 duty, as a simulation result of the operation of the pixel driving circuit according to an embodiment of the disclosure.

FIG. 22 is a diagram 2200 illustrating waveforms of 1 duty, as a simulation result of the operation of the pixel driving circuit according to an embodiment of the disclosure.

Referring to FIGS. 4, 5, 6, 21, and 22, a light emission path may be blocked during the first period in the operation of pixels according to various embodiments of the disclosure.

As an embodiment, during the first period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 6 may be supplied to the pixel driving circuit (for example, the pixel driving circuit 420 or 430 of FIG. 4).

As an embodiment, during the first period, the fifth transistor (T5) may become in the on state. During the first period, the first transistor (T1), the second transistor (T2), the third transistor (T3), the fourth transistor (T4), the sixth transistor (T6), the seventh transistor (T7), the eighth transistor (T8), the ninth transistor (T9), the tenth transistor (T10), and the eleventh transistor (T11) may become in an off state.

As an embodiment, the first light-emitting signal (EM1[*n*]) may be supplied with a high voltage and block the current of the light emission path starting from the VDD line 401 and ending at the VSS line 402 via the sixth transistor (T6).

Figure 7:
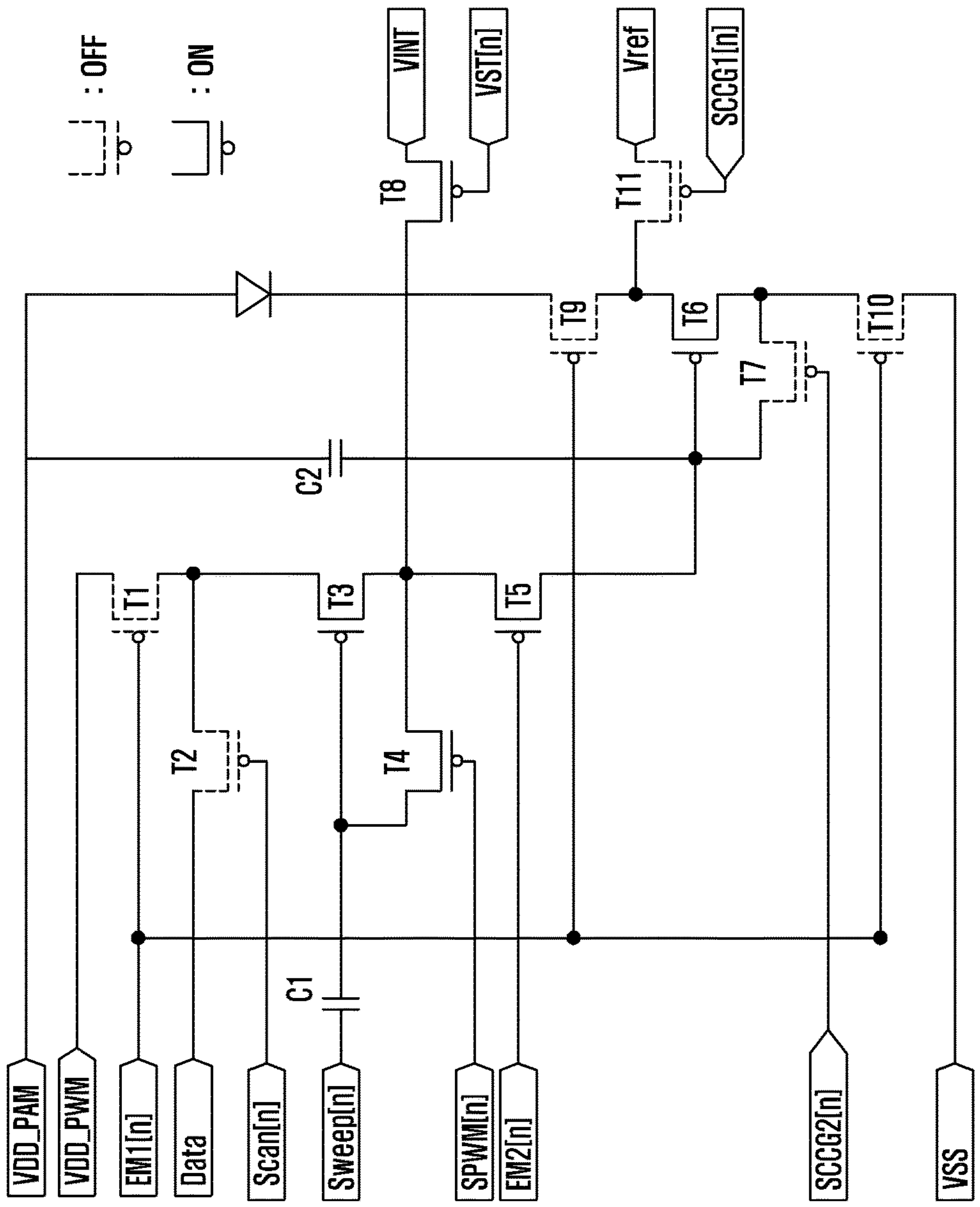
FIG. 7 is a diagram illustrating a method of operating a second period when pixels operate according to an embodiment of the disclosure.

FIG. 7 is a diagram illustrating a method of operating a second period when pixels operate according to an embodiment of the disclosure.

Figure 8:
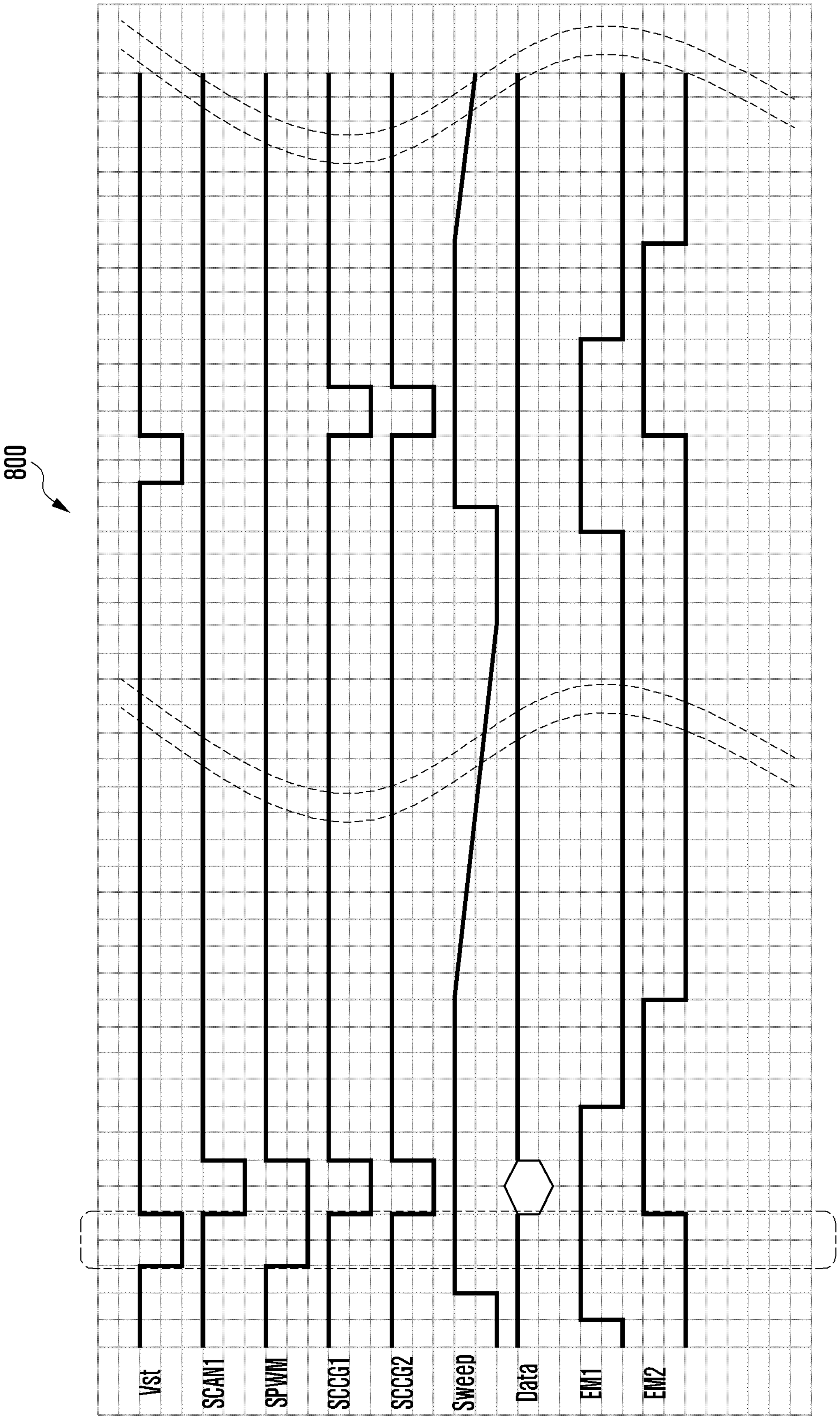
FIG. 8 is a diagram illustrating waveforms input into pixels during the second period according to an embodiment of the disclosure.

FIG. 8 is a diagram 800 illustrating waveforms input into pixels during the second period according to an embodiment of the disclosure.

Referring to FIGS. 4, 7, 8, 21, and 22, during the second period in the operation of pixels according to various embodiment of the disclosure, the gate node of the third transistor (T3) that is a driving transistor of the first pixel driving circuit 420 (for example, the PWM signal block) and the gate node of the sixth transistor (T6) that is a driving transistor of the second pixel driving circuit 430 (for example, the CCG block) may be initialized.

As an embodiment, during the second period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 8 may be supplied to the pixel driving circuit (for example, the pixel driving circuit 420 or 430 of FIG. 4).

As an embodiment, during the second period, the third transistor (T3), the fourth transistor (T4), the fifth transistor (T5), the sixth transistor (T6), and the eighth transistor (T8) may become in the on state. During the second period, the first transistor (T1), the second transistor (T2), the seventh transistor (T7), the ninth transistor (T9), the tenth transistor (T10), and the eleventh transistor (T11) may become in the off state.

As an embodiment, during the second period, the reset signal (VST) and the second scan signal (SPWM) may be supplied with low and may thus initialize the gate node of the third transistor (T3) and the gate node of the sixth transistor (T6). At this time, the third transistor (T3) and the sixth transistor (T6) may become in the mode on state.

Figure 9:
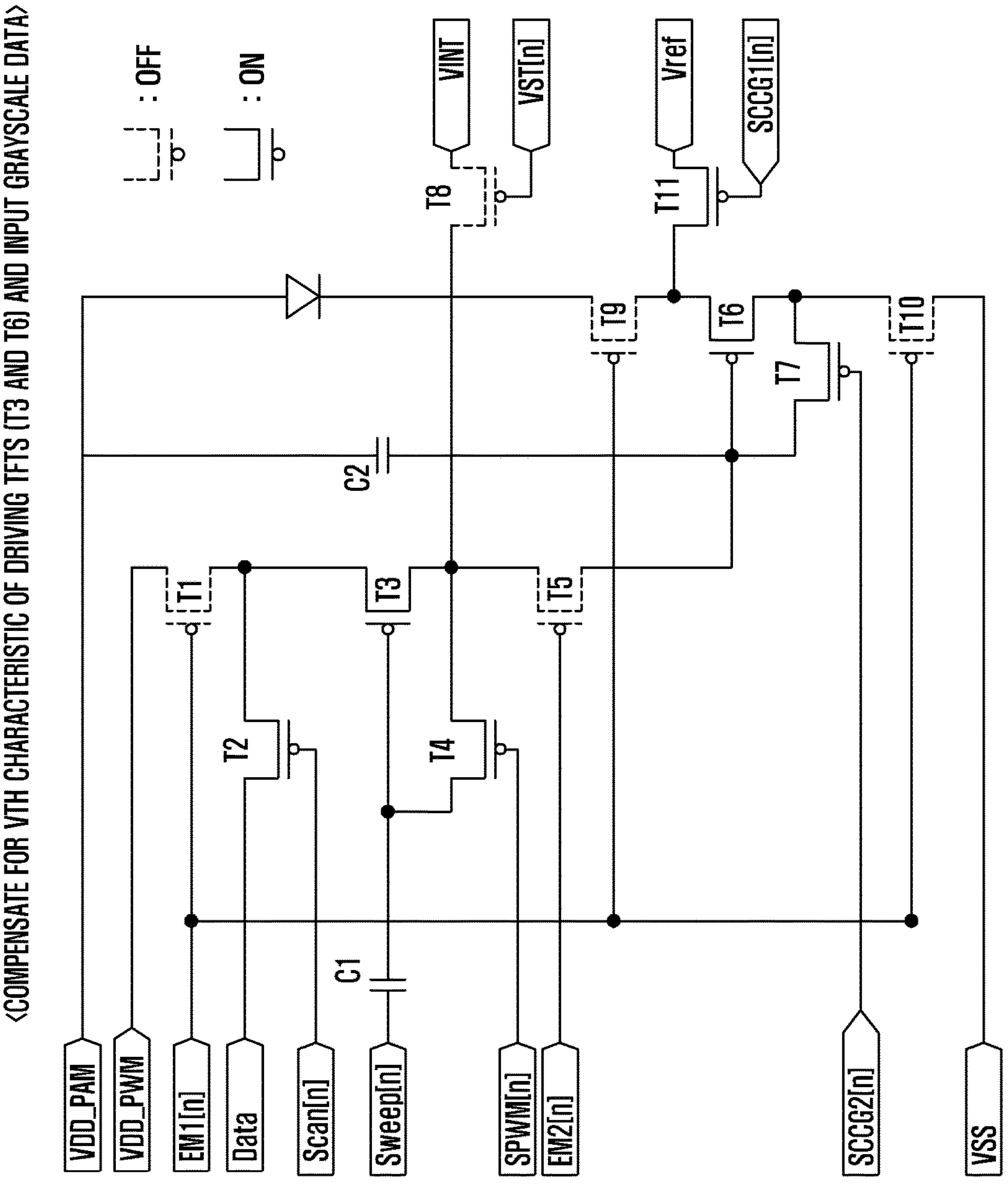
FIG. 9 is a diagram illustrating a method of operating a third period when pixels operate according to an embodiment of the disclosure.

FIG. 9 is a diagram illustrating a method of operating a third period when pixels operate according to an embodiment of the disclosure.

Figure 10:
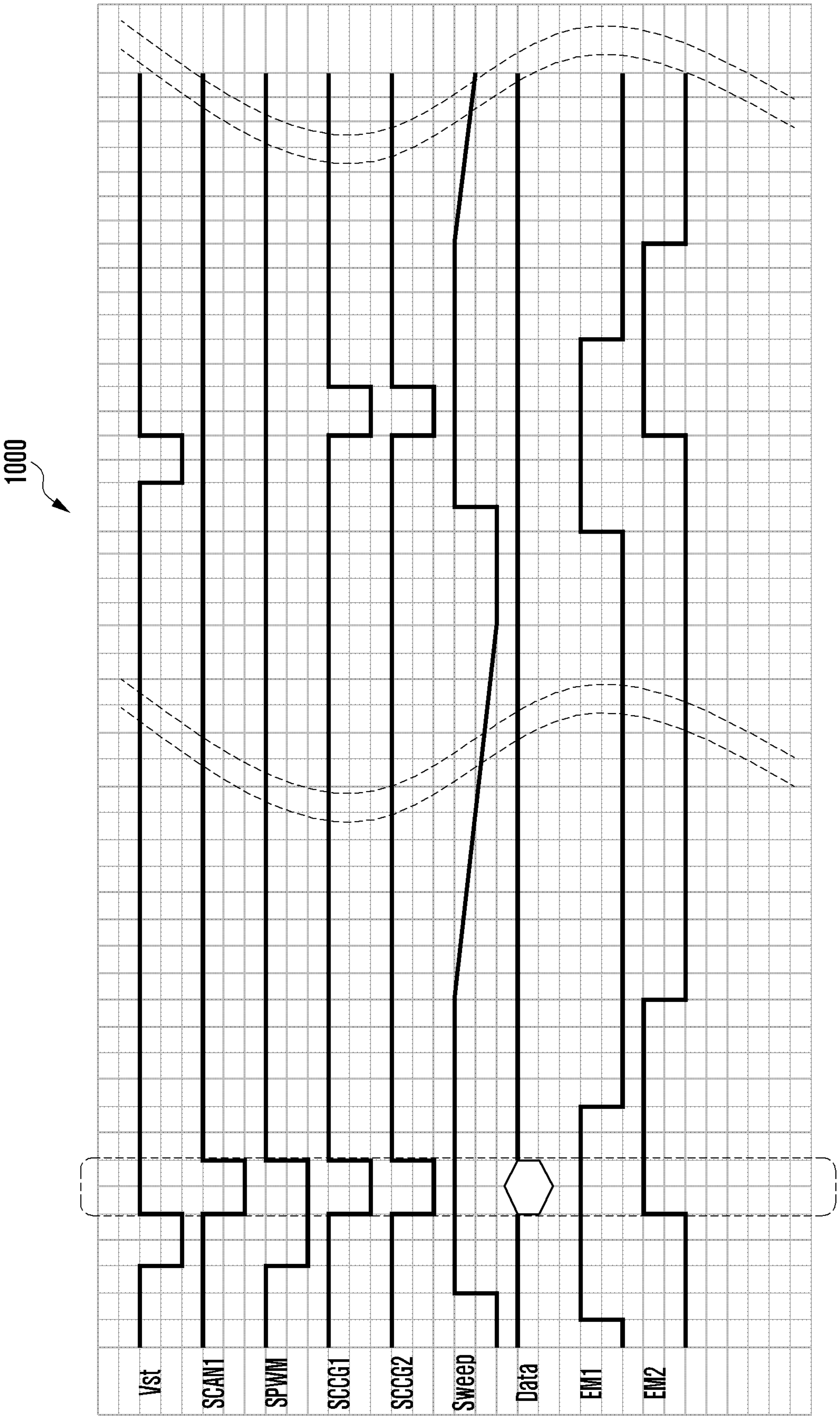
FIG. 10 is a diagram illustrating waveforms input into pixels during the third period according to an embodiment of the disclosure.

FIG. 10 is a diagram 1000 illustrating waveforms input into pixels during the third period according to an embodiment of the disclosure.

Referring to FIGS. 4, 9, 10, 21, and 22, during the third period in the operation of pixels according to various embodiments of the disclosure, Vth characteristics of the third transistor (T3) and the sixth transistor (T6) may be compensated for and the data signal (for example, grayscale data) may be supplied.

As an embodiment, during the third period, the reset signal (VST), the first scan signal (Scan), the second scan signal (SPWM), the first SCCG signal (SCCG1), the second SCCG signal (SCCG1), the sweep signal, the data signal (for example, grayscale data), the first light-emitting signal (EM1), and the second light-emitting signal (EM2) illustrated in FIG. 10 may be supplied to the pixel driving circuit (for example, the pixel driving circuit 420 or 430 of FIG. 4).

As an embodiment, during the third period, the second transistor (T2), the third transistor (T3), the fourth transistor (T4), the sixth transistor (T6), the seventh transistor (T7), and the eleventh transistor (T11) may become in the on state. During the third period, the first transistor (T1), the fifth transistor (T5), the eighth transistor (T8), the ninth transistor (T9), and the tenth transistor (T10) may become in the off state.

As an embodiment, during the third period, when the Vth characteristic of the third transistor (T3) is compensated for, a Vth characteristic compensation value of the third transistor (T3) may be reflected in a PWM grayscale data signal input through the data line and stored in the first capacitor (C1). The second terminal (T6*b*) of the sixth transistor (T6) and the eleventh transistor (T11) may be connected and the data signal in which the Vth value of the sixth transistor (T6) is reflected may be stored in the second capacitor (C2). According thereto, the data voltage in which the value obtained by compensating for the Vth characteristic of the third transistor (T3) is reflected may be stored in the first capacitor (C1), and the data voltage in which the Vth characteristic of the sixth transistor (T6) is reflected may be stored in the second capacitor (C2).

Figure 11:
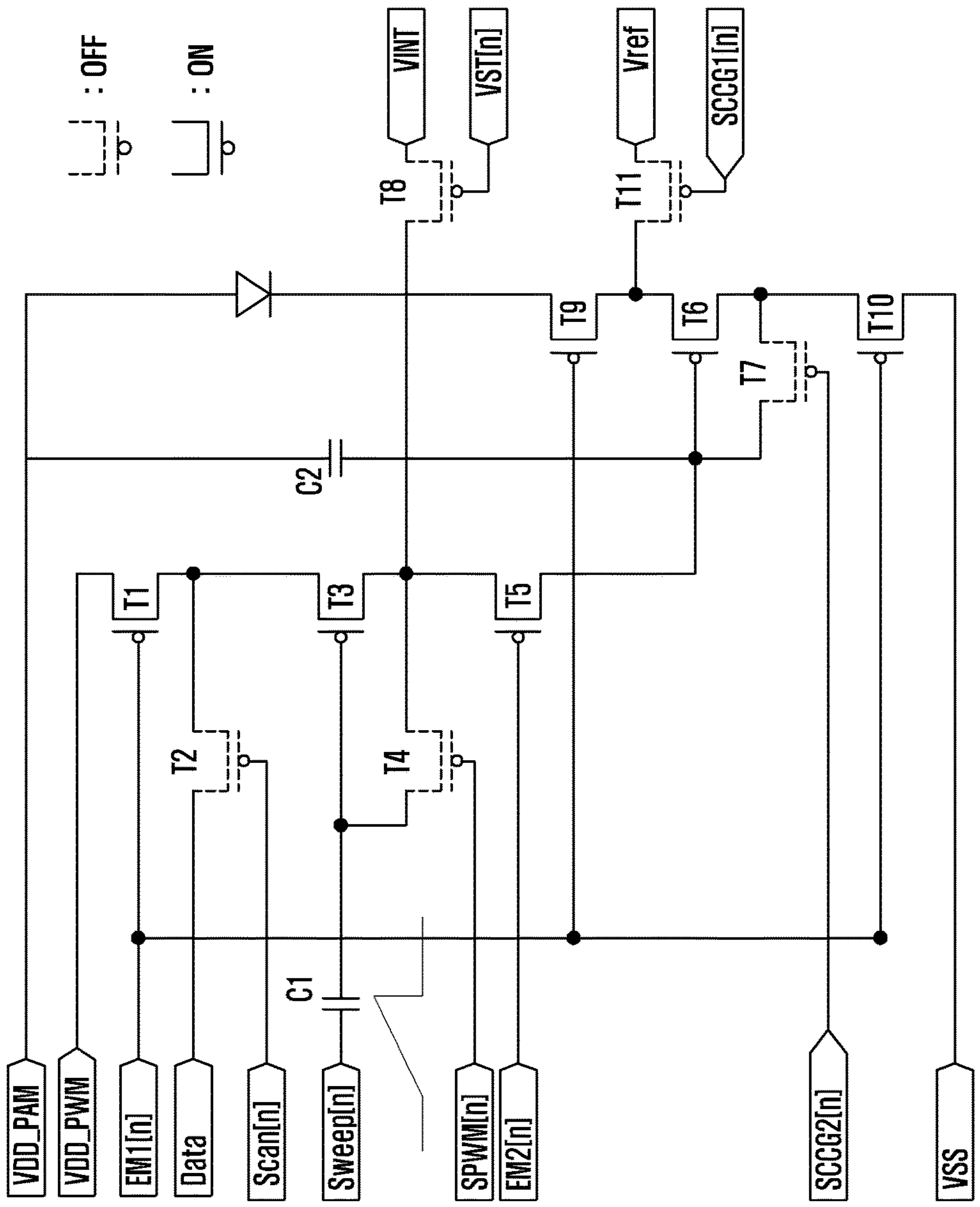
FIG. 11 is a diagram illustrating a method of operating a fourth period when pixels operate according to an embodiment of the disclosure.

FIG. 11 is a diagram illustrating a method of operating a fourth period when pixels operate according to an embodiment of the disclosure.

Figure 12:
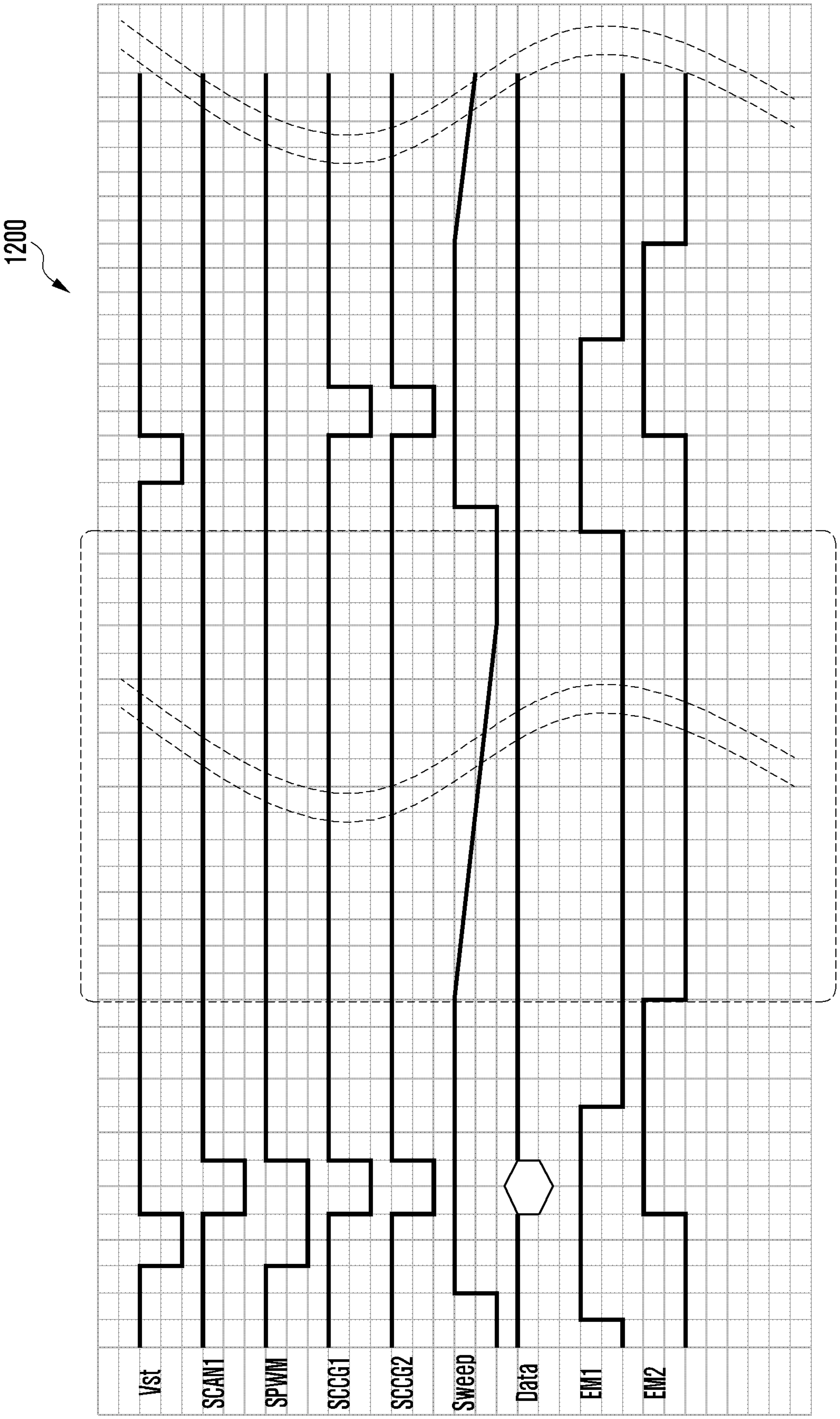
FIG. 12 is a diagram illustrating waveforms input into pixels during the fourth period according to an embodiment of the disclosure.

FIG. 12 is a diagram 1200 illustrating waveforms input into pixels during the fourth period according to an embodiment of the disclosure.

Referring to FIGS. 4, 11, 12, 21, and 22, during the fourth period in the operation of pixels according to various embodiments of the disclosure, a light emission path may be turned on and a sweep signal may be supplied.

As an embodiment, during the fourth period, the reset signal (VST), the first scan signal (Scan), the second scan signal (SPWM), the first SCCG signal (SCCG1), the second SCCG signal (SCCG1), the sweep signal, the data signal (for example, grayscale data), the first light-emitting signal (EM1), and the second light-emitting signal (EM2) illustrated in FIG. 12 may be supplied to the pixel driving circuit (for example, the pixel driving circuit 420 or 430 of FIG. 4).

As an embodiment, during the fourth period, the first transistor (T1), the third transistor (T3), the fifth transistor (T5), the sixth transistor (T6), the ninth transistor (T9), and the tenth transistor (T10) may become in the on state. During the fourth period, the second transistor (T2), the fourth transistor (T4), the seventh transistor (T7), the eighth transistor (T8), and the tenth transistor (T10) may become in the off state.

As an embodiment, during the fourth period, the first light-emitting signal (EM1) and the second light-emitting signal (EM2) may be supplied with a low voltage and the current may flow via the VDD line 401, the micro LED 410, the sixth transistor (T6), and the VSS line 402. According to the voltage of the sweep signal, the gate voltage of the third transistor (T3) stored in the first capacitor (C1) is coupled and thus the voltage gradually drops, and may make the third transistor (T3) become in the on state when a specific time arrives. The third transistor (T3) becomes in the on state and enable the PWM for controlling a light emission time to be driven using the data signal (for example, grayscale data).

Figure 13:
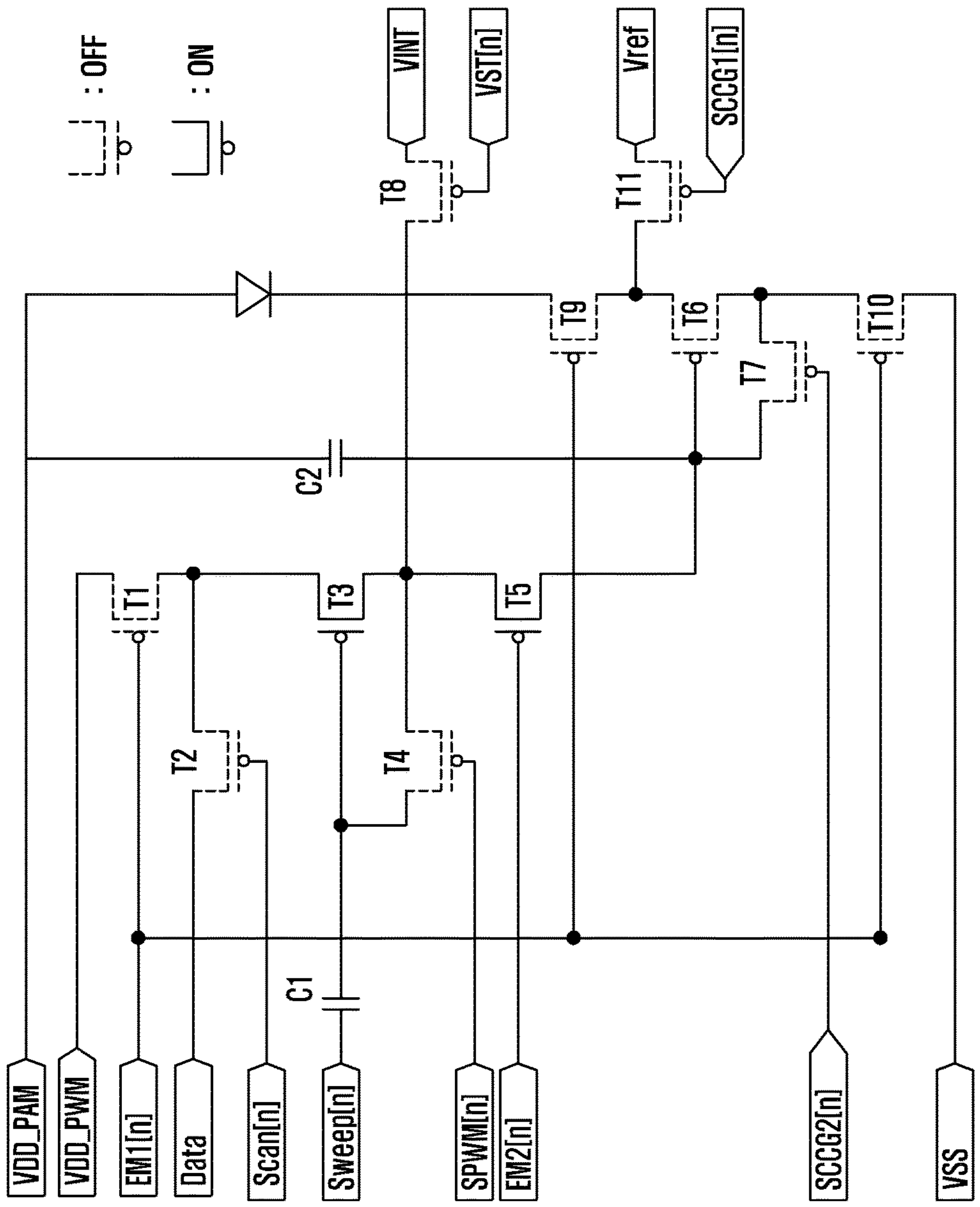
FIG. 13 is a diagram illustrating a method of operating a fifth period when pixels operate according to an embodiment of the disclosure.

FIG. 13 is a diagram illustrating a method of operating a fifth period when pixels operate according to an embodiment of the disclosure.

Figure 14:
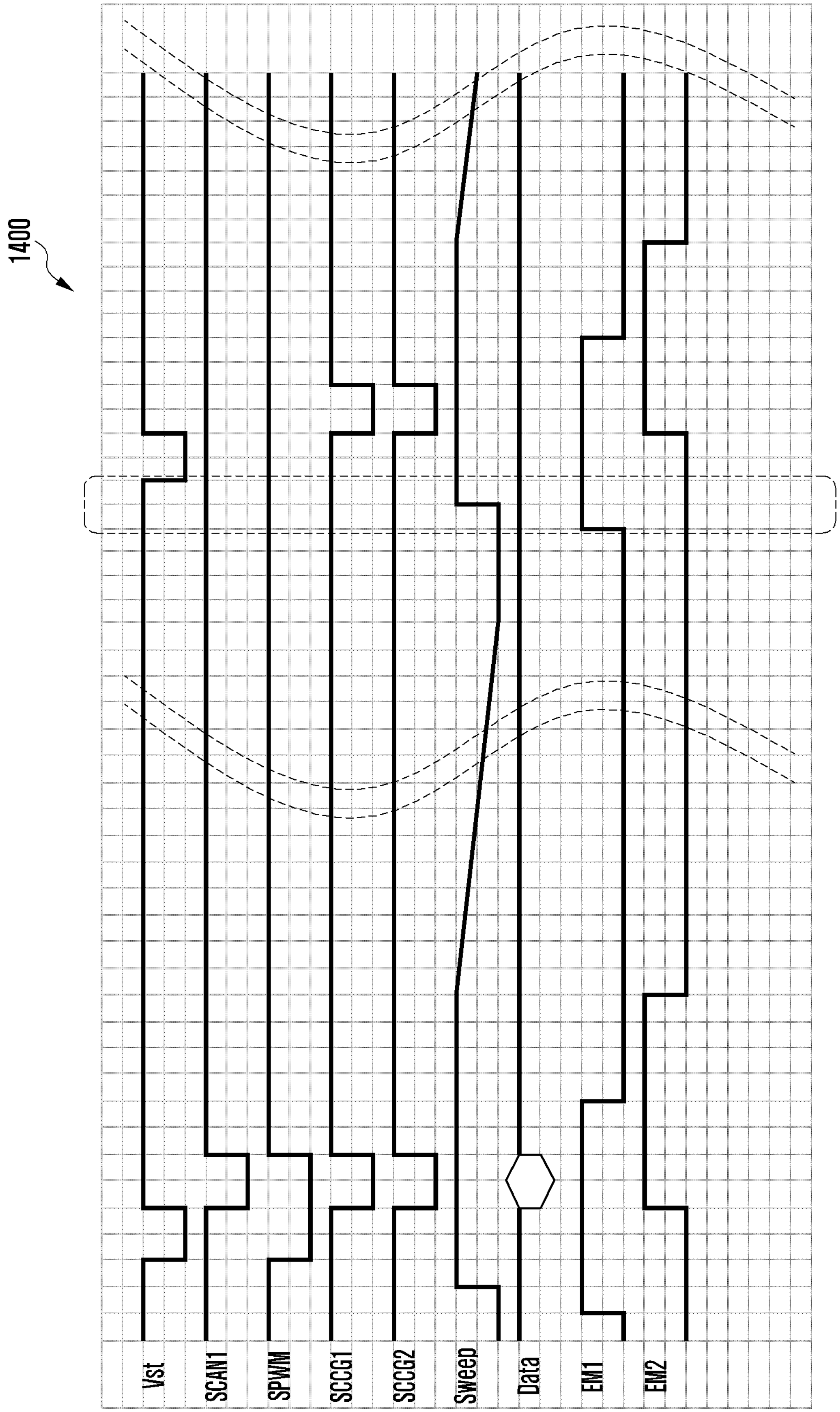
FIG. 14 is a diagram illustrating waveforms input into pixels during the fifth period according to an embodiment of the disclosure.

FIG. 14 is a diagram 1400 illustrating waveforms input into pixels during the fifth period according to an embodiment of the disclosure.

Referring to FIGS. 4, 13, 14, 21, and 22, during the fifth period in the operation of pixels according to various embodiment of the disclosure, a light emission path may be blocked through duty driving.

As an embodiment, during the fifth period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 14 may be supplied to the pixel driving circuit (for example, the pixel driving circuit 420 or 430 of FIG. 4).

As an embodiment, during the fifth period, the third transistor (T3) and the fifth transistor (T5) may become in the on state. During the fifth period, the first transistor (T1), the second transistor (T2), the fourth transistor (T4), the sixth transistor (T6), the seventh transistor (T7), the eighth transistor (T8), the ninth transistor (T9), the tenth transistor (T10), and the eleventh transistor (T11) may become in the off state.

As an embodiment, during the fifth period, the first light-emitting signal (EM1) may be supplied with the high voltage and thus the light emission path may be blocked. As an embodiment, for 2 to 6 duty driving in 1 frame, the operations of the fifth period and sixth to eighth periods describe below may be repeatedly performed in every duty.

Figure 15:
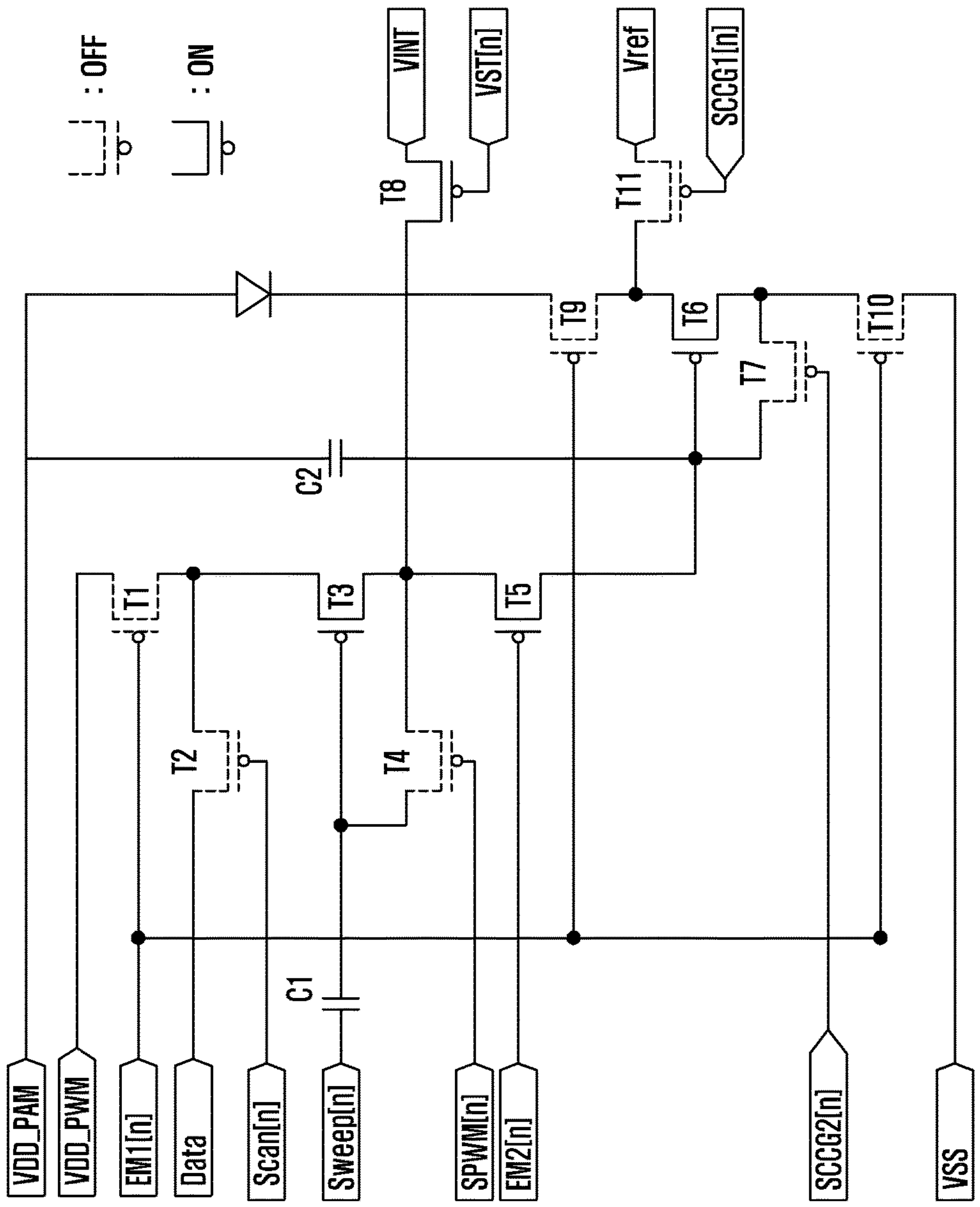
FIG. 15 is a diagram illustrating a method of operating a sixth period when pixels operate according to an embodiment of the disclosure.

FIG. 15 is a diagram illustrating a method of operating the sixth period when pixels operate according to an embodiment of the disclosure.

Figure 16:
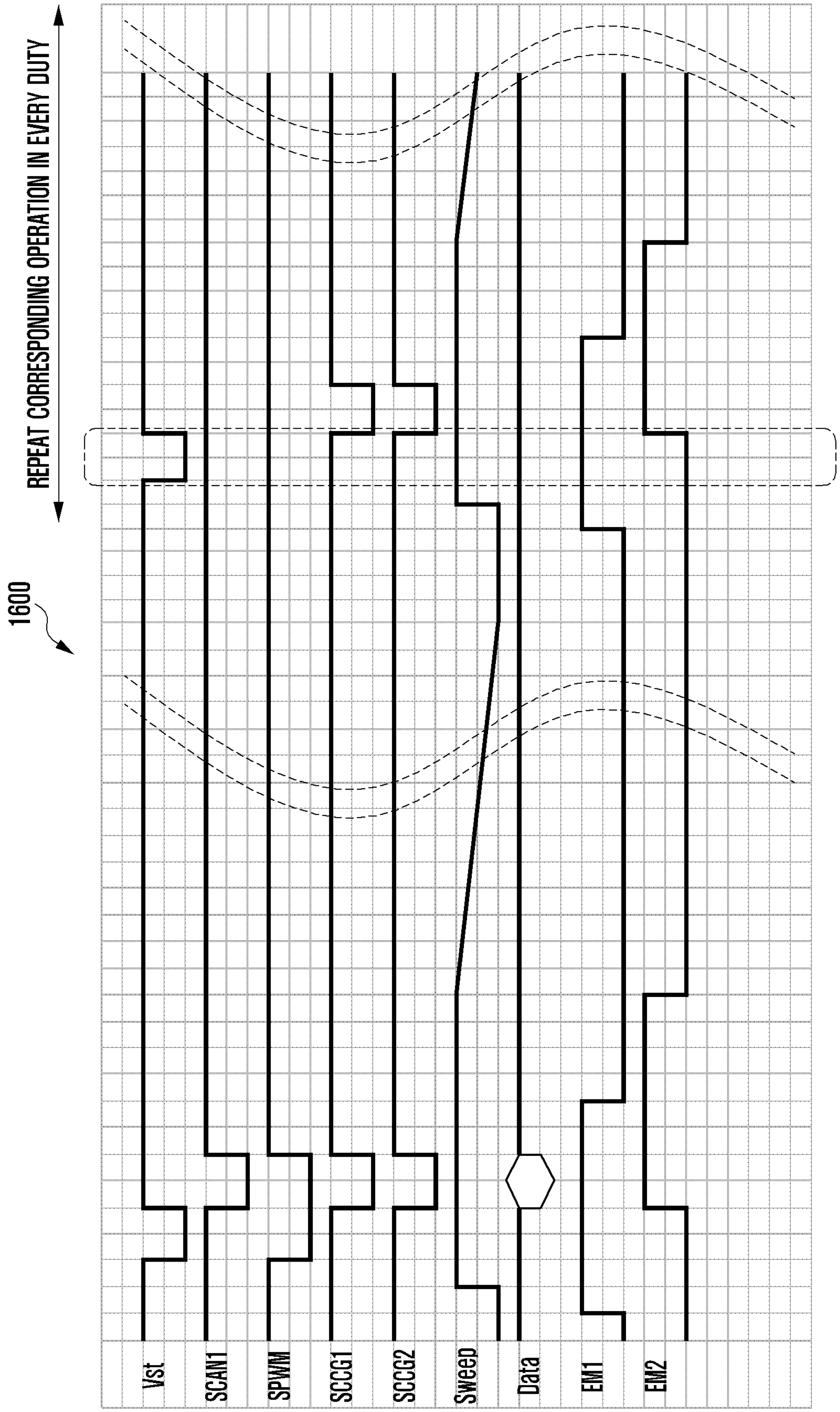
FIG. 16 is a diagram illustrating waveforms input into pixels during the sixth period according to an embodiment of the disclosure.

FIG. 16 is a diagram 1600 illustrating waveforms input into pixels during the sixth period according to an embodiment of the disclosure.

Referring to FIGS. 4, 15, 16, 21, and 22, during the sixth period in the operation of pixels according to various embodiments of the disclosure, the gate node of the sixth transistor (T6) of the first pixel driving circuit 420 (for example, the PWM signal block) may be initialized through duty driving.

As an embodiment, during the sixth period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 16 may be supplied to the pixel driving circuit (for example, the pixel driving circuit 420 or 430 of FIG. 4).

As an embodiment, during the sixth period, the third transistor (T3), the fifth transistor (T5), the sixth transistor (T6), and the eighth transistor (T8) may become in the on state. During the sixth period, the first transistor (T1), the second transistor (T2), the fourth transistor (T4), the seventh transistor (T7), the ninth transistor (T9), the tenth transistor (T10), and the eleventh transistor (T11) may become in the off state.

As an embodiment, during the sixth period, the fifth transistor (T5) and the eighth transistor (T8) become in the on state and the initialization voltage (VINT) may be supplied to the gate node of the sixth transistor (T6). At this time, the sixth transistor (T6) may become in the off state again.

Figure 17:
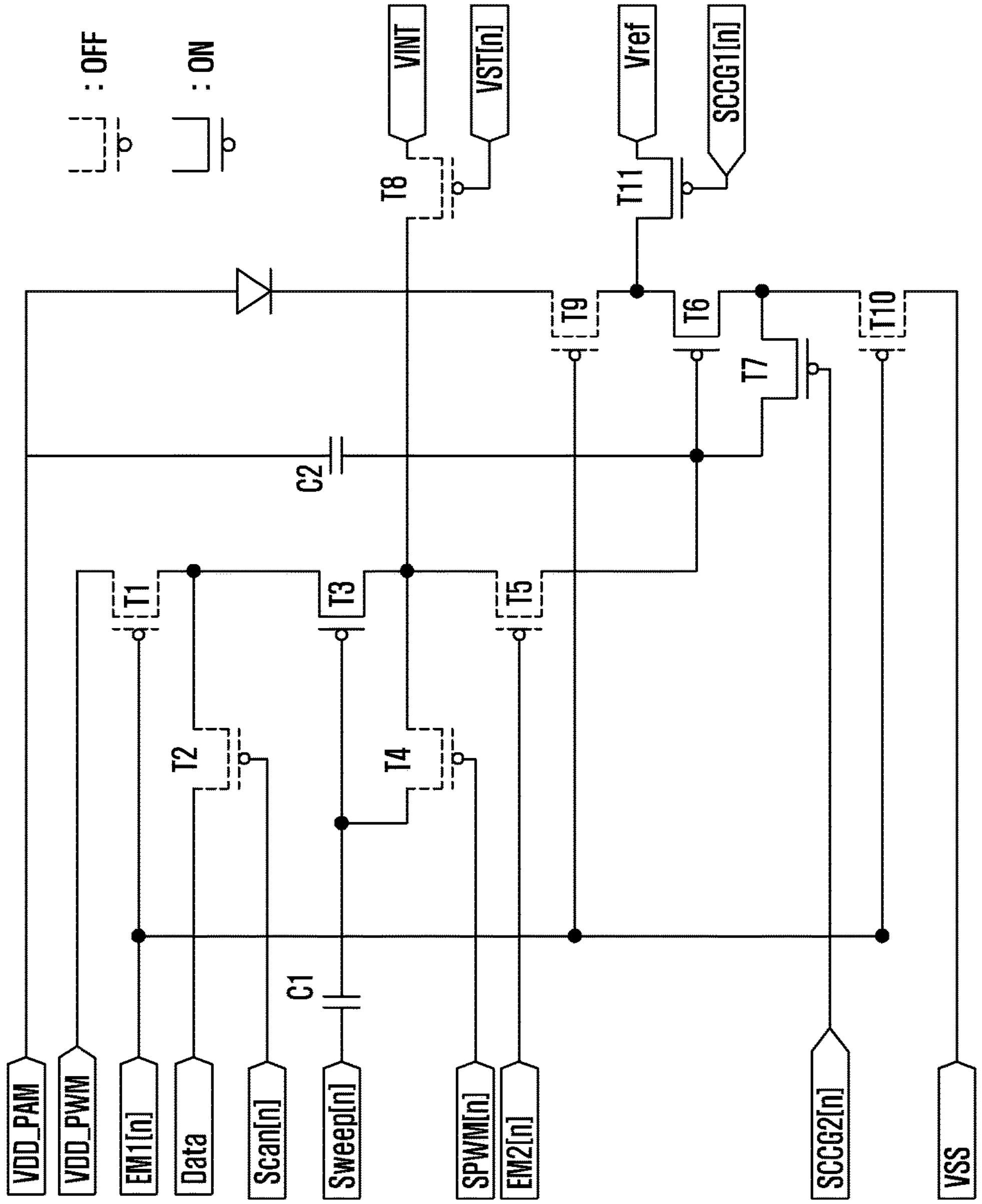
FIG. 17 is a diagram illustrating a method of operating a seventh period when pixels operate according to an embodiment of the disclosure.

FIG. 17 is a diagram illustrating a method of operating a seventh period when pixels operate according to an embodiment of the disclosure.

Figure 18:
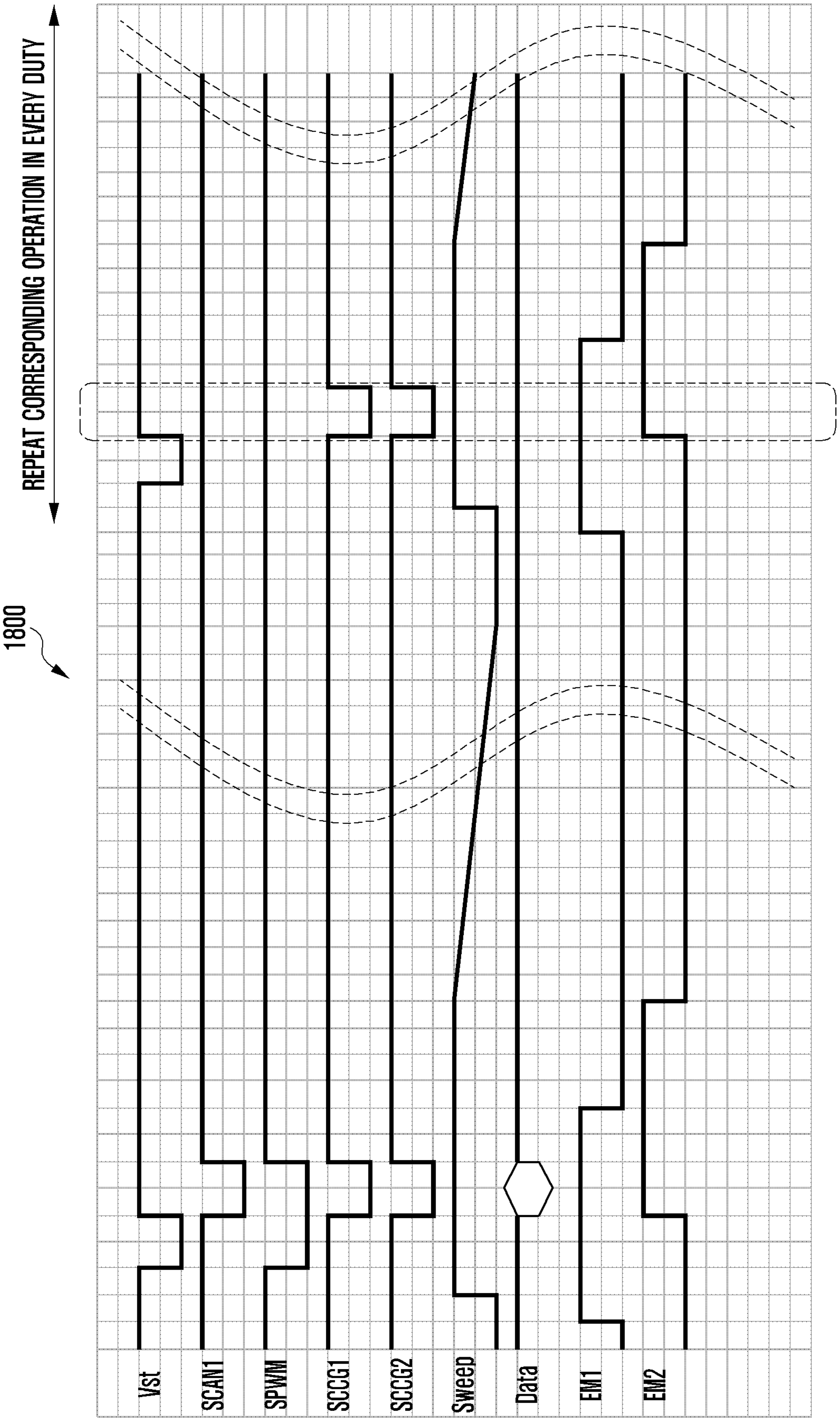
FIG. 18 is a diagram illustrating waveforms input into pixels during the seventh period according to an embodiment of the disclosure.

FIG. 18 is a diagram 1800 illustrating waveforms input into pixels during the seventh period according to an embodiment of the disclosure.

Referring to FIGS. 4, 17, 18, 21, and 22, during the seventh period in the operation of pixels according to various embodiments of the disclosure, the Vth characteristic of the sixth transistor (T6) may be compensated for through duty driving.

As an embodiment, during the seventh period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 18 may be supplied to the pixel driving circuit (for example, the pixel driving circuit 420 or 430 of FIG. 4).

As an embodiment, during the seventh period, the third transistor (T3), the sixth transistor (T6), the seventh transistor (T7), and the eleventh transistor (T11) may become in the on state. During the seventh period, the first transistor (T1), the second transistor (T2), the fourth transistor (T4), the fifth transistor (T5), the eighth transistor (T8), the ninth transistor (T9), and the tenth transistor (T10) may become in the off state.

As an embodiment, during the seventh period, the second light-emitting signal (EM2) may be supplied with the high voltage and thus the light emission path may be blocked. The seventh transistor (T7) and the eleventh transistor (T11) are turned on, and a voltage obtained by reflecting the Vth characteristic of the sixth transistor (T6) to the compensation voltage (Vref) may be stored in the second capacitor (C2).

Figure 19:
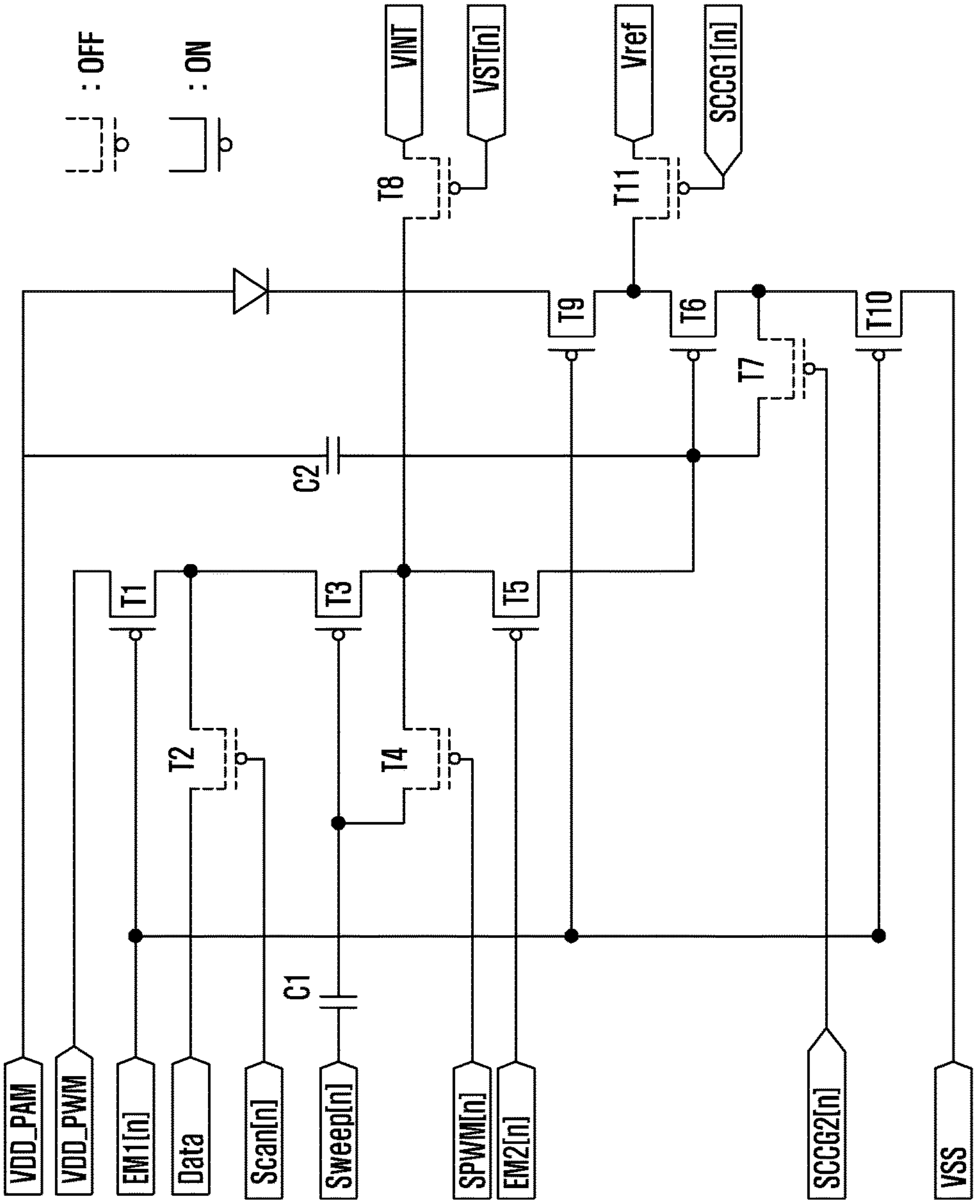
FIG. 19 is a diagram illustrating a method of operating an eighth period when pixels operate according to an embodiment of the disclosure.

FIG. 19 is a diagram illustrating a method of operating an eighth period when pixels operate according to an embodiment of the disclosure.

Figure 20:
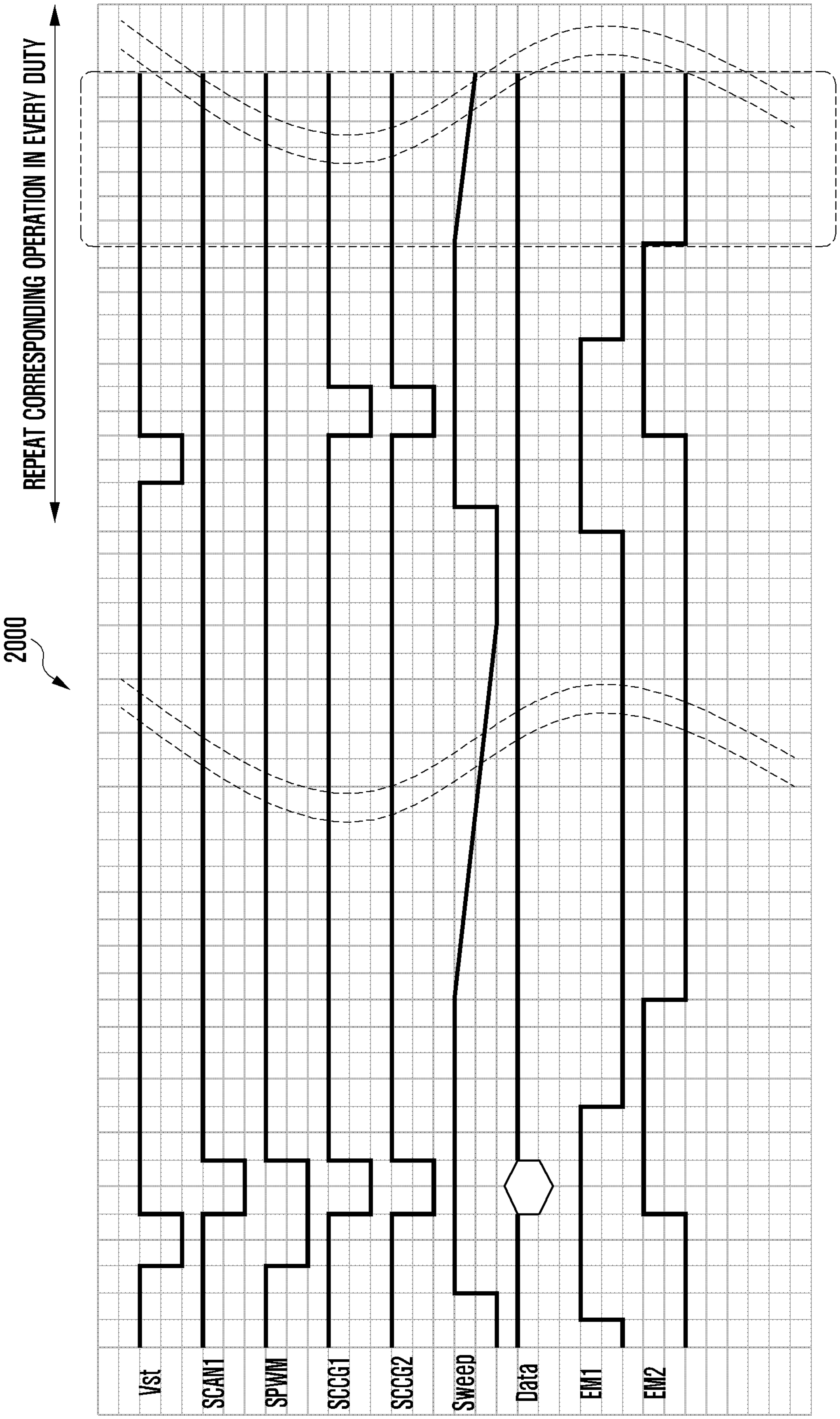
FIG. 20 is a diagram illustrating waveforms input into pixels during the eighth period according to an embodiment of the disclosure.

FIG. 20 is a diagram 2000 illustrating waveforms input into pixels during the eighth period according to an embodiment of the disclosure.

Referring to FIGS. 4, 19, 20, 21, and 22, during the eighth period in the operation of pixels according to various embodiments of the disclosure, the micro LED 410 may emit light through duty driving.

As an embodiment, during the eighth period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 20 may be supplied to the pixel driving circuit (for example, the pixel driving circuit 420 or 430 of FIG. 4).

As an embodiment, during the eighth period, the first transistor (T1), the third transistor (T3), the fifth transistor (T5), the sixth transistor (T6), the ninth transistor (T9), and the tenth transistor (T10) may become in the on state. During the eighth period, the second transistor (T2), the fourth transistor (T4), the seventh transistor (T7), the eighth transistor (T8), and the eleventh transistor (T11) may become in the off state.

As an embodiment, during the eighth period, the first light-emitting signal (EM1) and the second light-emitting signal (EM2) may be supplied to the low voltage and thus the light emission path may open and the micro LED 410 may emit light.

Referring to FIGS. 21 and 22, as a result of inputting the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) into the pixel driving circuit 420 or 430 of the pixels 400 illustrated in FIG. 4 during 2 cycles, it is possible to prevent the color of the pixel from being changed and improve image quality characteristics of the display.

The electronic device to which the pixels 400 including the pixel driving circuits 420 and 430 and the micro LED 410 are applied according to an embodiment of the disclosure may input the compensation voltage (Vref) supplied to the source terminal of the driving transistor (for example, the sixth transistor (T6)) arranged in the second pixel driving circuit 430 (for example, the CCG block) into each of the red pixel, the green pixel, and the blue pixel or into the red pixel, the green pixel, and the blue pixel in common. When the micro LED 410 emits light, different pixel currents may flow for respective colors.

The electronic device to which the pixels 400 including the pixel driving circuits 420 and 430 and the micro LED 410 are applied according to an embodiment of the disclosure may connect the eleventh transistor (T11) to the source terminal of the driving transistor (for example, the sixth transistor (T6)) to supply the compensation voltage (Vref) in order to compensate for the Vth characteristic of the driving transistor (for example, the sixth transistor (T6)) arranged in the second pixel driving circuit 430 (for example, the CCG block). The driving transistor (for example, the sixth transistor (T6)) and the seventh transistor (T7) may be constituted as a diode connection circuit.

The electronic device to which the pixels 400 including the pixel driving circuits 420 and 430 and the micro LED 410 are applied according to an embodiment of the disclosure may initialize together gate nodes of the driving transistor (for example, the third transistor (T3)) arranged in the first driving circuit 420 (for example, the PWM signal block) and the driving transistor (for example, the sixth transistor (T6)) arranged in the second pixel driving circuit 430 (for example, the CCG block) to the initialization voltage (VINT) by using the fourth transistor (T4), the fifth transistor (T5), and the eighth transistor (T8).

In the electronic device to which the pixels 400 including the pixel driving circuits 420 and 430 and the micro LED 410 are applied according to an embodiment of the disclosure, the micro LED 410 may be arranged at one location in the light emission path. The micro LED 410 may be arranged at a location adjacent to the VDD line 401, and the micro LED 410 may be arranged at a location adjacent to the VSS line 402.

The electronic device to which the pixels 400 including the pixel driving circuits 420 and 430 and the micro LED 410 are applied according to an embodiment of the disclosure may initialize the gate node of the driving transistor (for example, the sixth transistor (T6)) arranged in the second pixel driving circuit 430 (for example, the CCG block) in every duty driving, and enable a Vth characteristic compensation operation to be repeatedly performed. The voltage stored in the first capacitor (C1) may be initialized in units of frames. Vth characteristic compensation of the third transistor (T3) and sweep coupling may be repeatedly performed. The voltage value stored in the second capacitor (C2) may be initialized in units of duties, and Vth characteristic compensation of the sixth transistor (T6) and an input operation of the compensation voltage (Vref) may be repeatedly performed.

The electronic device to which the pixels 400 including the pixel driving circuits 420 and 430 and the micro LED 410 are applied according to an embodiment of the disclosure may repeatedly perform Vth characteristic compensation of the driving transistor (for example, the sixth transistor (T6)) arranged in the second pixel driving circuit 430 (for example, the CCG block) in every duty driving.

In the electronic device to which the pixels 400 including the pixel driving circuits 420 and 430 and the micro LED 410 are applied according to an embodiment of the disclosure, numbers of initializations and Vth characteristic compensation operations of the driving transistor (for example, the third transistor (T3)) arranged in the first driving circuit 420 (for example, the PWM signal block) and the driving transistor (for example, the sixth transistor (T6)) arranged in the second pixel driving circuit 430 (for example, the CCG block) per frame may be different.

The electronic device to which the pixels 400 including the pixel driving circuits 420 and 430 and the micro LED 410 are applied according to an embodiment of the disclosure may maintain the Vth characteristic compensation value of the driving transistor (for example, the sixth transistor (T6)) arranged in the second pixel driving circuit 430 (for example, the CCG block). To this end, the capacity of the second capacitor (C2) may be formed to be two times or more larger than the capacity of the first capacitor (C1) electrically connected to the drain terminal of the driving transistor (for example, the third transistor (T3) arranged in the first pixel driving circuit 420 (for example, the PWM signal block).

FIG. 23 is a diagram illustrating comparison between the operation result of pixels of the electronic device of the disclosure and the operation result of pixels in a comparative example according to an embodiment of the disclosure.

Figure 24:
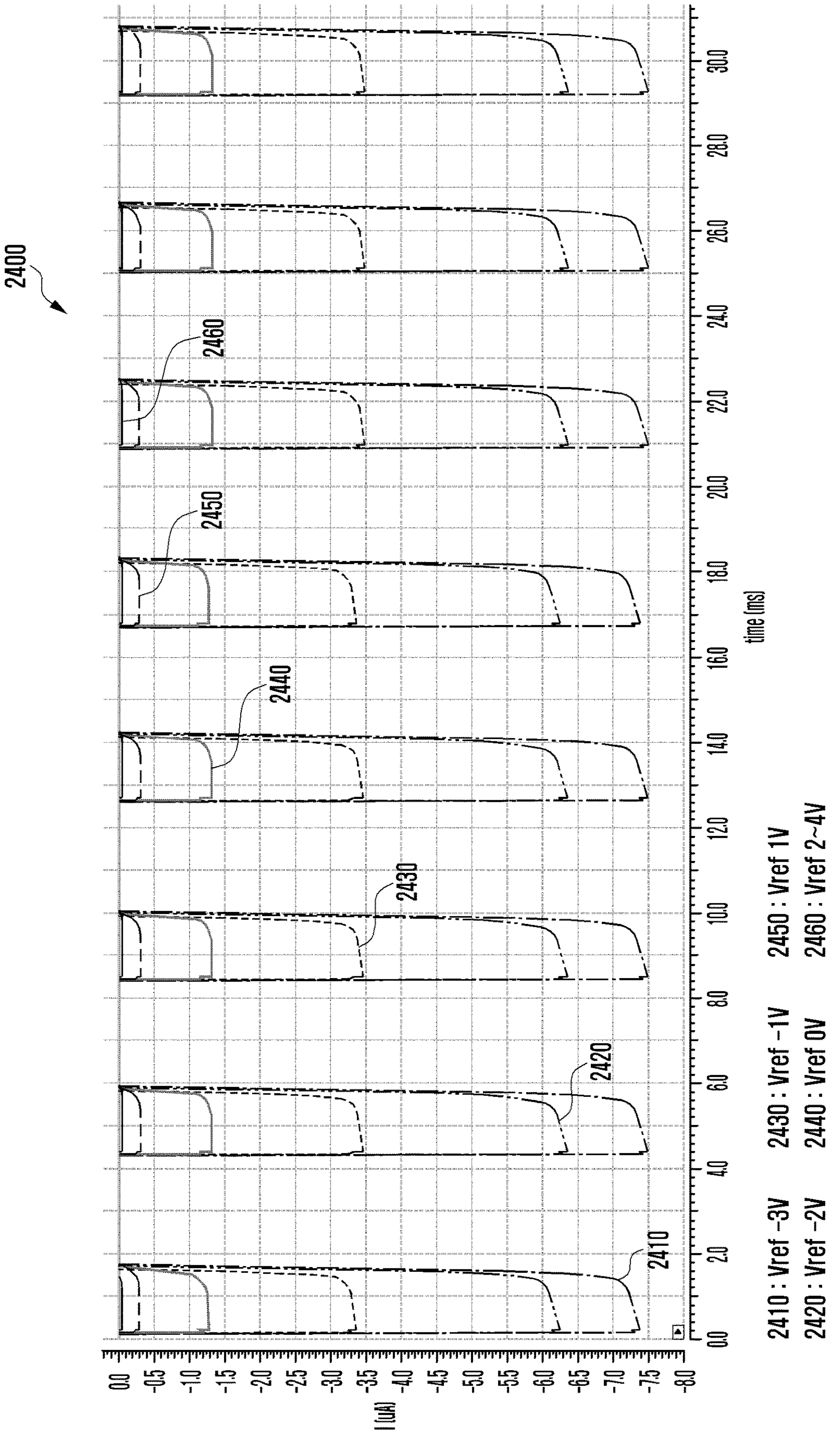
FIG. 24 is a diagram illustrating waveforms of the operation result of pixels of the electronic device according to an embodiment of the disclosure.

FIG. 24 is a diagram 2400 illustrating waveforms of the operation result of pixels of the electronic device according to an embodiment of the disclosure.

Figure 25:
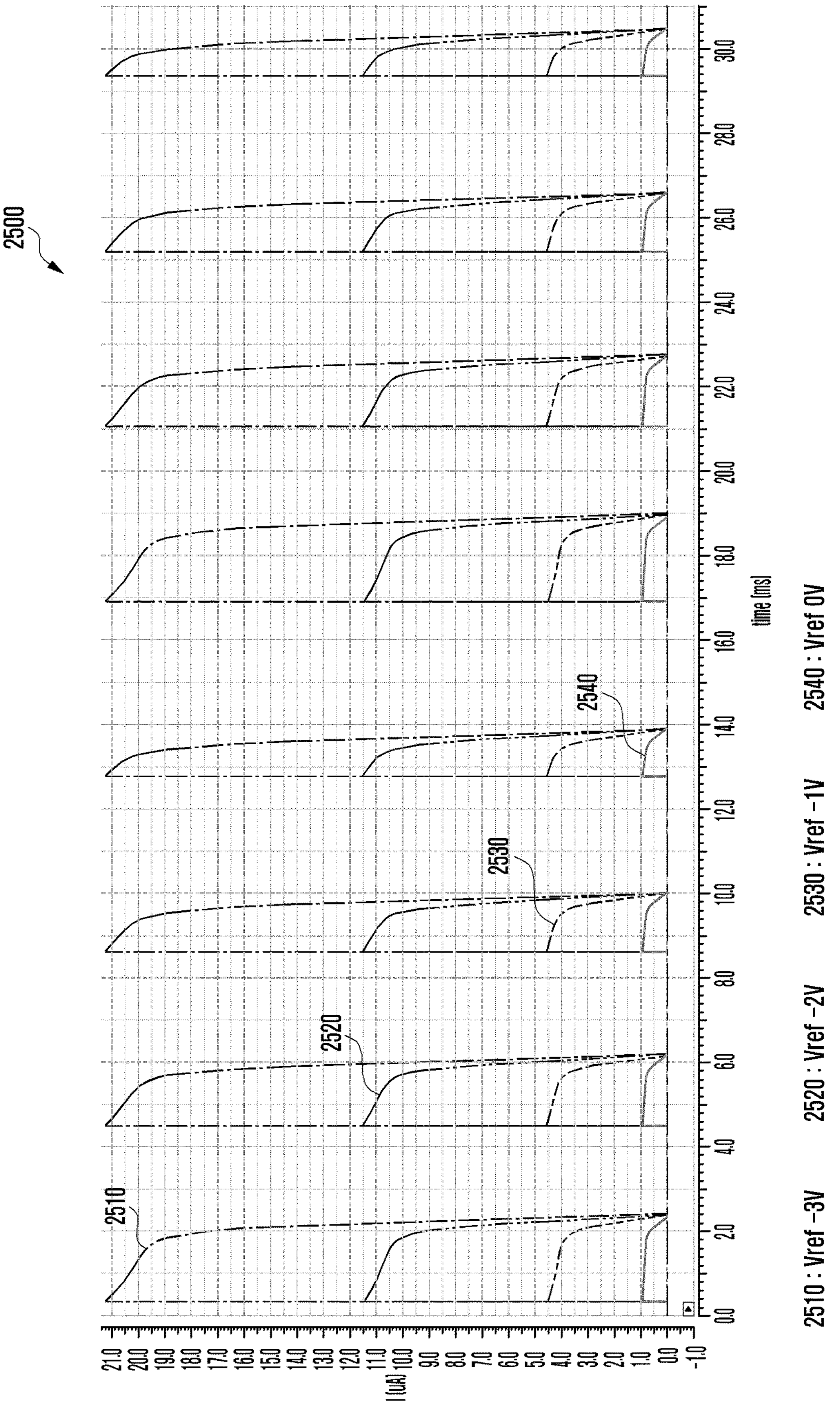
FIG. 25 is a diagram illustrating comparison with the operation result of pixels in the comparative example according to an embodiment of the disclosure.

FIG. 25 is a diagram 2500 illustrating comparison with the operation result of pixels in the comparative example according to an embodiment of the disclosure.

Referring to FIGS. 23 to 25, when the compensation voltage (Vref) is changed to −3V, −2V, −1V, 0V, 1V, 2V, 3V, or 4V during the operation of pixels (for example, the pixels 400 of FIG. 4) of the electronic device of the disclosure, it may be identified that the luminance of the micro LED (or OLED) is normally controlled. As an example, in FIG. 24, reference numeral 2410 indicates a waveform in the case where the compensation voltage (Vref) is −3 V, reference numeral 2420 indicates a waveform in the case where the compensation voltage (Vref) is −2V, reference numeral 2430 indicates a waveform in the case where the compensation voltage (Vref) is −1 V, reference numeral 2440 indicates a waveform in the case where the compensation voltage (Vref) is 0 V, reference number 2450 indicates a waveform in the case where the compensation voltage (Vref) is 1 V, and reference numeral 2460 indicates a waveform in the case where the compensation voltage (Vref) is 2 to 4 V. As an example, in FIG. 25, reference numeral 2510 indicates a waveform in the case where the compensation voltage (Vref) is −3 V, reference numeral 2520 indicates a waveform in the case where the compensation voltage (Vref) is −2 V, reference numeral 2530 indicates a waveform in the case where the compensation voltage (Vref) is −1 V, and reference numeral 2540 indicates a waveform in the case where the compensation voltage (Vref) is 0 V.

In comparison between the operation result of the pixels 400 of the electronic device of the disclosure and the operation result of pixels (9TR-2Cap) in the comparative example, it may be identified that while the luminance of the micro LED (or OLED) is normally controlled in the pixels 400 of the electronic device of the disclosure, the luminance of the micro LED (or OLED) is not normally maintained in the comparative example.

FIG. 26 is a diagram illustrating that the grayscale of the micro LED (or OLED) is normally controlled when the pixels of the electronic device operate according to an embodiment of the disclosure.

Figure 27:
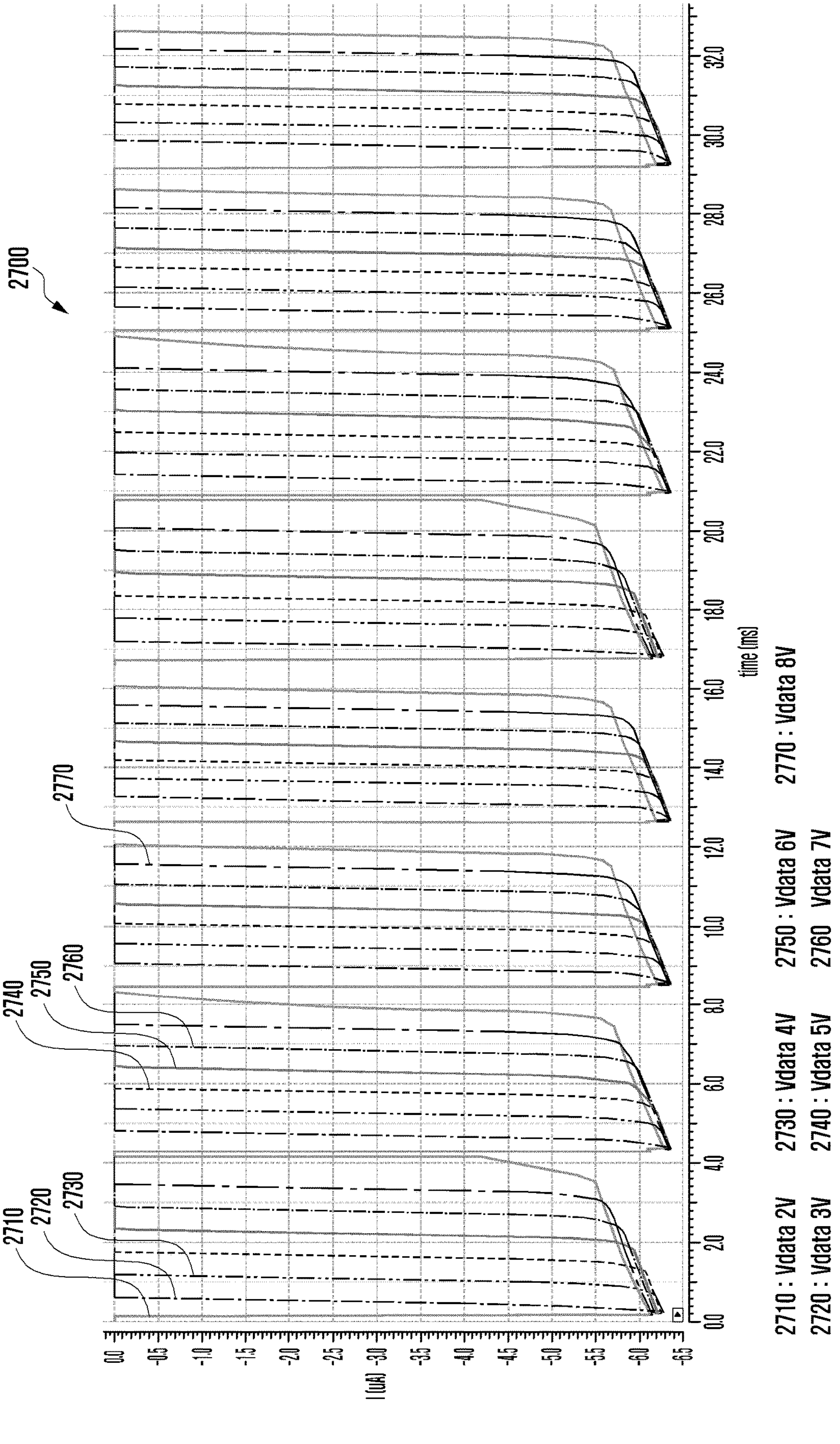
FIG. 27 is a diagram illustrating waveforms of the operation result of pixels of the electronic device according to an embodiment of the disclosure.

FIG. 27 is a diagram 2700 illustrating waveforms of the operation result of pixels of the electronic device according to an embodiment of the disclosure.

Figure 28:
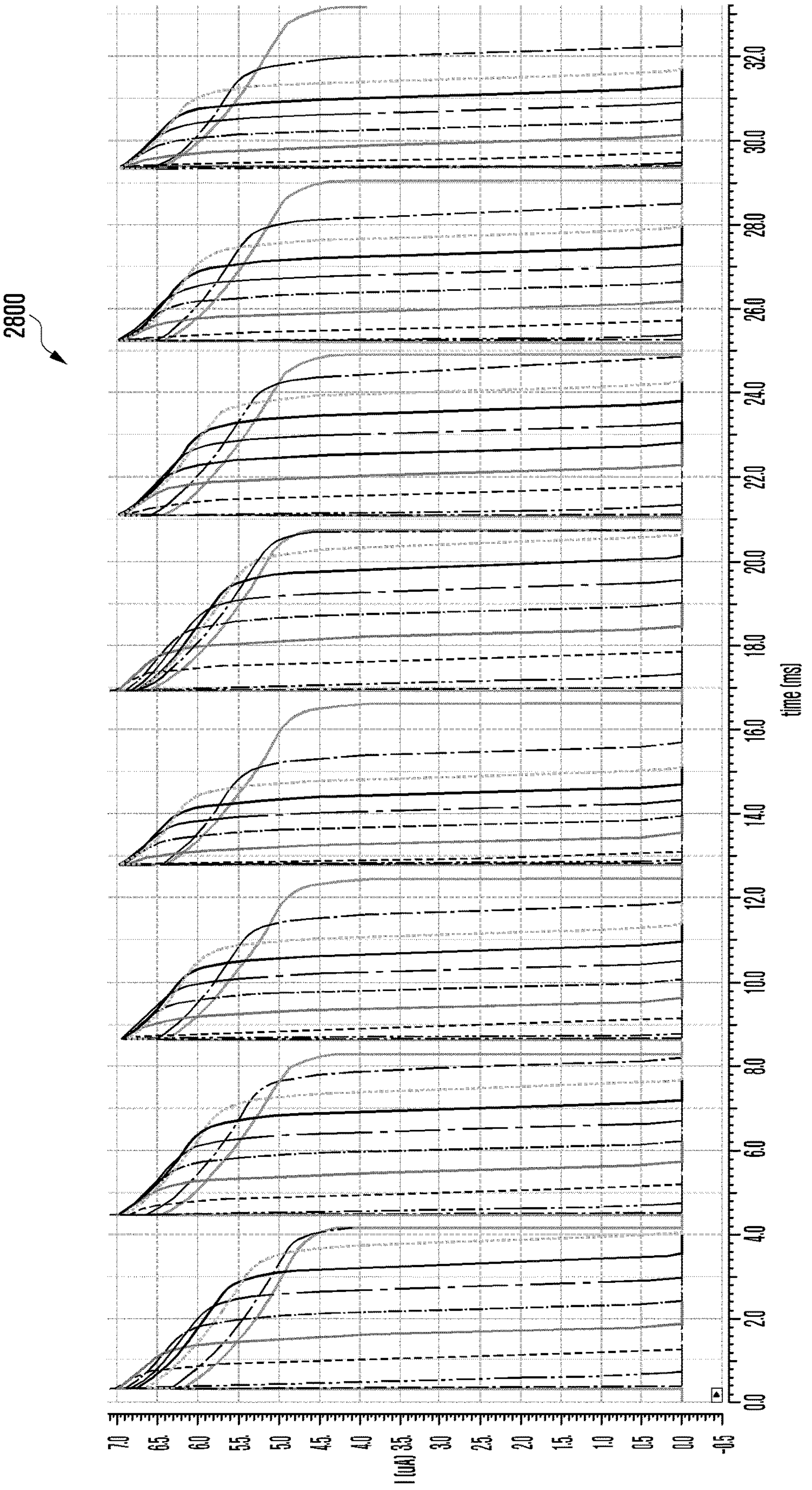
FIG. 28 is a diagram illustrating comparison with the operation result of pixels in the comparative example according to an embodiment of the disclosure.

FIG. 28 is a diagram 2800 illustrating comparison with the operation result of pixels in the comparative example according to an embodiment of the disclosure.

Referring to FIGS. 26 to 28, during the operation of the pixels (for example, the pixels 400 of FIG. 4) of the electronic device of the disclosure, when the compensation voltage (Vref) is supplied with −2 V and the data (for example, grayscale data) voltage (Vdata) is supplied with 2 to 8 V, it may be identified that a target current value is maintained as 6.3 uA and thus the luminance of the micro LED (or OLED) is normally controlled.

Referring to FIG. 27, reference numeral 2710 indicates a waveform in the case where the data (for example, grayscale data) voltage (Vdata) is 2 V, reference numeral 2720 indicates a waveform in the case where data (for example, grayscale data) voltage (Vdata) is 3 V, reference numeral 2730 indicates a waveform in the case where the data (for example, grayscale data) voltage (Vdata) is 4 V, reference numeral 2740 is a waveform in the case where the data (for example, grayscale data) voltage (Vdata) is 5 V, reference numeral 2750 indicates a waveform in the case where the data (for example, grayscale data) voltage (Vdata) is 6 V, reference numeral 2760 is a waveform in the case where the data (for example, grayscale data) voltage (Vdata) is 7 V, and reference numeral 2770 indicates a waveform in the case where the data (for example, grayscale data) voltage (Vdata) is 8 V.

In comparison between the operation result of the pixels 400 of the electronic device of the disclosure and the operation result of the pixels (9TR-2Cap) in the comparative example, it may be identified that while the luminance of the micro LED (or OLED) is normally controlled in the pixels 400 of the electronic device of the disclosure, the luminance of the micro LED (or OLED) is not normally maintained in the comparative example.

FIG. 29 is a diagram illustrating a Vth characteristic compensation value of the driving transistor (for example, the third transistor (T3)) when the pixels of the electronic device operate according to an embodiment of the disclosure.

Figure 30:
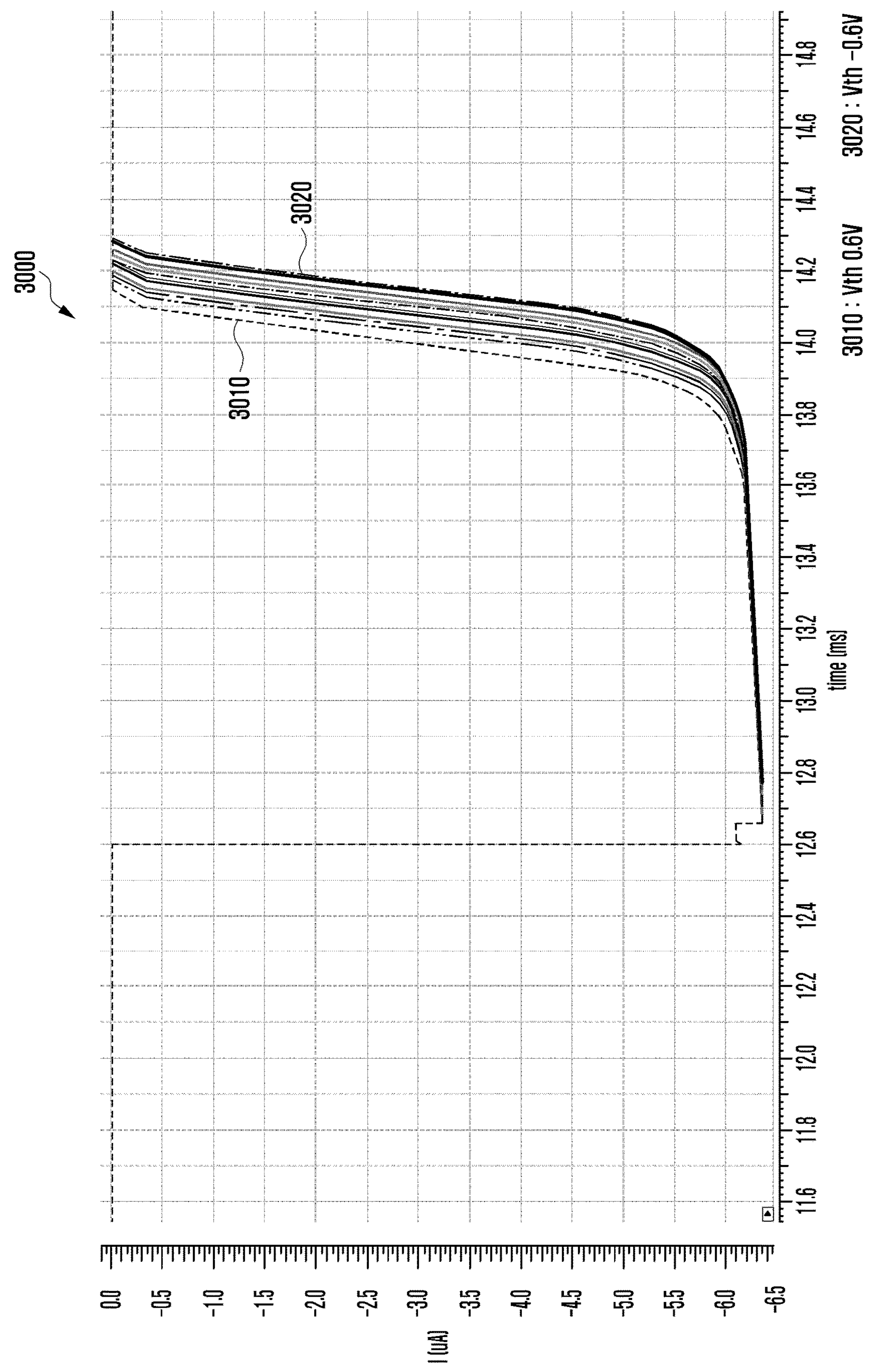
FIG. 30 is a diagram illustrating waveforms of the operation results for Vth characteristic compensation of the driving transistor (for example, the third transistor (T3)) when pixels of the electronic device operate according to an embodiment of the disclosure.

FIG. 30 is a diagram 3000 illustrating waveforms of the operation result for Vth characteristic compensation of the driving transistor (for example, the third transistor (T3)) when the pixels of the electronic device operate according to an embodiment of the disclosure.

FIG. 31 is a diagram illustrating a Vth characteristic compensation value of the driving transistor when the pixels of the comparative example operate according to an embodiment of the disclosure.

Figure 32:
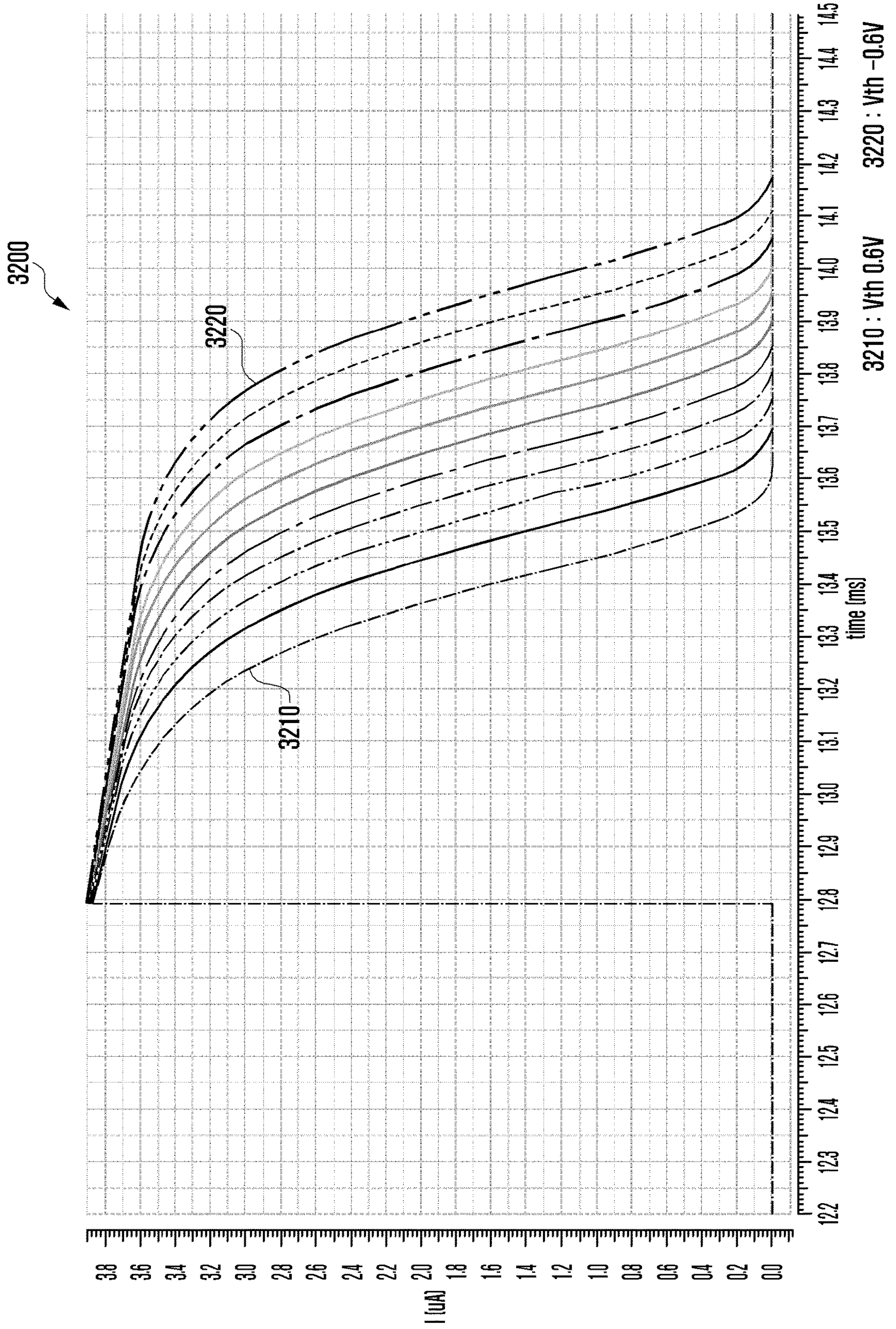
FIG. 32 is a diagram illustrating waveforms of the operation result for Vth characteristic compensation of the driving transistor in the comparative example according to an embodiment of the disclosure.

FIG. 32 is a diagram 3200 illustrating waveforms of the operation result for Vth characteristic compensation of the driving transistor in the comparative example according to an embodiment of the disclosure.

Referring to FIGS. 29 to 32, it may be identified that there is difference in a maximum of Vth deviation equal to or lower than 0.3% as the result of identifying the Vth deviation of the driving transistor (for example, the third transistor (T3)) arranged in the first pixel driving circuit 420 (for example, the signal block), an average current (I_Avg), and a deviation (del %) when the pixels (for example, the pixels 400 of FIG. 4) of the electronic device of the disclosure operate. On the other hand, in the comparative example, it may be identified that there is difference in a maximum of Vth deviation corresponding to 8.1% as the result of identifying the Vth deviation of the driving transistor, the average current (I_Avg), and the deviation (del %). As an example, in FIG. 30, reference numeral 3010 indicates a waveform in the case there the Vth deviation of the driving transistor (for example, the third transistor (T3)) is 0.6 V, and reference numeral 3020 indicates a waveform in the case where the Vth deviation of the driving transistor (for example, the third transistor (T3)) is −0.6 V. As an example, in FIG. 32, reference numeral 3210 indicates a waveform in the case where the Vth deviation of the driving transistor in the comparative example is 0.6 V, and reference numeral 3220 indicates a waveform in the case where the Vth deviation of the driving transistor in the comparative example is −0.6 V. Accordingly, the Vth deviation of the pixels (for example, the pixels 400 of FIG. 4) of the electronic device of the disclosure is smaller than that of the pixels in the comparative example, and thus the display quality of the display can be improved.

FIG. 33 is a diagram illustrating a Vth characteristic compensation value of the driving transistor (for example, the sixth transistor (T6)) when the pixels of the electronic device operate according to an embodiment of the disclosure.

Figure 34:
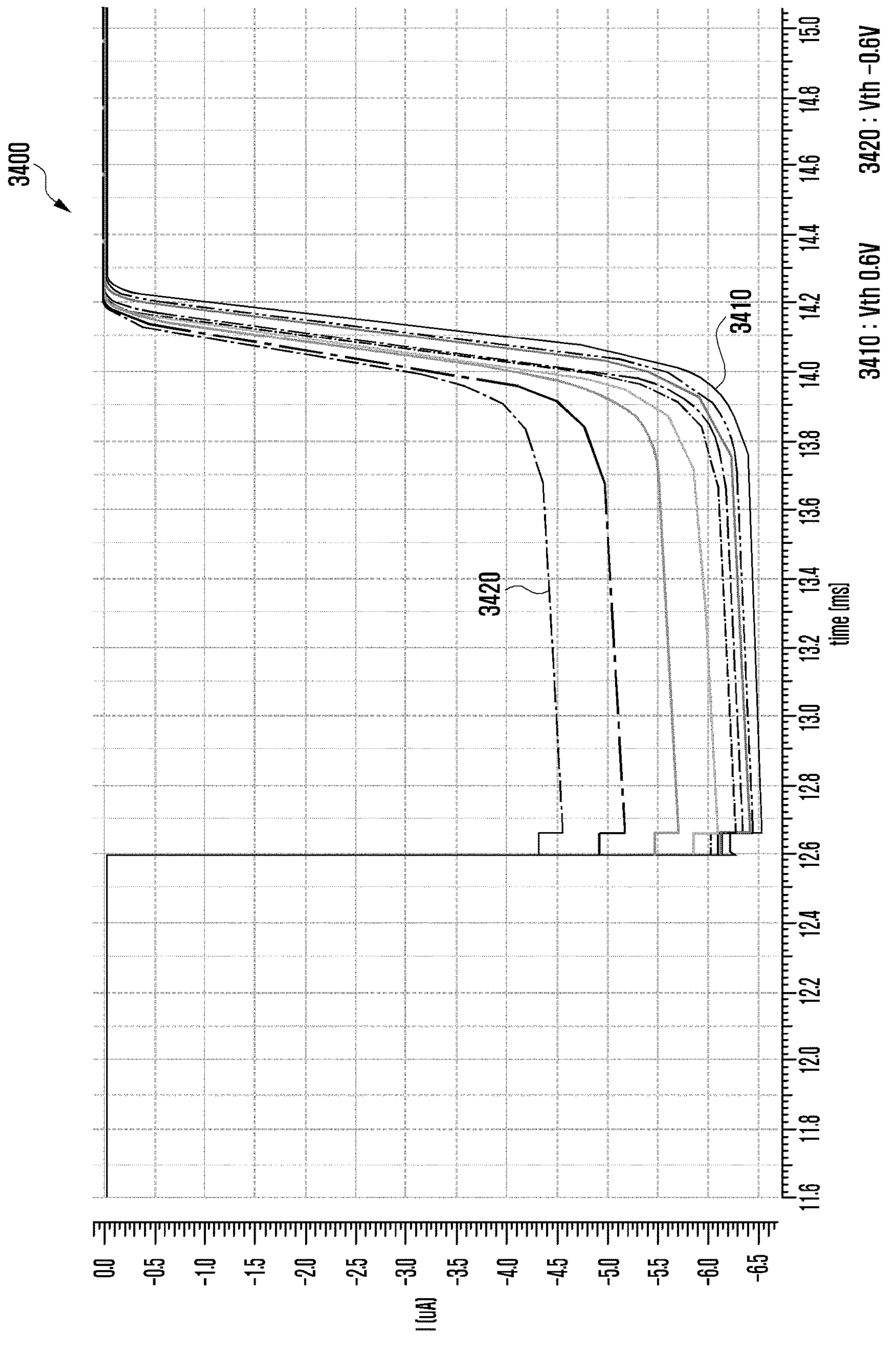
FIG. 34 is a diagram illustrating waveforms of the operation result for Vth characteristic compensation of the driving transistor (for example, the sixth transistor (T6)) when the pixels of the electronic device operate according to an embodiment of the disclosure.

FIG. 34 is a diagram 3400 illustrating waveforms of the operation result for Vth characteristic compensation of the driving transistor (for example, the sixth transistor (T6)) when the pixels of the electronic device operate according to an embodiment of the disclosure.

FIG. 35 is a diagram illustrating a Vth characteristic compensation value of the driving transistor when the pixels in the comparative example operate according to an embodiment of the disclosure.

Figure 36:
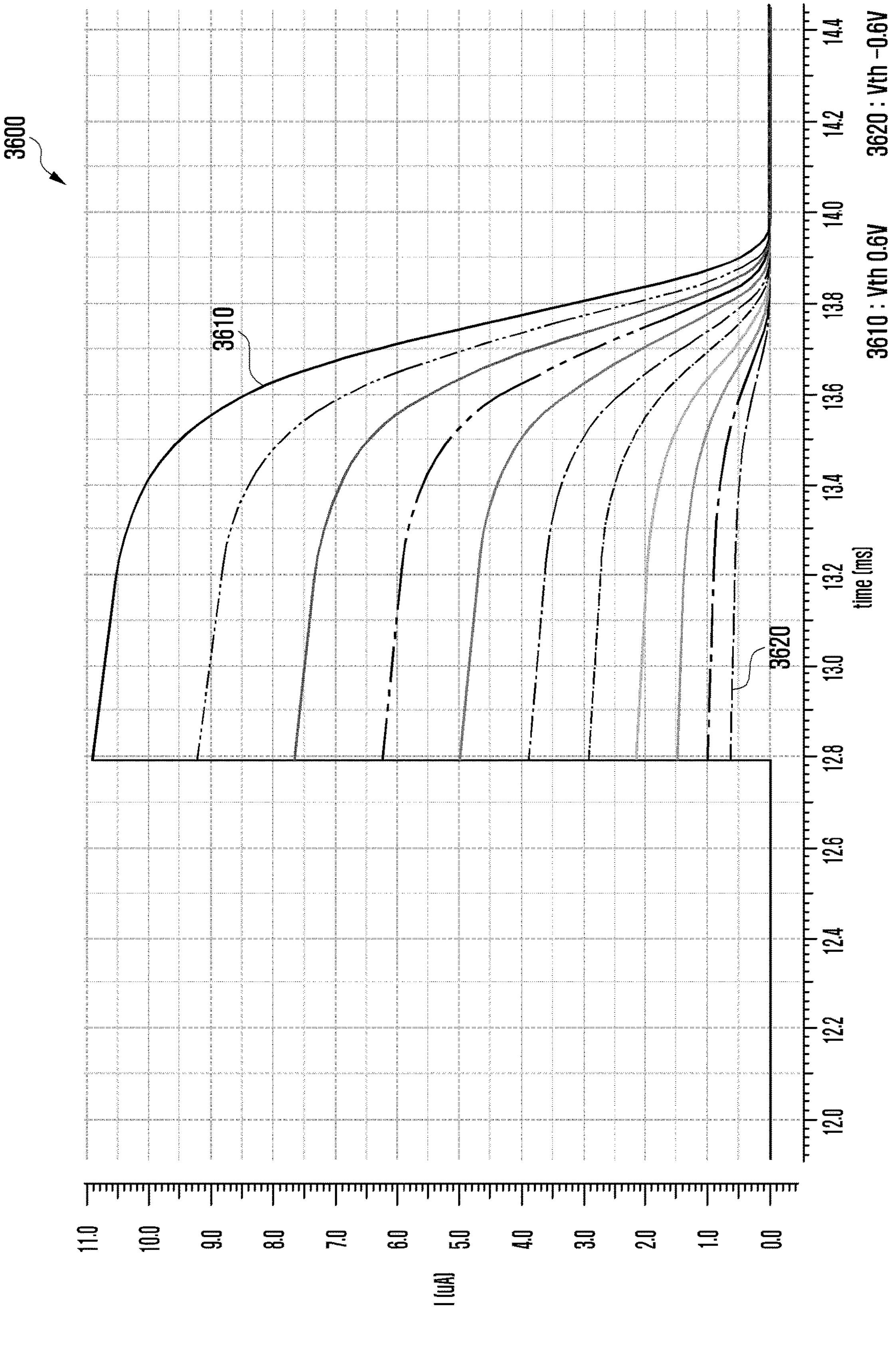
FIG. 36 is a diagram illustrating waveforms of the operation result for Vth characteristic compensation of the driving transistor in the comparative example according to an embodiment of the disclosure.

FIG. 36 is a diagram 3600 illustrating waveforms of the operation result for Vth characteristic compensation of the driving transistor in the comparative example according to an embodiment of the disclosure.

Referring to FIGS. 33 to 36, it may be identified that there is difference in a maximum of Vth deviation equal to or lower than 12% as the result of identifying the Vth deviation of the driving transistor (for example, the sixth transistor (T6)) arranged in the second pixel driving circuit 430 (for example, the CCG block), an average current (I_Avg), and a deviation (del %) when the pixels (for example, the pixels 400 of FIG. 4) of the electronic device of the disclosure operate. On the other hand, in the comparative example, it may be identified that there is difference in a maximum of Vth deviation corresponding to 63% as the result of identifying the Vth deviation of the driving transistor, the average current (I_Avg), and the deviation (del %). As an example, in FIG. 34, reference numeral 3410 indicates a waveform in the case there the Vth deviation of the driving transistor (for example, the sixth transistor (T6)) is 0.6 V, and reference numeral 3420 indicates a waveform in the case where the Vth deviation of the driving transistor (for example, the sixth transistor (T6)) is −0.6 V. As an example, in FIG. 36, reference numeral 3610 indicates a waveform in the case where the Vth deviation of the driving transistor in the comparative example is 0.6 V, and reference numeral 3620 indicates a waveform in the case where the Vth deviation of the driving transistor in the comparative example is −0.6 V. Accordingly, the Vth deviation of the pixels (for example, the pixels 400 of FIG. 4) of the electronic device of the disclosure is smaller than that of the pixels in the comparative example, and thus the display quality of the display can be improved.

Figure 37:
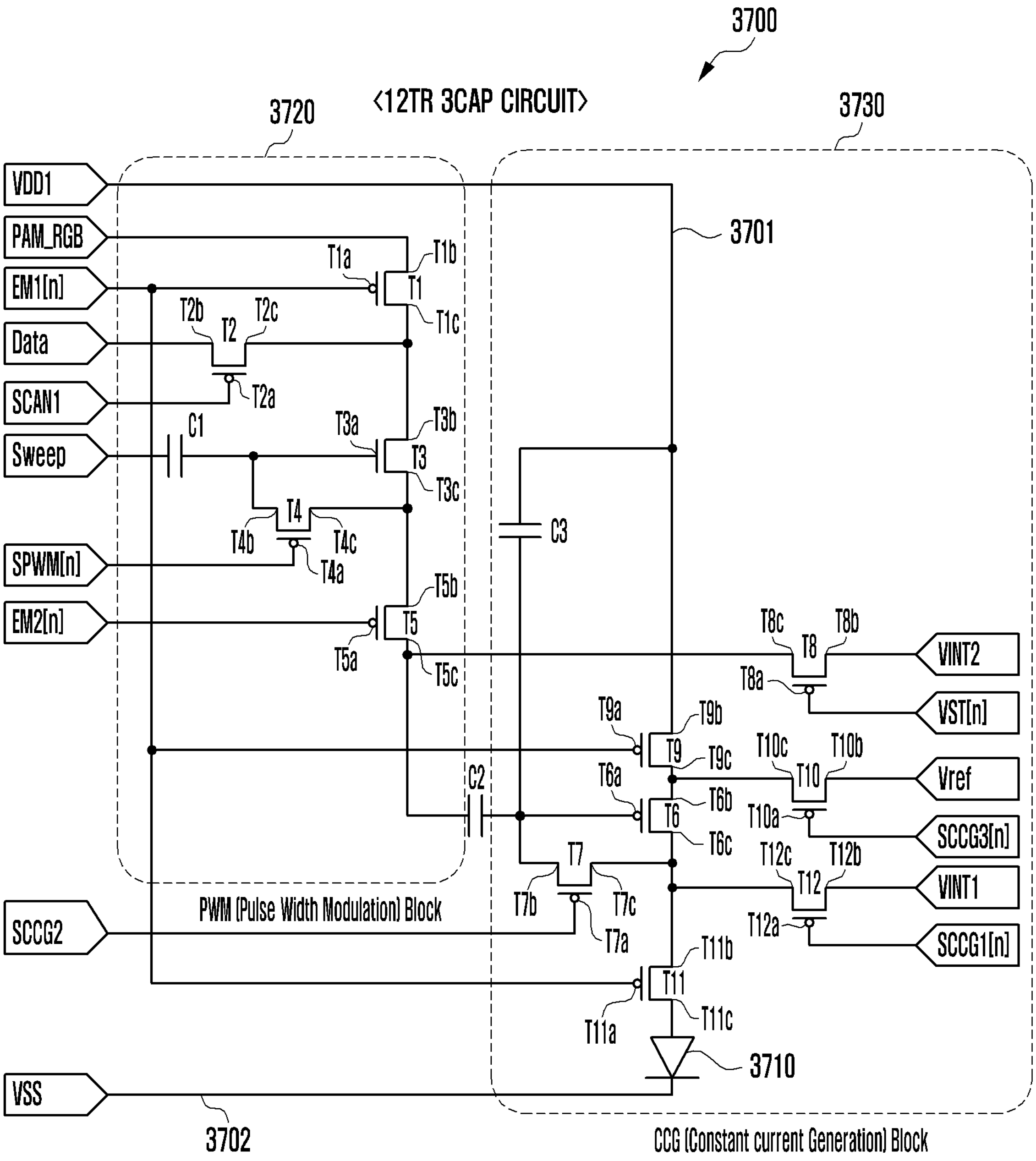
FIG. 37 is a circuit diagram illustrating pixel driving circuits of each pixel according to an embodiment of the disclosure.

FIG. 37 is a circuit diagram illustrating pixel driving circuits of each pixel according to an embodiment of the disclosure.

Referring to FIGS. 3 and 37, each of a plurality of pixels 3700 according to an embodiment may include pixel driving circuits 3720 and 3730 and a micro LED 3710 (or OLED). As an example, the pixel driving circuits 3720 and 3730 may include a first pixel driving circuit 3720 and a second pixel driving circuit 3730 for driving the micro LED 3710. As an embodiment, the plurality of pixels 3700 may operate in the structure from non-light emission to light emission (non-light emission→light emission).

According to an embodiment, the first pixel driving circuit 3720 (for example, a pulse width modulation (PWM) signal block) may include a plurality of thin film transistors (TFTs) and at least one capacitor. The first pixel driving circuit 3720 may generate a PWM signal for controlling light emission timing of the micro LED 3710 and supply the PWM signal to the second pixel driving circuit 3730.

According to an embodiment, the second pixel driving circuit 3730 (for example, a constant current generation (CCG) block) may include a plurality of thin film transistors (TFTs) and at least one capacitor. The second pixel driving circuit 3730 may apply the input light-emitting signals (EM1 and EM2) and the data voltage (Data) to the micro LED 3710 to light-emit the micro LED 3710 at a grayscale corresponding to the data voltage (Data).

According to an embodiment, the pixel driving circuits 3720 and 3730 of each pixel 3700 may include 12 transistors (T1 to T12) and 3 capacitors (C1, C2, and C3).

According to an embodiment, the first pixel driving circuit 3720 (for example, the PWM signal block) of each pixel 3700 may include a first transistor (T1), a second transistor (T2), a third transistor (T3), a fourth transistor (T4), a fifth transistor (T5), and a first capacitor (C1).

According to an embodiment, the second pixel driving circuit 3730 (for example, the CCG block) of each pixel 3700 may include a sixth transistor (T6), a seventh transistor (T7), an eighth transistor (T8), a ninth transistor (T9), a tenth transistor (T10), an eleventh transistor (T11), a twelfth transistor (T12), a second capacitor (C2), and a third transistor (C3) (for example, a storage capacitor).

According to various embodiments, each of the first transistor (T1) to the twelfth transistor (T12) may be one of the PMOS transistor and the NMOS transistor.

As an example, the first transistor (T1) to the twelfth transistor (T12) may be PMOS transistors in the same polarity type.

As an example, the first transistor to the fifth transistor (T1 to T5) arranged in the first pixel driving circuit 3720 (for example, the PWM signal block) and the sixth transistor to the twelfth transistor (T6 to T12) arranged in the second pixel driving circuit 3730 (for example, the CCG block) may be transistors in different polarity type.

As an example, the first transistor to the fifth transistor (T1 to T5) arranged in the first pixel driving circuit 3720 (for example, the PWM signal block) may be NMOS transistors.

As an example, the sixth transistor to the twelfth transistor (T6 to T12) arranged in the second pixel driving circuit 3730 (for example, the CCG block) may be PMOS transistors.

As another example, the first transistor to the fifth transistor (T1 to T5) arranged in the first pixel driving circuit 3720 (for example, the PWM signal block) may be PMOS transistors.

As another example, the sixth transistor to the twelfth transistor (T6 to T12) arranged in the second pixel driving circuit 3730 (for example, the CCG block) may be NMOS transistors.

According to various embodiments, the first transistor (T1) to the twelfth transistor (T12) may be implemented as one of a low temperature poly silicon (LTPS) TFT, an oxide TFT, or a low temperature polycrystalline oxide (LTPO) TFT.

According to an embodiment, a first terminal (T1*a*) of the first transistor (T1) of the first pixel driving circuit 3720 (for example, the PWM signal block) may be electrically connected to a first light-emitting signal line to which a first light-emitting signal (EM1[*n*]) is supplied. A second terminal (T1*b*) of the first transistor (T1) may be electrically connected to a PAM_RGB signal line. A third terminal (Tic) of the first transistor (T1) may be electrically connected to a third terminal (T2*c*) of the second transistor (T2) and a second terminal (T3*b*) of the third transistor (T3). As an embodiment, the first light-emitting signal (EM1[*n*]) may be supplied to the first terminal (T1*a*) of the first transistor (T1). The PAM_RGB signal may be supplied to the second terminal (T1*b*) of the first transistor (T1).

As an embodiment, the first transistor (T1) may block a PAM_RGB voltage in order to transfer a data signal (for example, grayscale data) input through the data line to a node (for example, a gate node of T3) of a first terminal (T3*a*) of the third transistor (T3).

According to an embodiment, a first terminal (T2*a*) of the second transistor (T2) of the first pixel driving circuit 3720 (for example, the PWM signal block) may be electrically connected to a first signal line to which a first scan signal (scan[n]) is supplied. A second terminal (T2*b*) of the second transistor (T2) may be electrically connected to the data line to which the data signal is supplied. The third terminal (T2*c*) of the second transistor (T2) may be electrically connected to the third terminal (Tic) of the first transistor (T1) and the second terminal (T3*b*) of the third transistor (T3).

As an embodiment, the second transistor (T2) may enable the data signal (for example, grayscale data) input through the data line to be selected for each line. The second transistor (T2) may supply the data signal (for example, grayscale data) to the third transistor (T3).

According to an embodiment, the first terminal (T3*a*) of the third transistor (T3) of the first pixel driving circuit 3720 (for example, the PWM signal block) may be electrically connected to a second terminal of the first capacitor (C1) and a second terminal (T4*b*) of the fourth transistor (T4). The second terminal (T3*b*) of the third transistor (T3) may be electrically connected to the third terminal (T1*c*) of the first transistor (T1) and the third terminal (T2*c*) of the second transistor (T2). A third terminal (T3*c*) of the third transistor (T3) may be electrically connected to a third terminal (T4*c*) of the fourth transistor (T4), a second terminal (T5*b*) of the fifth transistor (T5), a third terminal (T8*c*) of the eighth transistor (T8), and a first terminal of the second capacitor (C2). A sweep signal (for example, the sweep signal of FIG. 6) may be supplied to the first terminal (T3*a*) of the third transistor (T3).

As an embodiment, the third transistor (T3) may operate as a driving transistor of the first pixel driving circuit 3720 (for example, the PWM signal block). The third transistor (T3) may control an amount of current flowing from PAM_RGB to a node of the first terminal of the second capacitor (C2) according to the input data signal (for example, grayscale data).

According to an embodiment, a first terminal (T4*a*) of the fourth transistor (T4) of the first pixel driving circuit 3720 (for example, the PWM signal block) may be electrically connected to a second scan signal line to which a second scan signal (scan PWM(SPWM) signal) is supplied. The second terminal (T4*b*) of the fourth transistor (T4) may be electrically connected to the second terminal of the first capacitor (C1) and the first terminal (T3*a*) of the third transistor (T3). The third terminal (T4*c*) of the fourth transistor (T4) may be electrically connected to the third terminal (T3*c*) of the third transistor (T3) and the second terminal (T5*b*) of the fifth transistor (T5).

As an embodiment, the fourth transistor (T4) may constitute a diode connection circuit with the third transistor (T3) in order to compensate for a Vth characteristic of the third transistor (T3).

According to an embodiment, a first terminal (T5*a*) of the fifth transistor (T5) of the first pixel driving circuit 3720 (for example, the PWM signal block) may be electrically connected to the second light-emitting signal line to which the second light-emitting signal (EM2[*n*]) is supplied. The second terminal (T5*b*) of the fifth transistor (T5) may be electrically connected to the third terminal (T3*c*) of the third transistor (T3) and the third terminal (T4*c*) of the fourth transistor (T4). A third terminal (T5*c*) of the fifth transistor (T5) may be electrically connected to the third terminal (T8*c*) of the eighth transistor (T8) and the first terminal of the second capacitor (C2).

As an embodiment, the fifth transistor (T5) is turned on/off, based on the input second light-emitting signal (EM2[*n*]) and may control the current flowing from the PAM_RGB signal line via the first transistor (T1), the third transistor (T3), the fifth transistor (T5), and the second capacitor (C2).

According to an embodiment, a first terminal of the first capacitor (C1) may be electrically connected to the sweep signal line to which the sweep signal is supplied. T second terminal of the first capacitor (C1) may be electrically connected to the first terminal (T3*a*) of the third transistor (T3) and the second terminal (T4*b*) of the fourth transistor (T4).

As an embodiment, the first capacitor (C1) may operate as a storage capacitor that stores the voltage of the node of the first terminal (T3*a*) of the third transistor (T3) for 1 frame.

Further, the first capacitor (C1) may operate as a coupling capacitor that changes the voltage of the node (for example, the gate node of T3) of the first terminal (T3*a*) of the third transistor (T3) according to the input sweep signal.

According to an embodiment, a first terminal (T6*a*) of the sixth transistor (T6) of the second pixel driving circuit 3730 (for example, the CCG block) may be electrically connected to a second terminal of the second capacitor (C2), a second terminal of the third capacitor (C3) (for example, a storage capacitor), and a second terminal (T7*b*) of the seventh transistor (T7). A second terminal (T6*b*) of the sixth transistor (T6) may be electrically connected to a third terminal (T9*c*) of the ninth transistor (T9) and a third terminal (T10*c*) of the tenth transistor (T10). A third terminal (T6*c*) of the sixth transistor (T6) may be electrically connected to a third terminal (T7*c*) of the seventh transistor (T7), a second terminal (T11*b*) of the eleventh transistor (T11), and a third terminal (T12*c*) of the twelfth transistor (T12).

As an embodiment, the sixth transistor (T6) may operate as a driving transistor of the second pixel driving circuit 3730 (for example, the CCG block). The sixth transistor (T6) may control the current flowing from the VDD line 401 to a VSS line 3702 via the micro LED 3710 (or OLED). That is, the sixth transistor (T6) may control the current flowing in the light emission path to control light emission and grayscale of the micro LED 3710 (or OLED).

According to an embodiment, a first terminal (T7*a*) of the seventh transistor (T7) of the second pixel driving circuit 3730 (for example, the CCG block) may be electrically connected to a second SCCG signal line to which a second scan constant current generation (SCCG) signal (SCCG2[*n*]) is supplied. The second terminal (T7*b*) of the seventh transistor (T7) may be electrically connected to the second terminal of the second capacitor (C2), the second terminal of the third capacitor (C3), and the first terminal (T6*a*) of the sixth transistor (T6). The third terminal (T7*c*) of the seventh transistor (T7) may be electrically connected to the third terminal (T6*c*) of the sixth transistor (T6), the second terminal (T11*b*) of the eleventh transistor (T11), and the third terminal (T12*c*) of the twelfth transistor (T12).

As an embodiment, the seventh transistor (T7) may constitute a diode connection circuit with the sixth transistor (T6) in order to compensate for a Vth characteristic of the sixth transistor (T6).

According to an embodiment, a first terminal (T8*a*) of the eighth transistor (T8) of the second pixel driving circuit 3730 (for example, the CCG block) may be electrically connected to a reset signal line to which a reset signal (VST[n]) is supplied. A second terminal (T8*b*) of the eighth transistor (T8) may be electrically connected to a second initialization voltage signal line to which a second initialization voltage signal (VINT2) is supplied. The third terminal (T8*c*) of the eighth transistor (T8) may be electrically connected to the third terminal (T5*c*) of the fifth transistor (T5).

As an embodiment, the eighth transistor (T8) is turned on/off, based on the input reset signal (VST[n]) and may initialize nodes of a gate terminal and a drain terminal of the third transistor (T3) and initialize the second capacitor (C2).

According to an embodiment, a first terminal (T9*a*) of the ninth transistor (T9) of the second pixel driving circuit 3730 (for example, the CCG block) may be electrically connected to the first light-emitting signal line to which the first light-emitting signal (EM1[*n*]) is supplied. A second terminal (T9*b*) of the ninth transistor (T9) may be electrically connected to the VDD line 3701. The third terminal (T9*c*) of the ninth transistor (T9) may be electrically connected to the second terminal (T6*b*) of the sixth transistor (T6) and the third terminal (T10*c*) of the tenth transistor (T10).

As an embodiment, the ninth transistor (T9) is turned on/off, based on the input first light-emitting signal (EM1 [*n*]) and may control the current starting from the VDD line 401 and flowing to the VSS line 3702 via the micro LED 3710, the sixth transistor (T6), and the eleventh transistor (T11). That is, the ninth transistor (T9) may control the current flowing in the light emission path.

According to an embodiment, a first terminal (T10*a*) of the tenth transistor (T10) of the second pixel driving circuit 3730 (for example, the CCG block) may be electrically connected to a third SCCG signal line to which a third scan constant current generation (SCCG) signal (SCCG3[*n*]) is supplied. A second terminal (T10*b*) of the tenth transistor (T10) may be electrically connected to a compensation voltage line to which the compensation voltage (Vref) is supplied. The third terminal (T10*c*) of the tenth transistor (T10) may be electrically connected to the second terminal (T6*b*) of the sixth transistor (T6) and the third terminal (T9*c*) of the ninth transistor (T9).

As an embodiment, the tenth transistor (T10) is turned on/off, based on the third SCCG signal (SCCG3[*n*]) and may supply the compensation voltage (Vref) to a source terminal (for example, the second terminal (T6*b*)) of the sixth transistor (T6) when Vth characteristic compensation is performed.

As an example, the compensation voltage (Vref) for compensating for the Vth characteristic of the sixth transistor (T6) may be input into each of a red pixel, a green pixel, and a blue pixel. As another example, the compensation voltage (Vref) for compensating for the Vth characteristic of the sixth transistor (T6) may be input into the red pixel, the green pixel, and the blue pixel in common.

According to an embodiment, a first terminal (Tl1*a*) of the eleventh transistor (T11) of the second pixel driving circuit 3730 (for example, the CCG block) may be electrically connected to the first light-emitting signal line to which the first light-emitting signal (EM1[*n*]) is supplied. The second terminal (T11*b*) of the eleventh transistor (T11) may be electrically connected to the third terminal (T6*c*) of the sixth transistor (T6), the third terminal (T7*c*) of the seventh transistor (T7), and the first initialization voltage signal line to which the first initialization voltage signal (VINT1) is supplied. The third terminal (T11*c*) of the eleventh transistor (T11) may be electrically connected to an anode terminal of the micro LED 3710.

As an embodiment, the eleventh transistor (T11) is turned on/off, based on the first light-emitting signal (EM1[*n*]) and may control the current flowing from the VDD line 3701 to the VSS line 3702 via the sixth transistor (T6).

According to an embodiment, a first terminal (T12*a*) of the twelfth transistor (T12) of the second pixel driving circuit 3730 (for example, the CCG block) may be electrically connected to the first SCCG signal line to which the first scan constant current generation (SCCG) signal (SCCG1[*n*]) is supplied. A second terminal (T12*b*) of the twelfth transistor (T12) may be electrically connected to the first initialization voltage signal line to which the first initialization voltage signal (VINT1) is supplied. A third terminal (T12*c*) of the twelfth transistor (T12) may be electrically connected to the third terminal (T6*c*) of the sixth transistor (T6), the third terminal (T7*c*) of the seventh transistor (T7), and the second terminal (T11*b*) of the eleventh transistor (T11).

As an embodiment, the twelfth transistor (T12) may initialize the gate node of the sixth transistor (T6) and supply the first initialization voltage (VINT1).

According to an embodiment, the first terminal of the second capacitor (C2) may be electrically connected to the third terminal (T5*c*) of the fifth transistor (T5). The second terminal of the second capacitor (C2) may be electrically connected to the second terminal of the third capacitor (C2), the first terminal (T6*a*) of the sixth transistor (T6), and the second terminal (T7*b*) of the seventh transistor (T7).

As an embodiment, the second capacitor (C2) may be arranged between the first pixel driving circuit 3720 (for example, signal block) and the second pixel driving circuit 3730 (for example, the CCG block). The second capacitor (C2) may couple the voltage of the gate node of the sixth transistor (T6) to convert the sixth transistor (T6) to the on state.

According to an embodiment, a first terminal of the third capacitor (C3) may be electrically connected to the VDD line 3701 to which the VDD voltage is supplied. The second terminal of the third capacitor (C3) may be electrically connected to the second terminal of the second capacitor (C2), the first terminal (T6*a*) of the sixth transistor (T6), and the second terminal (T7*b*) of the seventh transistor (T7).

As an embodiment, the second capacitor (C2) may hold the voltage of the node (for example, the gate node of T6) of the first terminal (T6*a*) of the sixth transistor (T6).

As an embodiment, the third capacitor (C3) may be formed to have capacitance two times or more larger than the first capacitor (C1).

According to various embodiments, the micro LED 3710 may be arranged in an area in which the second pixel driving circuit 3730 (for example, the CCG block) is formed.

As an embodiment, the LED 3710 may be located at one place in the light emission path starting from the VDD line 3701 and continuing to the VSS line 3702 via the ninth transistor (T9), the sixth transistor (T6), and the eleventh transistor (T11).

As an embodiment, the micro LED 3710 may be electrically connected to the eleventh transistor (T11) in the light emission path starting from the VDD line 3701 and continuing to the VSS line 3702 via the ninth transistor (T9), the sixth transistor (T6), and the eleventh transistor (T11) and may be arranged at a location adjacent to the eleventh transistor (T11).

According to an embodiment, the data signal (for example, grayscale data) is a signal for inputting a voltage value according to an image and may be supplied to the second transistor (T2) through the data line (DL).

According to an embodiment, the sweep signal (for example, the sweep signal of FIG. 39) may be a waveform having a triangular shape or a constant slope for the operation of the first pixel driving circuit 3720 (for example, the PWM signal block).

According to an embodiment, the first light-emitting signal (EM1[*n*]) and the second light-emitting signal (EM2[*n*]) may control the light emission path to control light emission and non-light emission conditions of the pixel 3700.

According to an embodiment, the first scan signal (Scan[n]) may be supplied to the second transistor (T2) to select the data signal (for example, grayscale data) for each line.

According to an embodiment, the reset signal (VST[n]) may be input into the eighth transistor (T8) to initialize the gate node of the sixth transistor (T6).

According to an embodiment, the first constant current generation (SCCG) signal (SCCG1[*n*]) may be supplied to the twelfth transistor (T12) to initialize the gate node of the sixth transistor (T6) and may supply the first initialization voltage (VINT1).

According to an embodiment, the second constant current generation (SCCG) signal (SCCG2[*n*]) is supplied to the seventh transistor (T7) when the Vth characteristic of the sixth transistor (T6) is compensated for, and thus the sixth transistor (T6) and the seventh transistor (T7) may constitute a diode connection circuit.

According to an embodiment, the third constant current generation (SCCG) signal (SCCG3[*n*]) may enable the compensation voltage (Vref) to be supplied to the source node (for example, the node of the second terminal (T6*b*)) of the sixth transistor (T6) when the Vth characteristic of the sixth transistor (T6) is compensated for.

According to an embodiment, when the Vth characteristic of the third transistor (T3) is compensated for, the SPWM signal may turn on/off the fourth transistor (T4) and thus enable the third transistor (T3) and the fourth transistor (T4) to operate as a diode connection circuit.

According to an embodiment, a VDD1 signal may be a source power signal of the current supplied to the VDD line 3701 and flowing to the micro LED 3710.

As an embodiment, the VSS may be a low potential power signal of the current used for light emission of the micro LED 3710.

According to an embodiment, the compensation voltage (Vref) may be a reference voltage for compensating for Vth of the sixth transistor (T6). The compensation voltage (Vref) may be separately input into each of the red pixel, the green pixel, and the blue pixel or may be input into the red pixel, the green pixel, and the blue pixel in common.

Figure 38:
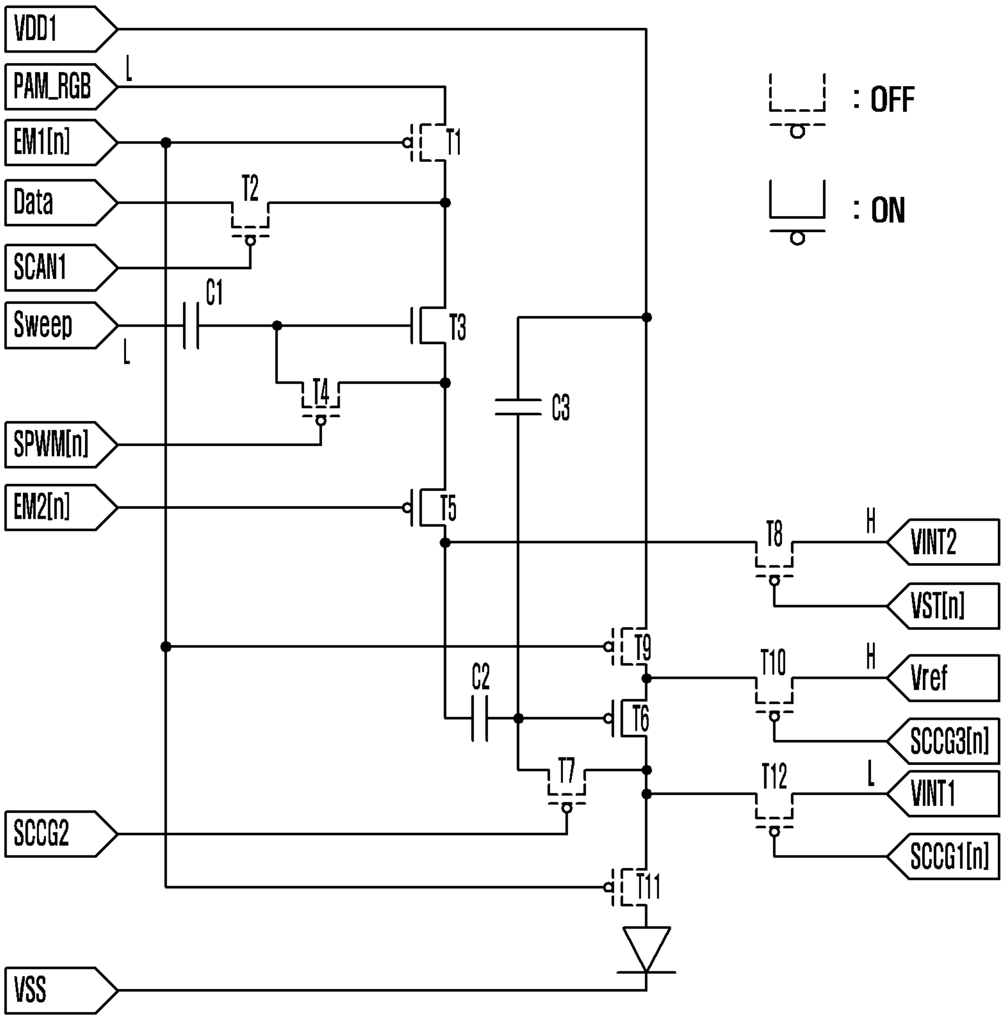
FIG. 38 is a diagram illustrating a method of operating a first period when pixels operate according to an embodiment of the disclosure.

FIG. 38 is a diagram illustrating a method of operating a first period when pixels operate according to an embodiment of the disclosure.

Figure 39:
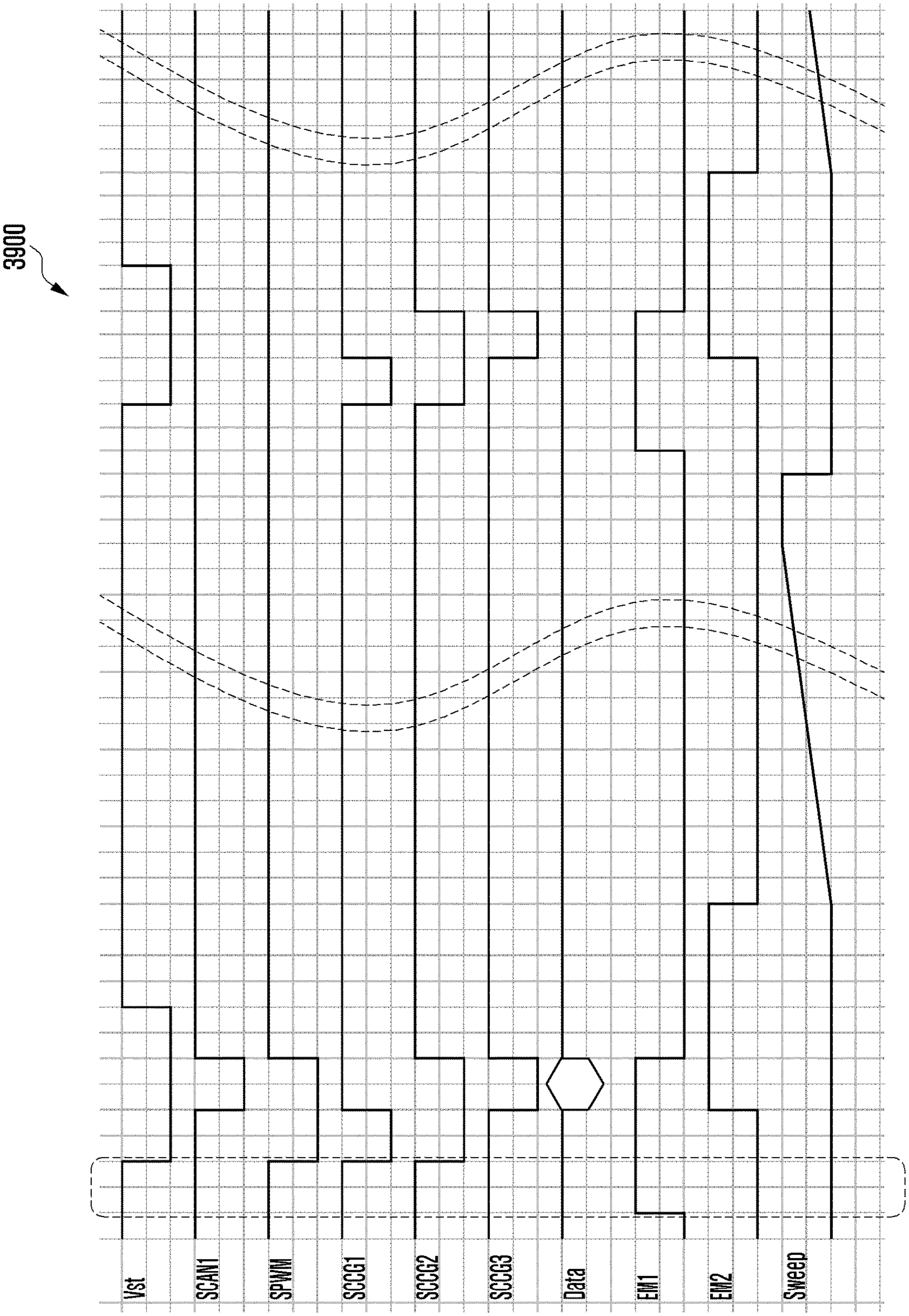
FIG. 39 is a diagram illustrating waveforms input into pixels during the first period according to an embodiment of the disclosure.

FIG. 39 is a diagram 3900 illustrating waveforms input into pixels during the first period according to an embodiment of the disclosure.

Figure 58:
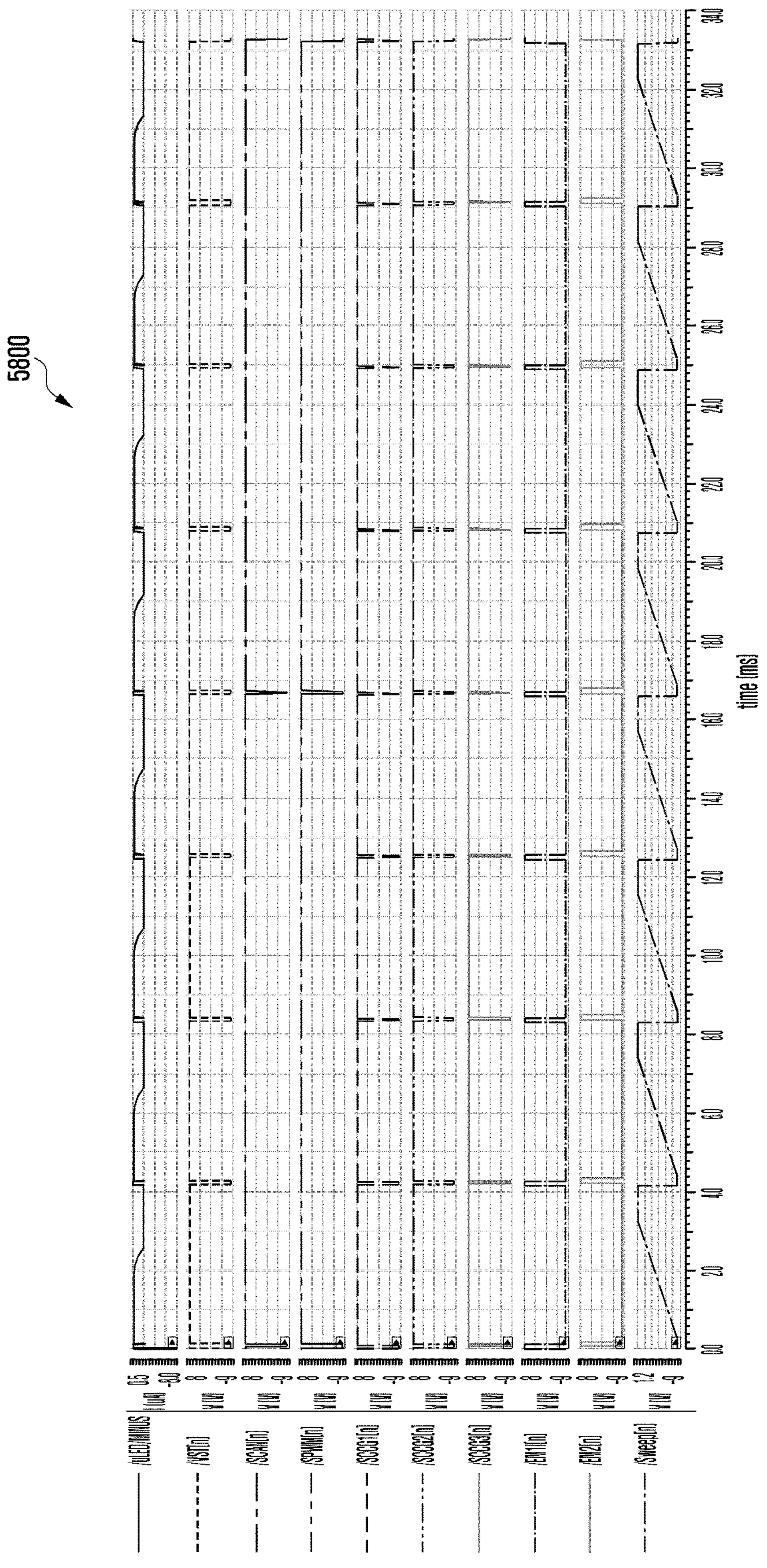
FIG. 58 is a diagram illustrating all waveforms of 2 cycles, as a simulation result of an operation of a pixel driving circuit according to an embodiment of the disclosure.

FIG. 58 is a diagram 5800 illustrating all waveforms of 2 cycles, as a simulation result of an operation of a pixel driving circuit according to an embodiment of the disclosure.

Figure 59:
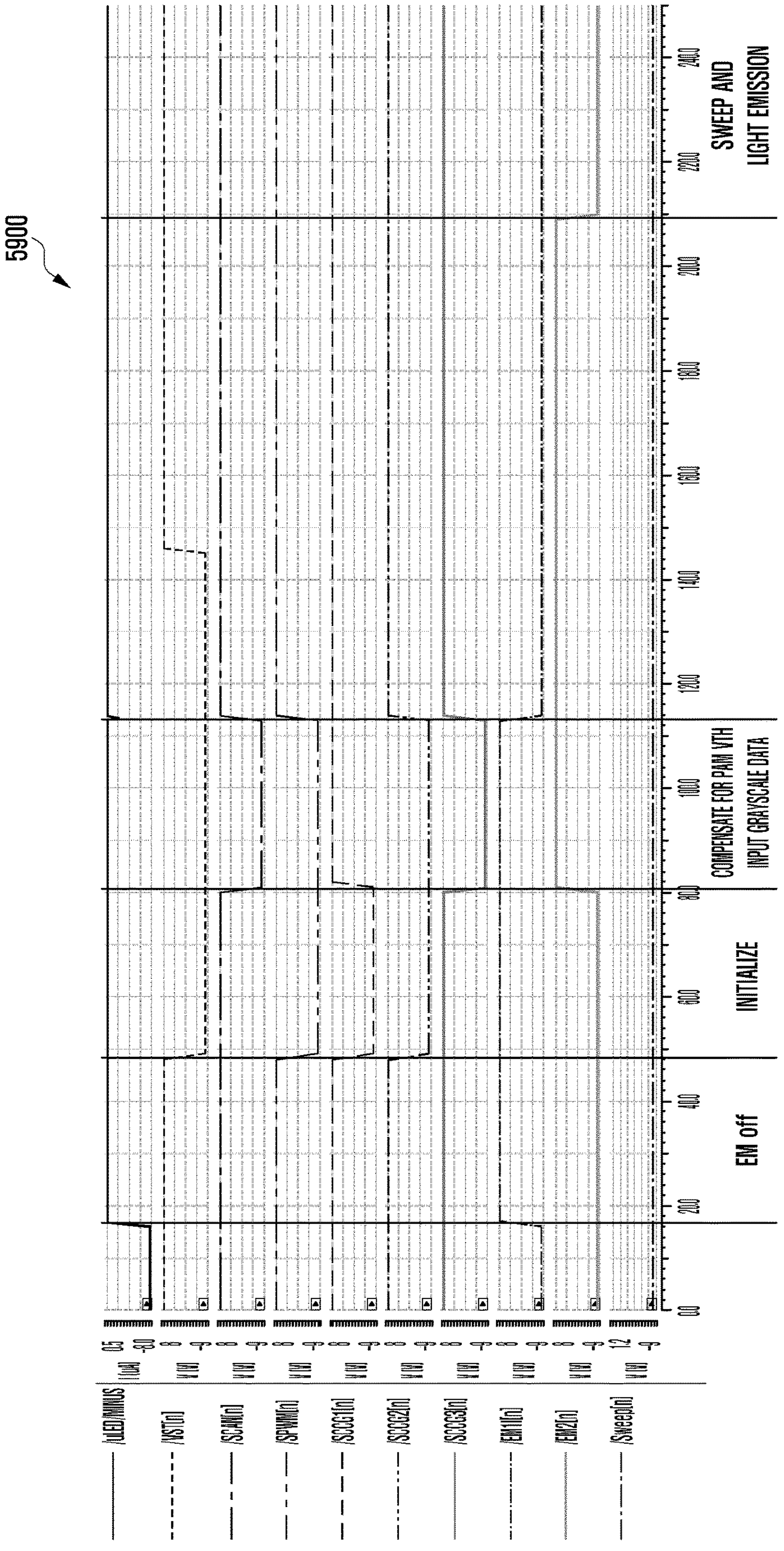
FIG. 59 is a diagram illustrating waveforms of 1 duty, as a simulation result of the operation of the pixel driving circuit according to an embodiment of the disclosure.

FIG. 59 is a diagram 5900 illustrating waveforms of 1 duty, as a simulation result of the operation of the pixel driving circuit according to an embodiment of the disclosure.

Referring to FIGS. 37, 38, 39, 58, and 59, a light emission path may be blocked during the first period in the operation of pixels according to various embodiments of the disclosure.

As an embodiment, during the first period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 39 may be supplied to the pixel driving circuit (for example, the pixel driving circuit 420 or 430 of FIG. 4).

As an embodiment, during the first period, the third transistor (T3), the fifth transistor (T5), and the sixth transistor (T6) may become in the on state. During the first period, the first transistor (T1), the second transistor (T2), the fourth transistor (T4), the seventh transistor (T7), the eighth transistor (T8), the ninth transistor (T9), the tenth transistor (T10), the eleventh transistor (T11), and the twelfth transistor (T12) may become in the off state.

As an embodiment, the first light-emitting signal (EM1 [*n*]) may be supplied with a high voltage and block the current of the light emission path starting from the VDD line 3701 and ending at the VSS line 3702 via the sixth transistor (T6).

Figure 40:
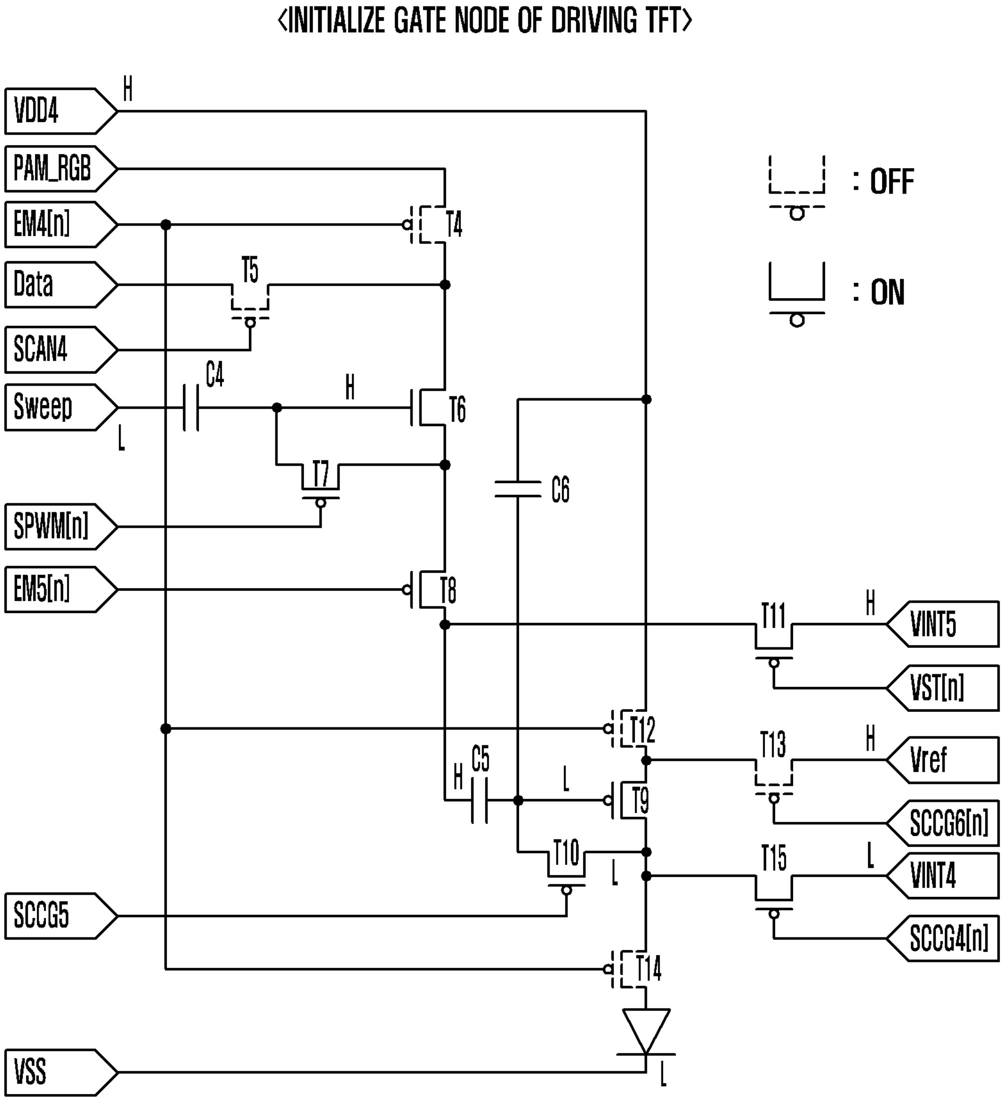
FIG. 40 is a diagram illustrating a method of operating a second period when pixels operate according to an embodiment of the disclosure.

FIG. 40 is a diagram illustrating a method of operating a second period when pixels operate according to an embodiment of the disclosure.

Figure 41:
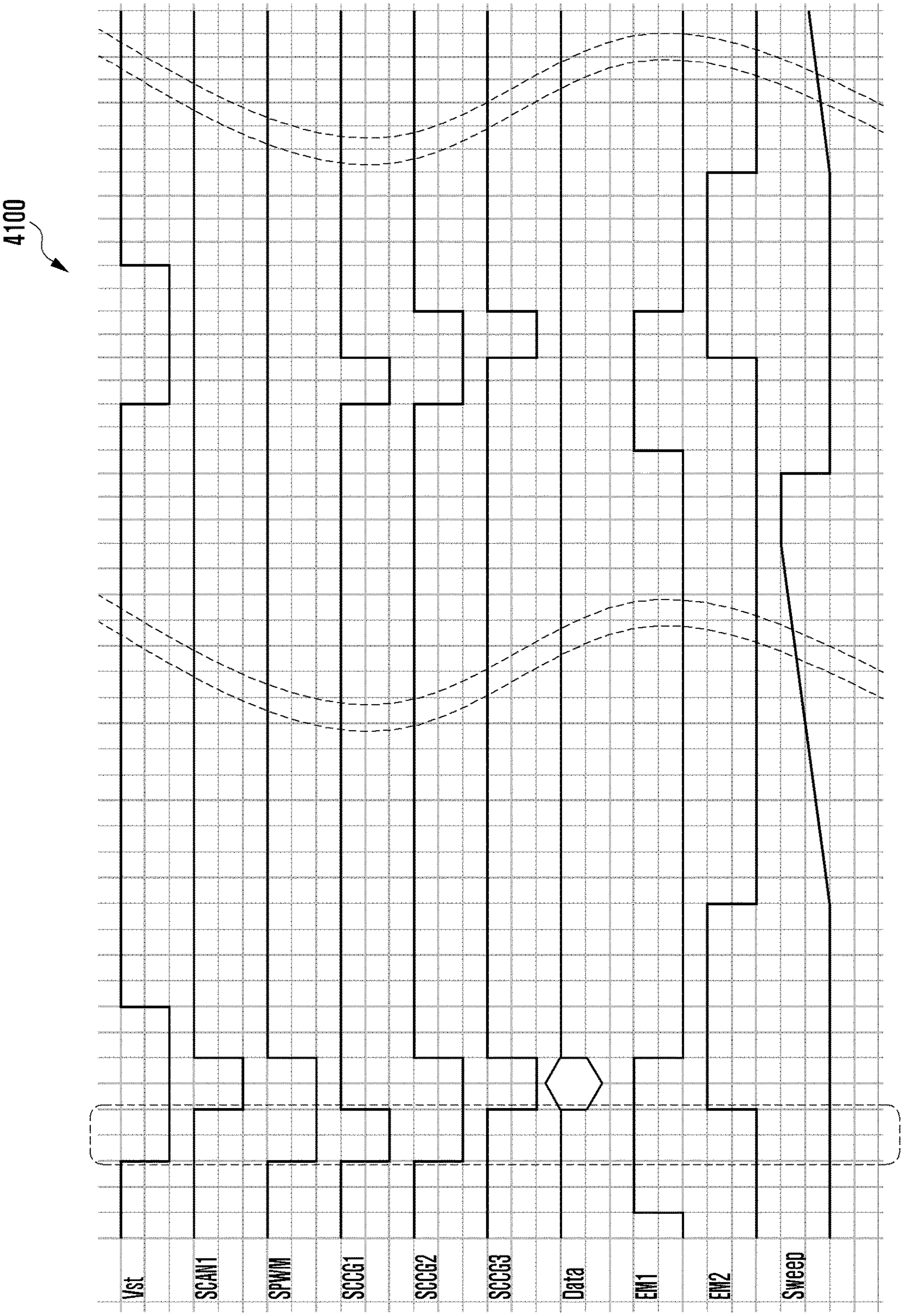
FIG. 41 is a diagram illustrating waveforms input into pixels during the second period according to an embodiment of the disclosure.

FIG. 41 is a diagram 4100 illustrating waveforms input into pixels during the second period according to an embodiment of the disclosure.

Referring to FIGS. 37, 40, 41, 58, and 59, during the second period in the operation of pixels according to various embodiments of the disclosure, the gate node of the third transistor (T3) corresponding to the driving transistor of the first pixel driving circuit 3720 (for example, the PWM signal block) and the gate node of the sixth transistor (T6) corresponding to the driving transistor of the second pixel driving circuit 3730 (for example, the CCG block) may be initialized.

As an embodiment, during the second period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 41 may be supplied to the pixel driving circuit (for example, the pixel driving circuit 420 or 430 of FIG. 4).

As an embodiment, during the second period, the third transistor (T3), the fourth transistor (T4), the fifth transistor (T5), the sixth transistor (T6), the seventh transistor (T7), the eighth transistor (T8), and the twelfth transistor (T12) may become in the on state. During the second period, the first transistor (T1), the second transistor (T2), the ninth transistor (T9), the tenth transistor (T10), and the eleventh transistor (T11) may become in the off state.

As an embodiment, during the second period, the reset signal (VST), the second scan signal (SPWM), the first SCCG signal (SCCG1), the second SCCG signal (SCCG2), and the second light-emitting signal (EM2) may be supplied with low, and thus the gate node of the third transistor (T3) and the gate node of the sixth transistor (T6) may be initialized. At this time, the second light-emitting signal (EM2) is supplied with the low voltage and thus the fifth transistor (T5) may be turned on, and the initialization voltage (VINT) is supplied to the second capacitor and thus voltages at both ends of the second capacitor (C2) may be initialized as Vint and Vref voltages.

Figure 42:
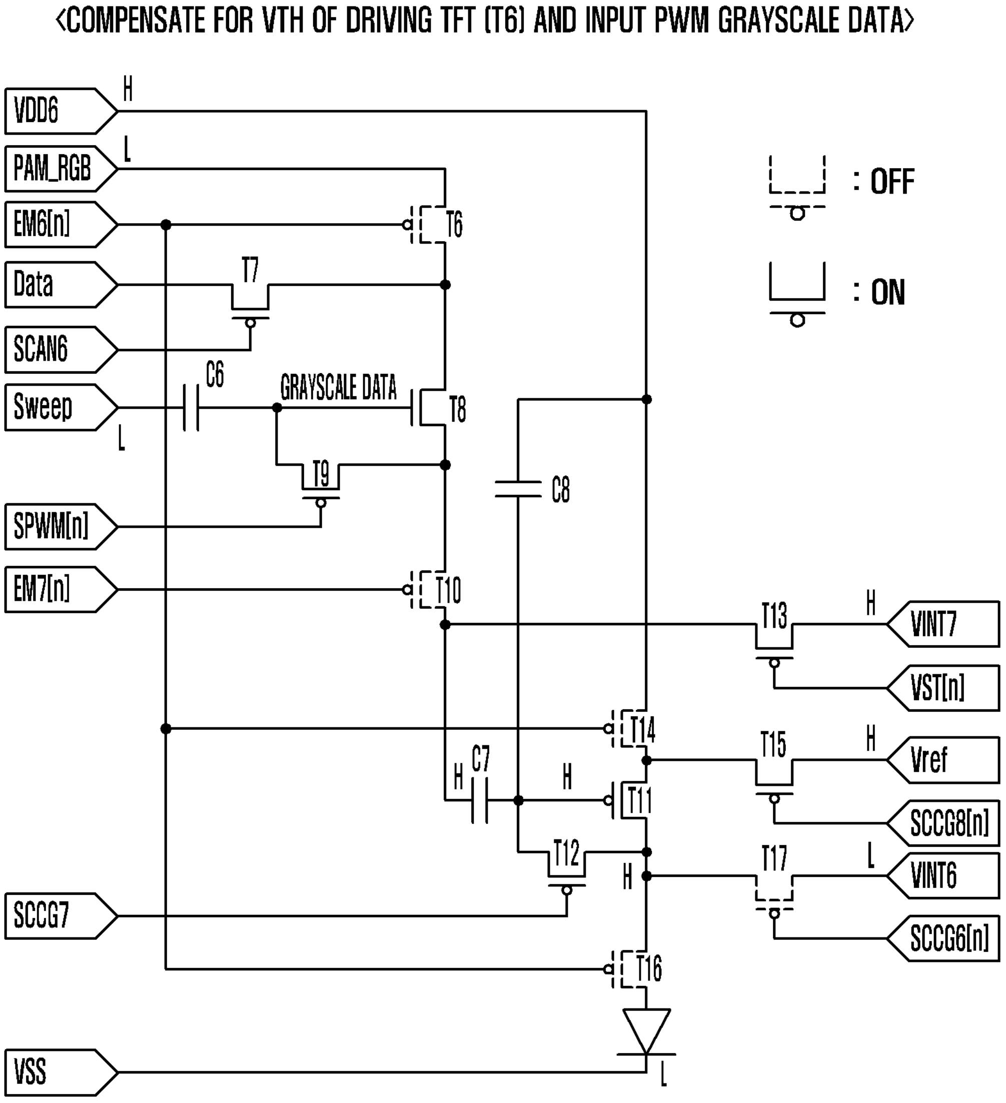
FIG. 42 is a diagram illustrating a method of operating a third period when pixels operate according to an embodiment of the disclosure.

FIG. 42 is a diagram illustrating a method of operating a third period when pixels operate according to an embodiment of the disclosure.

Figure 43:
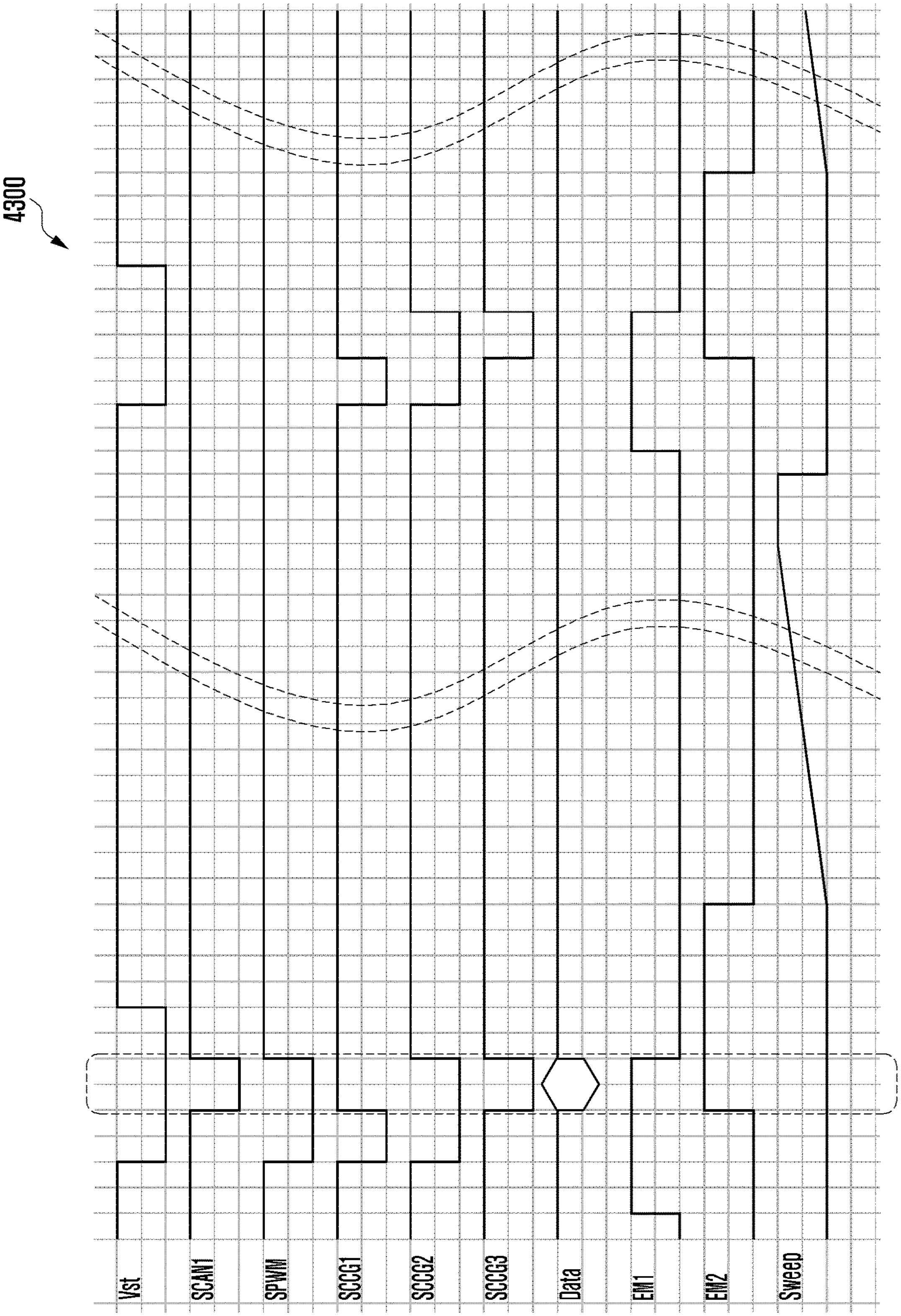
FIG. 43 is a diagram illustrating waveforms input into pixels during the third period according to an embodiment of the disclosure.

FIG. 43 is a diagram 4300 illustrating waveforms input into pixels during the third period according to an embodiment of the disclosure.

Referring to FIGS. 37, 42, 43, 58, and 59, during the third period in the operation of pixels according to various embodiments of the disclosure, Vth characteristics of the third transistor (T3) and the sixth transistor (T6) may be compensated for and the data signal (for example, grayscale data) may be supplied.

As an embodiment, during the third period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 43 may be supplied to the pixel driving circuit (for example, the pixel driving circuit 420 or 430 of FIG. 4).

As an embodiment, during the third period, the second transistor (T2), the third transistor (T3), the fourth transistor (T4), the sixth transistor (T6), the seventh transistor (T7), the eighth transistor (T8), and the tenth transistor (T10) may become in the on state. During the third period, the first transistor (T1), the fifth transistor (T5), the ninth transistor (T9), the eleventh transistor (T11), and the twelfth transistor (T12) may become in the off state.

As an embodiment, during the third period, the SCCG2 and SCCG3 signals are supplied with the low voltage and thus may turn on the seventh transistor (T7) and the tenth transistor (T10). The compensation voltage (Vref) reflects the Vth characteristic of the sixth transistor (T6) and may be stored in the second capacitor (C2). At this time, an opposite voltage of the second capacitor (C2) may be constantly maintained as the VINT voltage. When the Vth characteristic of the driving transistor (for example, the sixth transistor (T6)) arranged in the second pixel driving circuit 3730 (for example, the CCG block) is compensated for, the fifth transistor (T5) controlled by the second light-emitting signal (EM2) may remain in the on state. One of the voltages at both ends of the second capacitor (C2) may be stored as VINT, and the other may be stored as a voltage in which the Vth characteristic is reflected. As an example, when PWM operates, according to the operation from non-light emission to light emission, the compensation voltage (Vref) may be a voltage capable of making the sixth transistor (T6) be in the non-light emission state. Scan1 and SPWM may be applied with the low voltage to compensate for the Vth characteristic of the third transistor (T3) in PWM grayscale data and may be stored in the first capacitor (C1).

Figure 44:
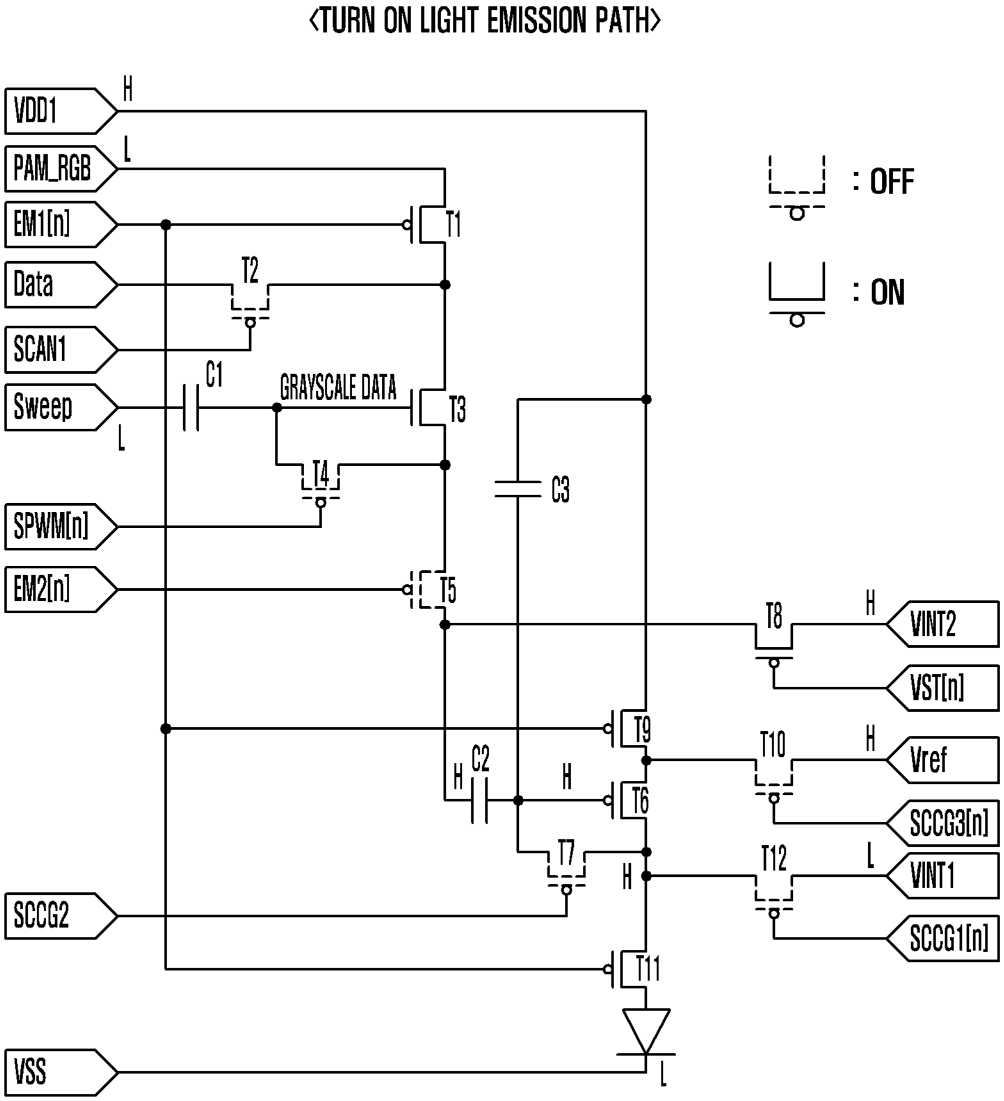
FIG. 44 is a diagram illustrating a method of operating a fourth period when pixels operate according to an embodiment of the disclosure.

FIG. 44 is a diagram illustrating a method of operating a fourth period when pixels operate according to an embodiment of the disclosure.

Figure 45:
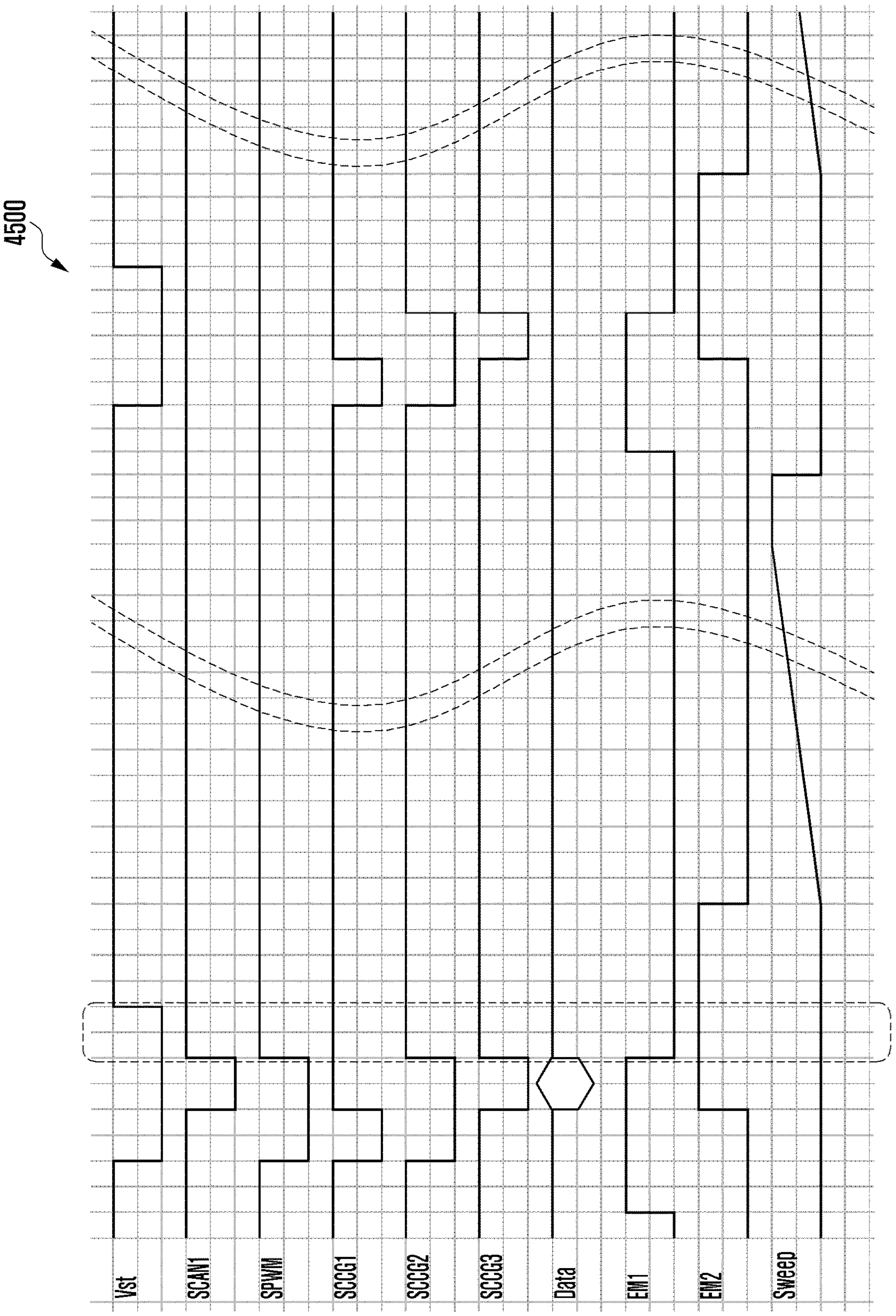
FIG. 45 is a diagram illustrating waveforms input into pixels during the fourth period according to an embodiment of the disclosure.

FIG. 45 is a diagram 4500 illustrating waveforms input into pixels during the fourth period according to an embodiment of the disclosure.

Referring to FIGS. 37, 44, 45, 58, and 59, during the fourth period in the operation of pixels according to various embodiments of the disclosure, a light emission path may be turned on and a sweep signal may be supplied.

As an embodiment, during the fourth period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 45 may be supplied to the pixel driving circuit (for example, the pixel driving circuit 420 or 430 of FIG. 4).

As an embodiment, during the fourth period, the first transistor (T1), the third transistor (T3), the sixth transistor (T6), the eighth transistor (T8), the ninth transistor (T9), and the eleventh transistor (T11) may become in the on state. During the fourth period, the second transistor (T2), the fourth transistor (T4), the fifth transistor (T5), the seventh transistor (T7), the tenth transistor (T10), and the twelfth transistor (T12) may become in the off state.

As an embodiment, during the fourth period, the first light-emitting signal (EM1) may be supplied with the low voltage and enable the current to flow via the VDD line 3701, the micro LED 3710, the sixth transistor (T6), and the VSS line 3702.

Figure 46:
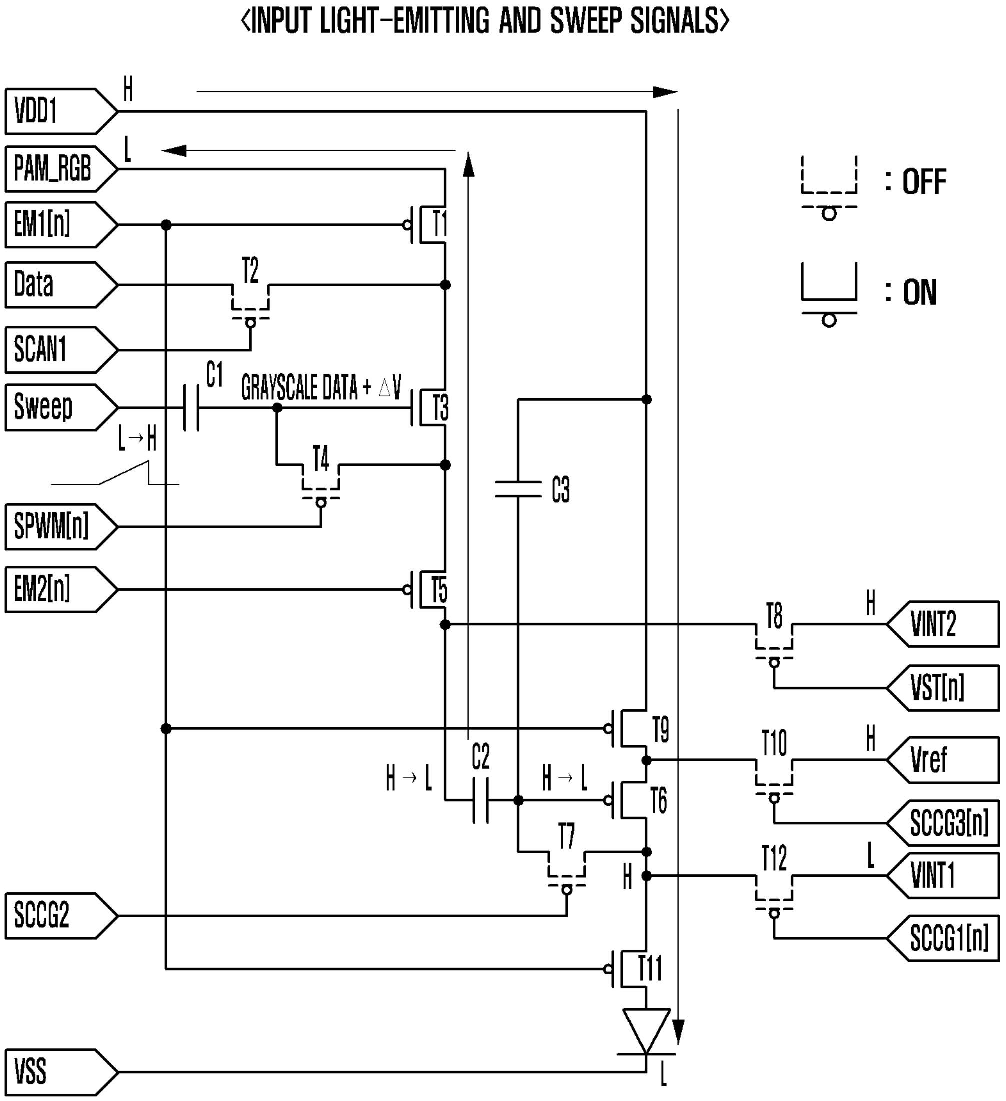
FIG. 46 is a diagram illustrating a method of operating a fifth period when pixels operate according to an embodiment of the disclosure.

FIG. 46 is a diagram illustrating a method of operating a fifth period when pixels operate according to an embodiment of the disclosure.

Figure 47:
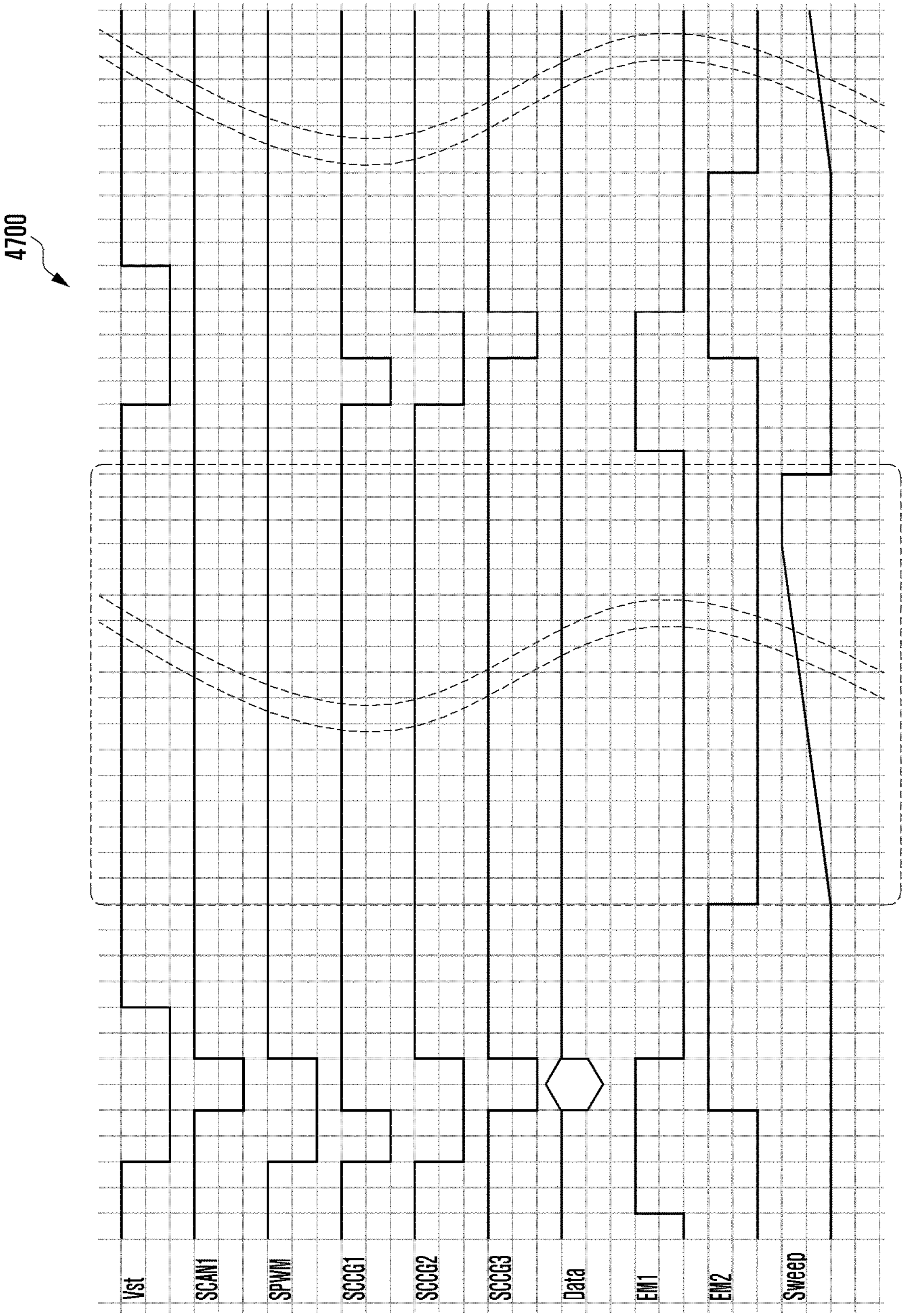
FIG. 47 is a diagram illustrating waveforms input into pixels during the fifth period according to an embodiment of the disclosure.

FIG. 47 is a diagram 4700 illustrating waveforms input into pixels during the fifth period according to an embodiment of the disclosure.

Referring to FIGS. 37, 46, 47, 58, and 59, during the fifth period in the operation of pixels according to various embodiments of the disclosure, the sweep signal may be supplied and thus the light emission path may open.

As an embodiment, during the fifth period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 47 may be supplied to the pixel driving circuit (for example, the pixel driving circuit 420 or 430 of FIG. 4).

As an embodiment, during the fifth period, the first transistor (T1), the third transistor (T3), the fifth transistor (T5), the sixth transistor (T6), the ninth transistor (T9), and the eleventh transistor (T11) may become in the on state. During the fifth period, the second transistor (T2), the fourth transistor (T4), the seventh transistor (T7), the eighth transistor (T8), the tenth transistor (T10), and the twelfth transistor (T12) may become in the off state.

As an embodiment, during the fifth period, the second light-emitting signal (EM2) may be supplied with the low voltage and thus the light emission path may open. As the sweep signal is input, the gate voltage of the third transistor (T3) may increase according to coupling through the first capacitor (C1) and may be gradually changed to the on state according to a change in the grayscale voltage stored in the third transistor (T3). PWM may be driven using the same. When the third transistor (T3) is completely turned on, an amount of the current flowing in the sixth transistor (T6) may be controlled as the PAM_R,G,B signal is applied to each of the red, green, and blue pixels in one side of the second capacitor (C2).

Figure 48:
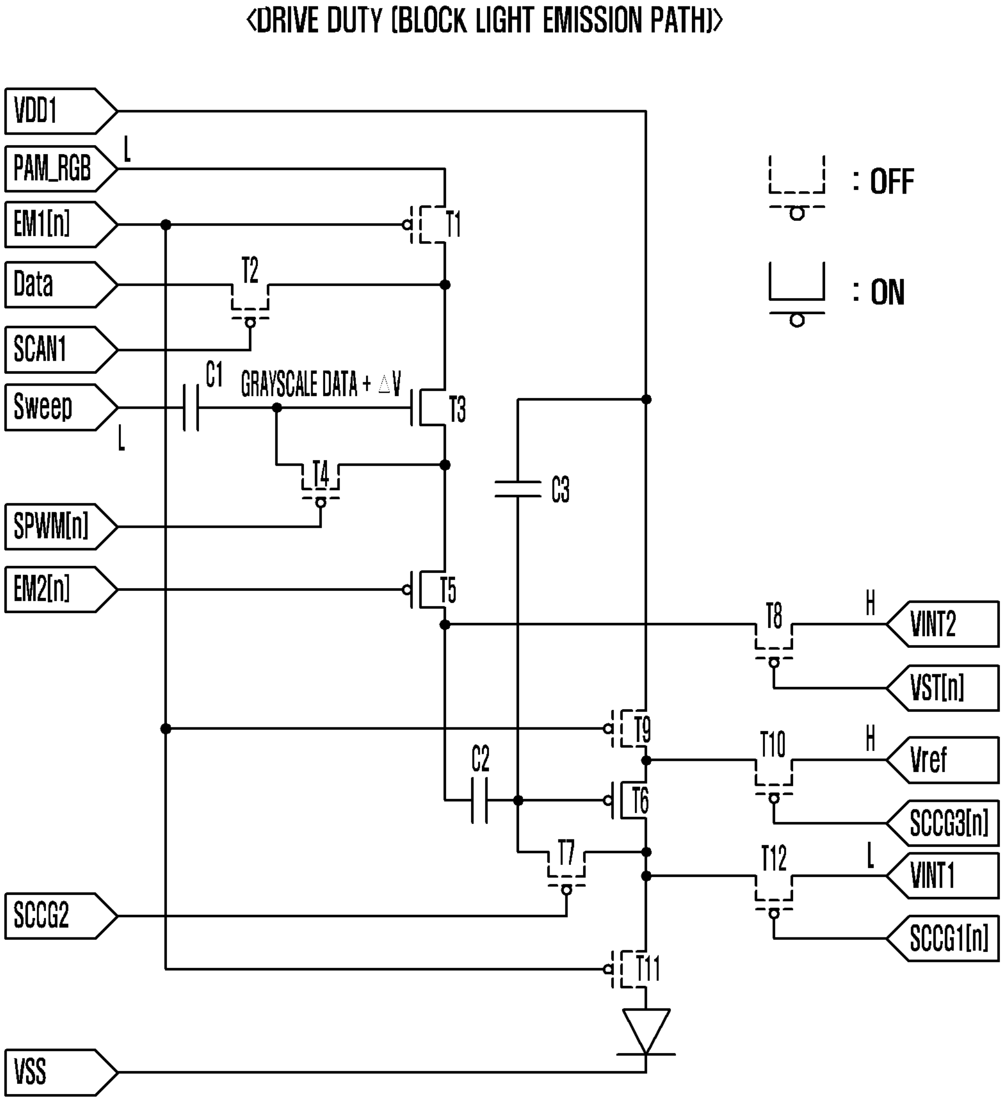
FIG. 48 is a diagram illustrating a method of operating a sixth period when pixels operate according to an embodiment of the disclosure.

FIG. 48 is a diagram illustrating a method of operating a sixth period when pixels operate according to an embodiment of the disclosure.

Figure 49:
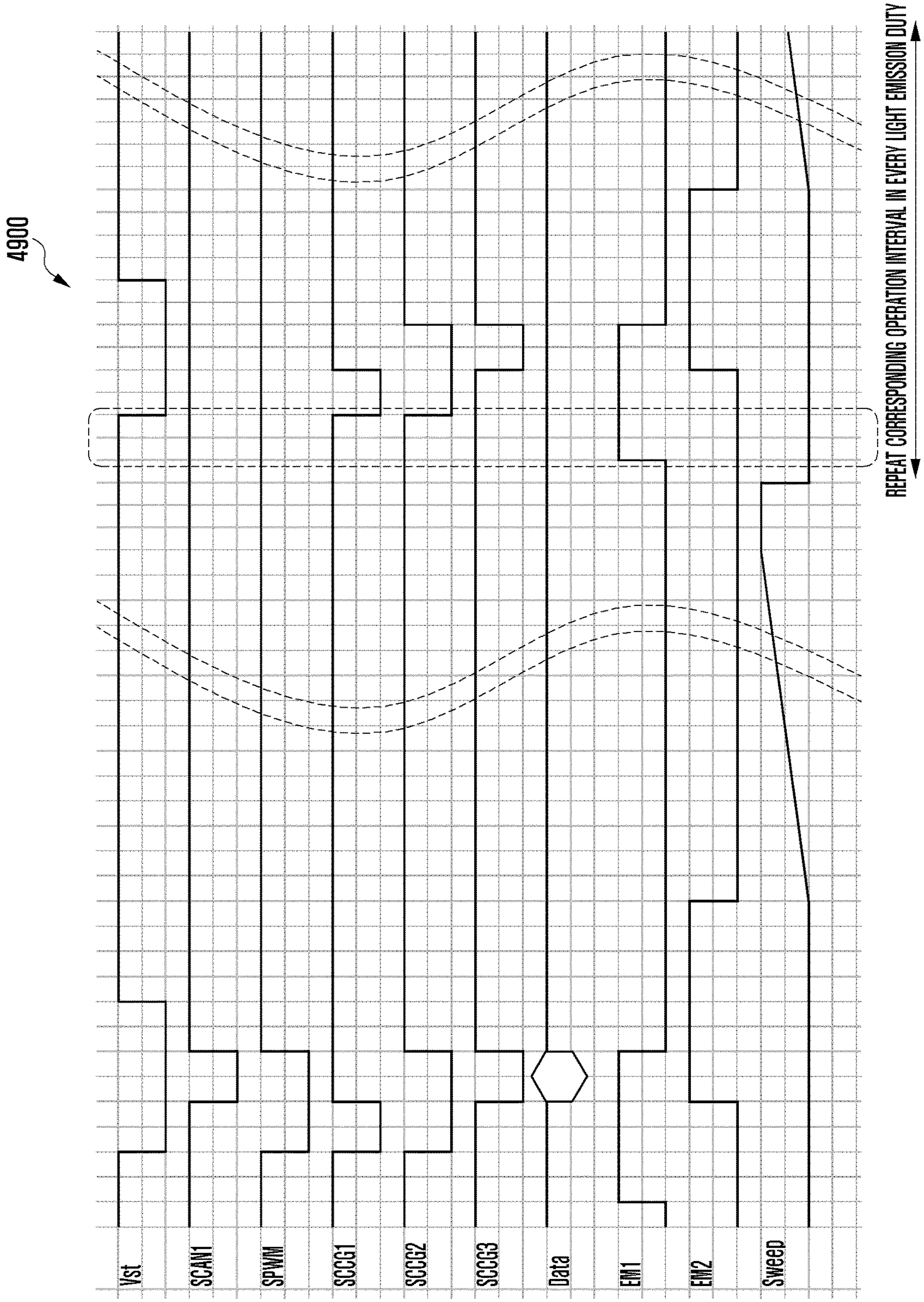
FIG. 49 is a diagram illustrating waveforms input into pixels during the sixth period according to an embodiment of the disclosure.

FIG. 49 is a diagram 4900 illustrating waveforms input into pixels during the sixth period according to an embodiment of the disclosure.

Referring to FIGS. 37, 48, 49, 58, and 59, during the sixth period in the operation of pixels according to various embodiments of the disclosure, the light emission path may be blocked through duty driving.

As an embodiment, during the sixth period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 49 may be supplied to the pixel driving circuit (for example, the pixel driving circuit 420 or 430 of FIG. 4).

As an embodiment, during the sixth period, the third transistor (T3), the fifth transistor (T5), and the sixth transistor (T6) may become in the on state. During the sixth period, the first transistor (T1), the second transistor (T2), the fourth transistor (T4), the seventh transistor (T7), the eighth transistor (T8), the ninth transistor (T9), the tenth transistor (T10), the eleventh transistor (T11), and the twelfth transistor (T12) may become in the off state.

As an embodiment, during the sixth period, the first light-emitting signal (EM1) may be supplied with the high voltage, and thus the light emission path may be blocked. During the sixth period, the operation of the sixth period to a tenth period may be repeatedly performed in every duty in order to perform 2 to 6 duty in 1 frame.

Figure 50:
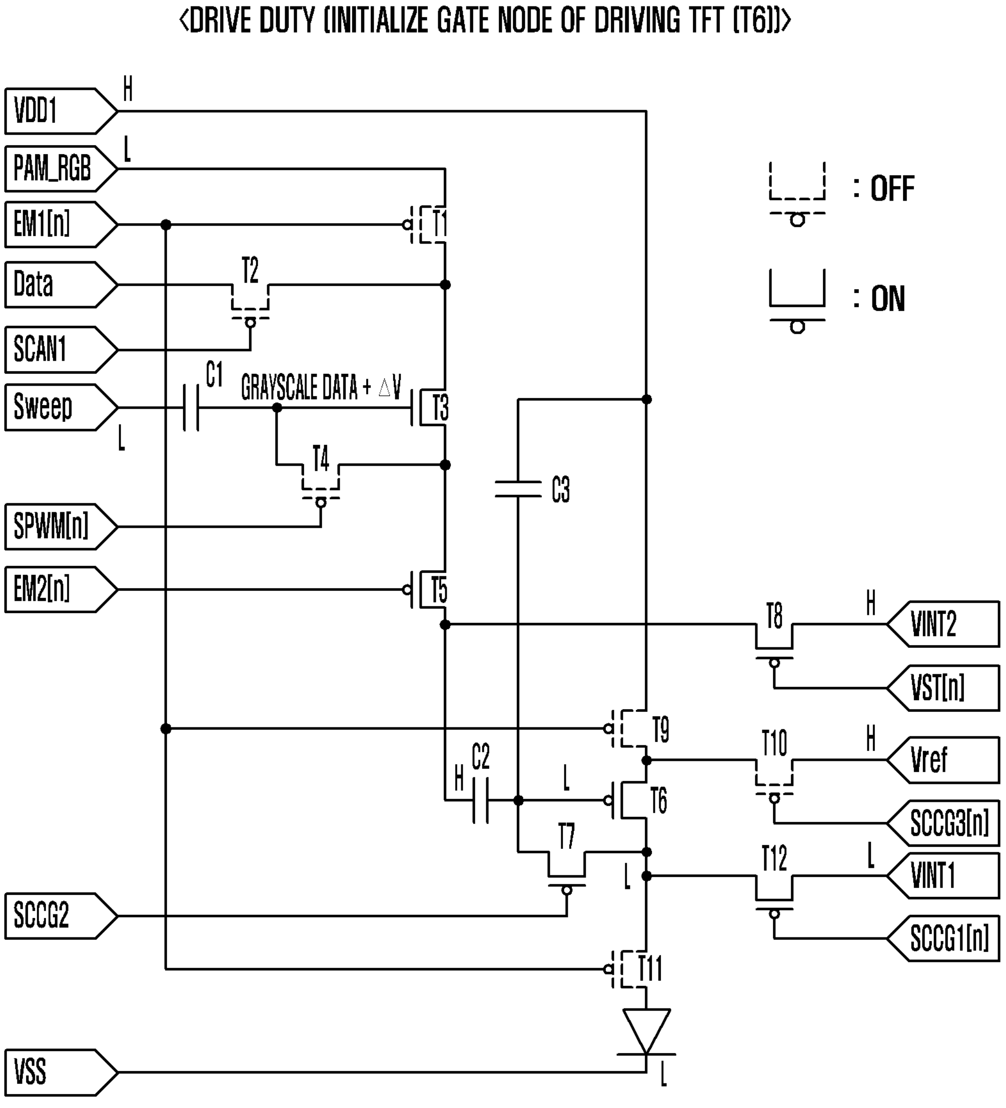
FIG. 50 is a diagram illustrating a method of operating a seventh period when pixels operate according to an embodiment of the disclosure.

FIG. 50 is a diagram illustrating a method of operating a seventh period when pixels operate according to an embodiment of the disclosure.

Figure 51:
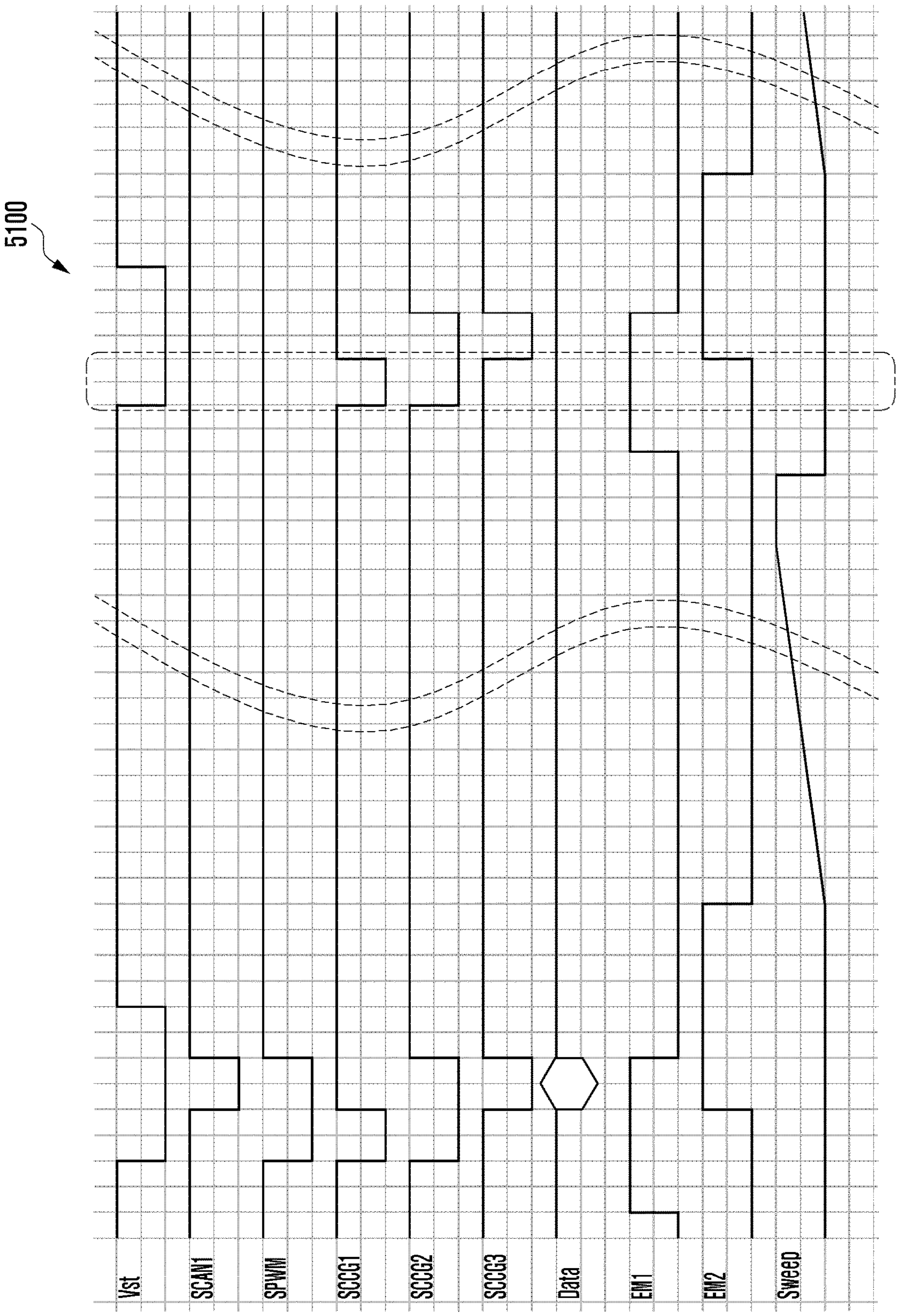
FIG. 51 is a diagram illustrating waveforms input into pixels during the seventh period according to an embodiment of the disclosure.

FIG. 51 is a diagram 5100 illustrating waveforms input into pixels during the seventh period according to an embodiment of the disclosure.

Referring to FIGS. 37, 50, 51, 58, and 59, during the seventh period in the operation of pixels according to various embodiments of the disclosure, the gate node of the sixth transistor (T6) may be initialized through duty driving.

As an embodiment, during the seventh period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 59 may be supplied to the pixel driving circuit (for example, the pixel driving circuit 420 or 430 of FIG. 4).

As an embodiment, during the seventh period, the third transistor (T3), the fifth transistor (T5), the sixth transistor (T6), the seventh transistor (T7), the eighth transistor (T8), and the twelfth transistor (T12) may become in the on state. During the seventh period, the first transistor (T1), the second transistor (T2), the fourth transistor (T4), the ninth transistor (T9), the tenth transistor (T10), and the eleventh transistor (T11) may become in the off state.

As an embodiment, during the seventh period, EM2, VST, SCCG1, and SCCG2 signals may be supplied with the low voltage, and thus the fifth transistor (T5), the seventh transistor (T7), the eighth transistor (T8), and the twelfth transistor (T12) may become in the on state and Vint1 and Vref voltages may be supplied to both ends of the first capacitor (C1), respectively.

Figure 52:
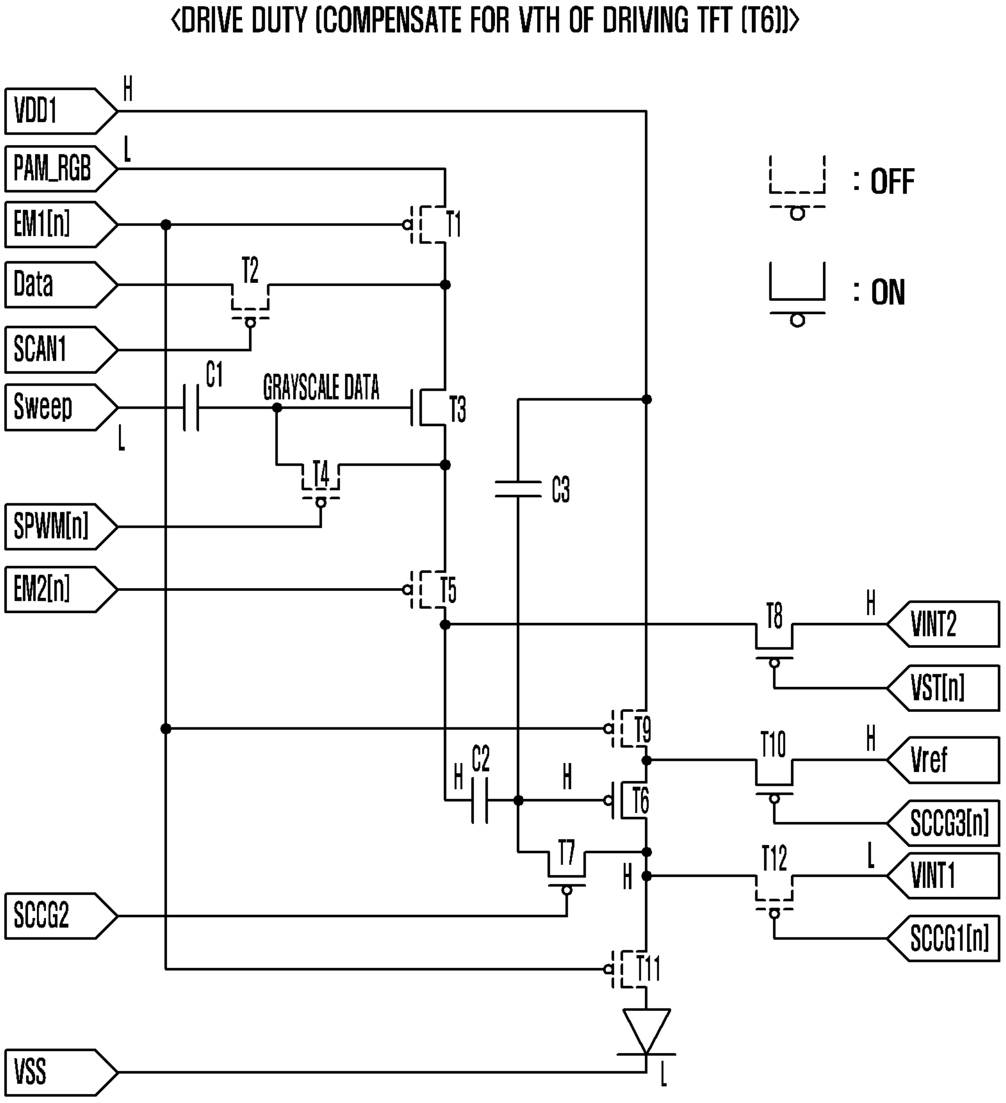
FIG. 52 is a diagram illustrating a method of operating an eighth period when pixels operate according to an embodiment of the disclosure.

FIG. 52 is a diagram illustrating a method of operating an eighth period when pixels operate according to an embodiment of the disclosure.

Figure 53:
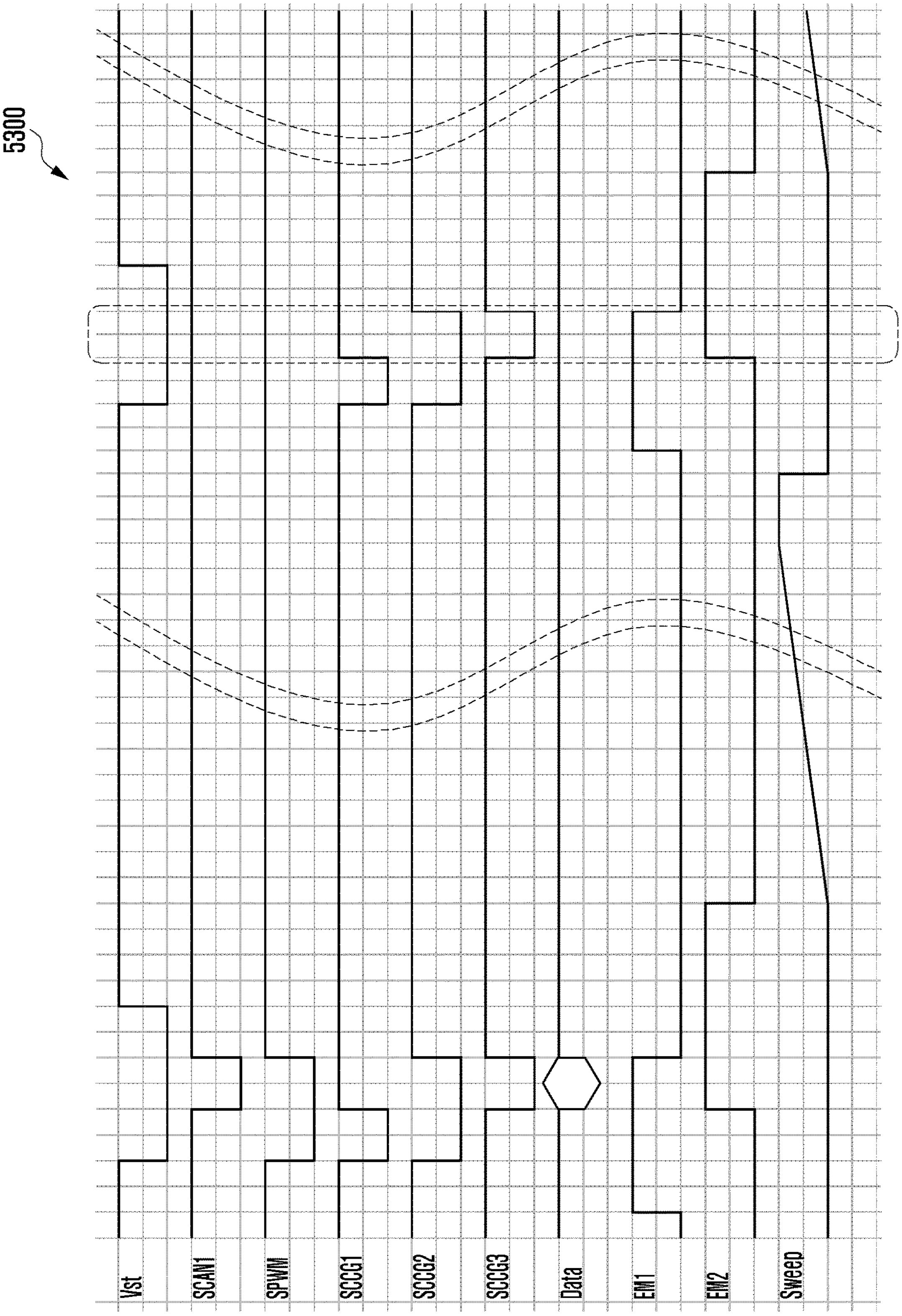
FIG. 53 is a diagram illustrating waveforms input into pixels during the eighth period according to an embodiment of the disclosure.

FIG. 53 is a diagram 5300 illustrating waveforms input into pixels during the eighth period according to an embodiment of the disclosure.

Referring to FIGS. 37, 52, 53, 58, and 59, during the eighth period in the operation of pixels according to various embodiments of the disclosure, the Vth characteristic of the driving transistor (for example, the sixth transistor (T6)) of the second pixel driving circuit 3730 (for example, the CCG block) may be compensated for through duty driving.

As an embodiment, during the eighth period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 53 may be supplied to the pixel driving circuit (for example, the pixel driving circuit 420 or 430 of FIG. 4).

As an embodiment, during the eighth period, the third transistor (T3), the sixth transistor (T6), the seventh transistor (T7), the eighth transistor (T8), and the tenth transistor (T10) may become in the on state.

During the eighth period, the first transistor (T1), the second transistor (T2), the fourth transistor (T4), the fifth transistor (T5), the ninth transistor (T9), the eleventh transistor (T11), and the twelfth transistor (T12) may become in the off state.

As an embodiment, during the eighth period, SCCG2 and SCCG3 signals may be supplied with the low voltage, and thus the compensation voltage (Vref) in which the characteristic of the gate node of the sixth transistor (T6) is reflected may be stored in the second capacitor (C2).

Figure 54:
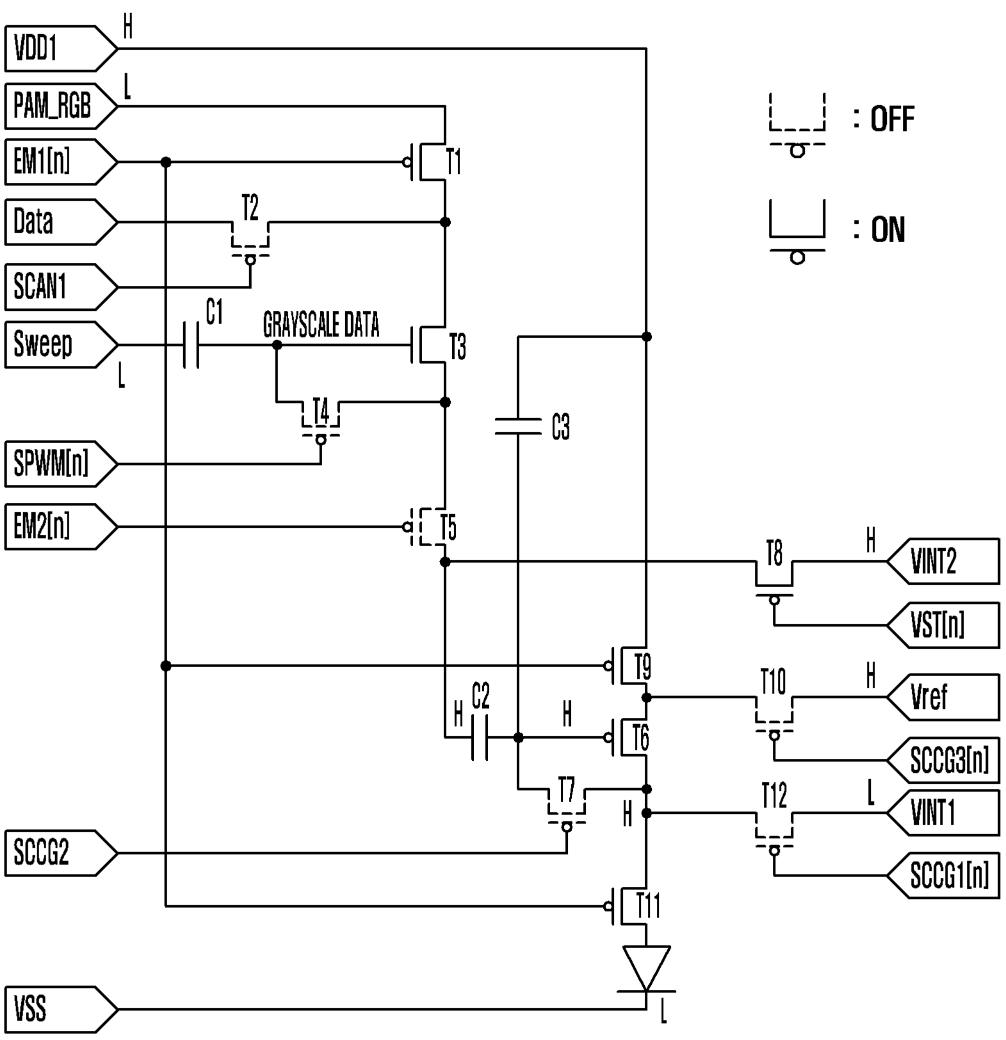
FIG. 54 is a diagram illustrating a method of operating a ninth period when pixels operate according to an embodiment of the disclosure.

FIG. 54 is a diagram illustrating a method of operating a ninth period when pixels operate according to an embodiment of the disclosure.

Figure 55:
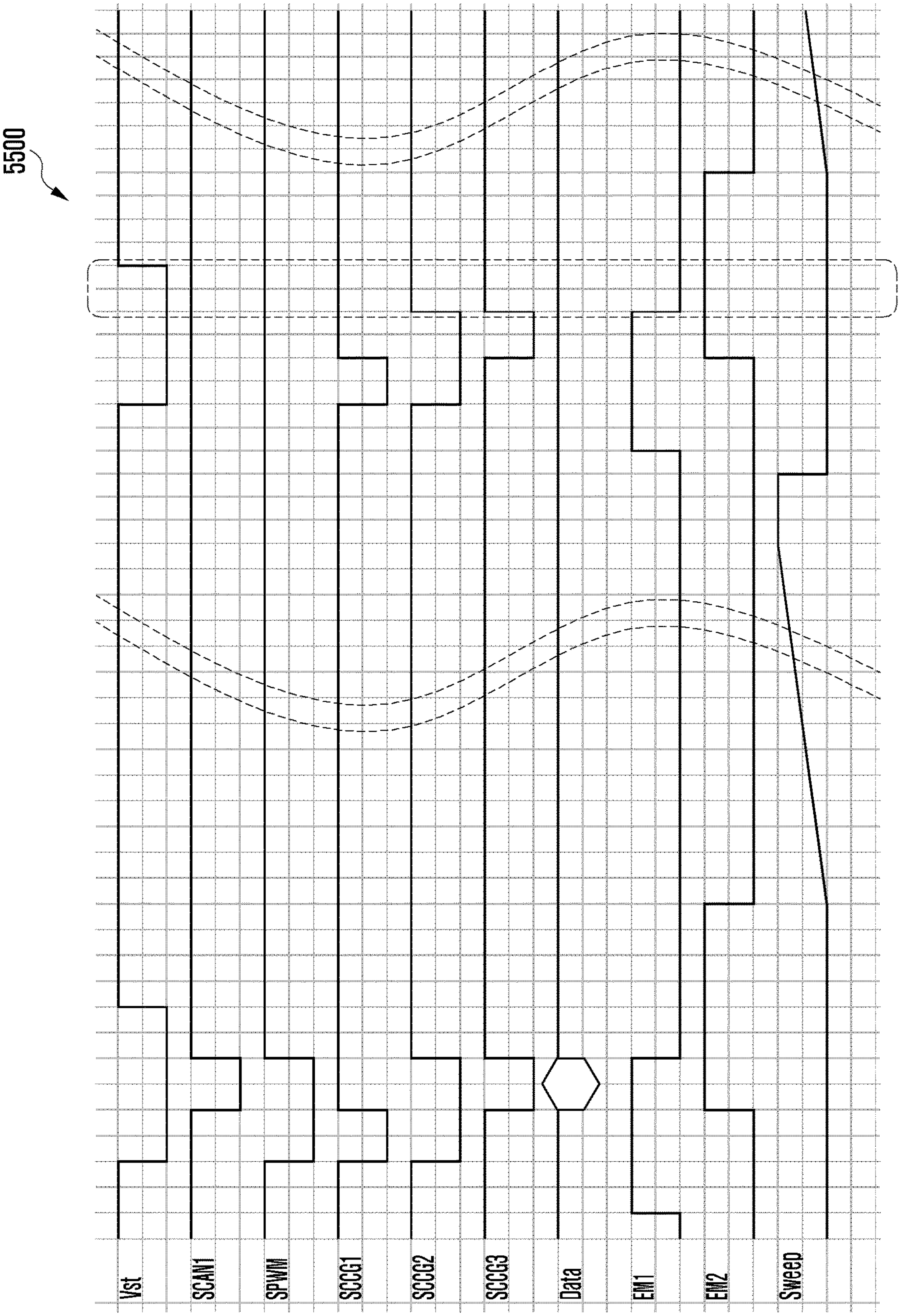
FIG. 55 is a diagram illustrating waveforms input into pixels during the ninth period according to an embodiment of the disclosure.

FIG. 55 is a diagram 5500 illustrating waveforms input into pixels during the ninth period according to an embodiment of the disclosure.

Referring to FIGS. 37, 54, 55, 58, and 59, during the ninth period in the operation of pixels according to various embodiments of the disclosure, the light emission path may open through duty driving.

As an embodiment, during the ninth period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 55 may be supplied to the pixel driving circuit (for example, the pixel driving circuit 420 or 430 of FIG. 4).

As an embodiment, during the ninth period, the first transistor (T1), the third transistor (T3), the sixth transistor (T6), the eighth transistor (T8), the ninth transistor (T9), and the eleventh transistor (T11) may become in the on state. During the ninth period, the second transistor (T2), the fourth transistor (T4), the fifth transistor (T5), the seventh transistor (T7), the tenth transistor (T10), and the twelfth transistor (T12) may become in the off state.

As an embodiment, during the ninth period, the first light-emitting signal (EM1) may be supplied with the low voltage, and thus the light emission path may open.

Figure 56:
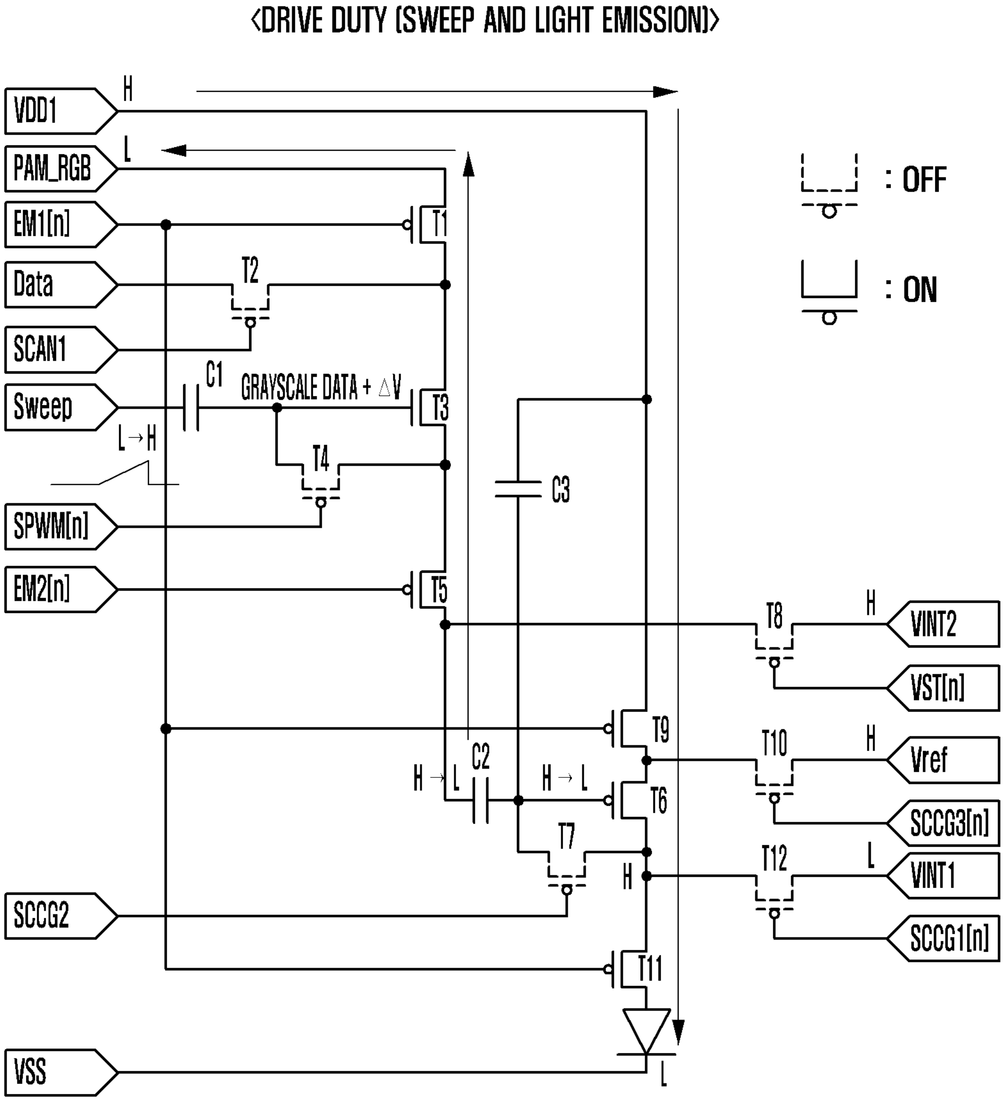
FIG. 56 is a diagram illustrating a method of operating a tenth period when pixels operate according to an embodiment of the disclosure.

FIG. 56 is a diagram illustrating a method of operating a tenth period when pixels operate according to an embodiment of the disclosure.

Figure 57:
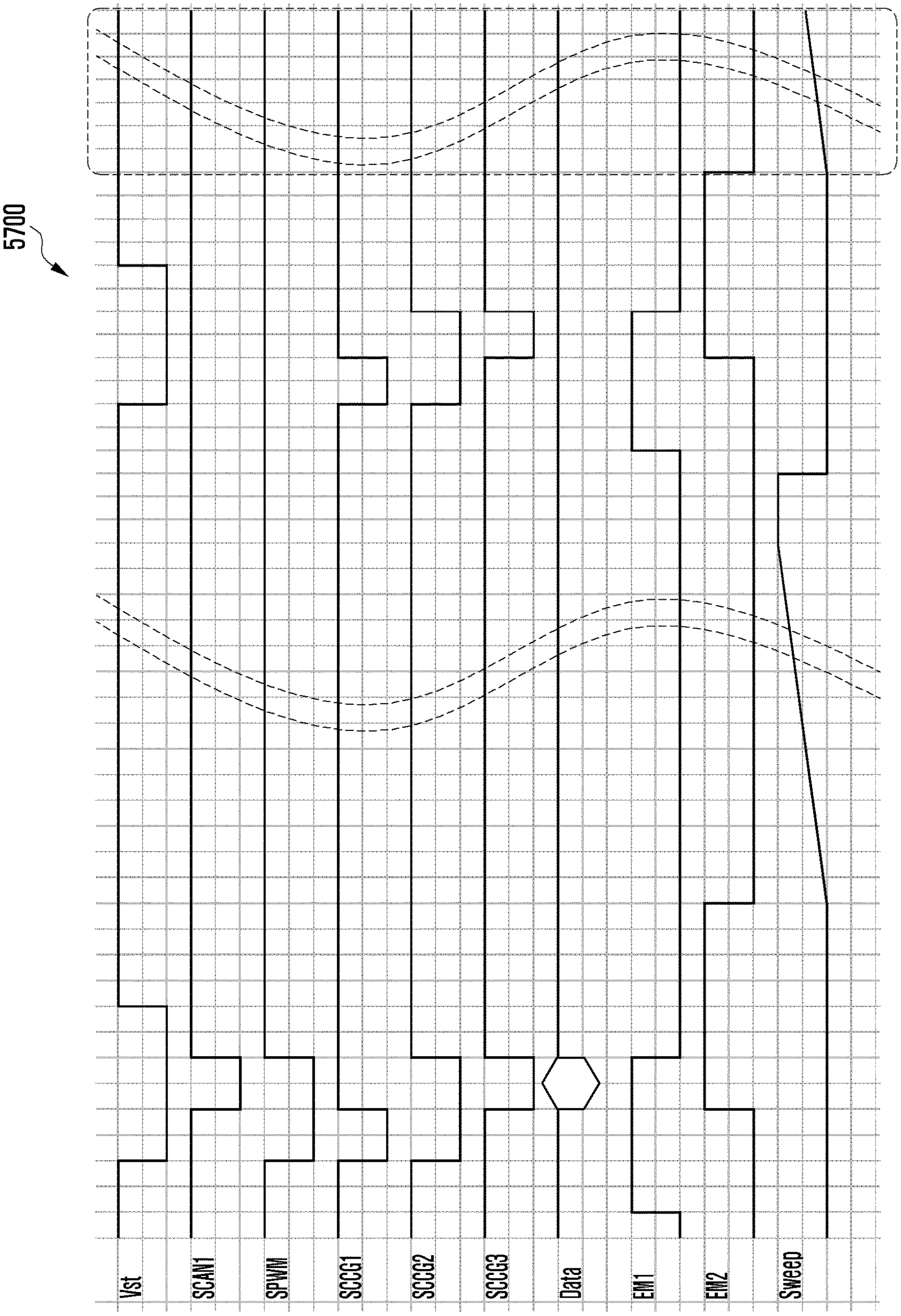
FIG. 57 is a diagram illustrating waveforms input into pixels during the tenth period according to an embodiment of the disclosure.

FIG. 57 is a diagram 5700 illustrating waveforms input into pixels during the tenth period according to an embodiment of the disclosure.

Referring to FIGS. 37, 56, 57, 58, and 59, during the tenth period in the operation of pixels according to various embodiments of the disclosure, sweep driving may be performed and the micro LED 3710 may emit light through duty driving.

As an embodiment, during the tenth period, the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) illustrated in FIG. 57 may be supplied to the pixel driving circuit (for example, the pixel driving circuit 420 or 430 of FIG. 4).

As an embodiment, during the tenth period, the first transistor (T1), the third transistor (T3), the fifth transistor (T5), the sixth transistor (T6), the ninth transistor (T9), and the eleventh transistor (T11) may become in the on state. During the tenth period, the second transistor (T2), the fourth transistor (T4), the seventh transistor (T7), the eighth transistor (T8), the tenth transistor (T10), and the twelfth transistor (T12) may become in the off state.

As an embodiment, during the tenth period, the second light-emitting signal (EM2) may be supplied with the low voltage and thus the light emission path may open. At this time, the sweep signal may be repeatedly driven for every duty.

Referring to FIGS. 58 and 59, as a result of inputting the reset signal (VST), the first scan signal (Scan), the second scan signal (SPWM), the first SCCG signal (SCCG1), the second SCCG signal (SCCG2), the sweep signal, the data signal (for example, grayscale data), the first light-emitting signal (EM1), and the second light-emitting signal (EM2) into the pixel driving circuit 3720 or 3730 of the pixel 3700 illustrated in FIG. 37 during 2 cycles, it is possible to prevent the color of the pixel from being changed and improve image quality characteristics of the display.

The electronic device to which pixels 3700 including the pixel driving circuits 3720 and 3730 and the micro LED 3710 are applied according to an embodiment of the disclosure may include the first pixel driving circuit 3720 (for example, the PWM signal block) that controls light emission timing of the micro LED 3710 and the second pixel driving circuit 3730 (for example, the CCG block) that controls light emission grayscale of the micro LED 3710. The second capacitor (C2) may be arranged between the first pixel driving circuit 3720 (for example, the PWM signal block) and the second pixel driving circuit 3730 (for example, the CCG block).

The electronic device to which the pixels 3700 including the pixel driving circuits 3720 and 3730 and the micro LED 3710 are applied according to an embodiment of the disclosure may prevent voltages at both ends of the second capacitor (C2) from floating since the eighth transistor continues to be in the on state during the Vth characteristic compensation operation and the initialization operation of the driving transistor (for example, the sixth transistor (T6)) arranged in the second pixel driving circuit 3730 (for example, the CCG block). At this time, during the corresponding operation period, the VINT2 voltage may be supplied to one side of the second capacitor.

As the electronic device to which the pixels 3700 including the pixel driving circuits 3720 and 3730 and the micro LED 3710 are applied according to an embodiment of the disclosure starts in the non-light emission state, the electronic device may use the compensation voltage (Vref) for the red pixel, the green pixel, and the blue pixel in common as the voltage of turning off the driving transistor (for example, the sixth transistor (T6)) arranged in the second pixel driving circuit 3730 (for example, the CCG block). As another example, the compensation voltage (Vref) may be supplied to each of the red pixel, the green pixel, and the blue pixel as different voltages. As an embodiment, the PAM_RGB signal may be supplied to each of the red pixel, the green pixel, and the blue pixel, and thus the pixel current may be controlled for each color when the micro LED 3710 emits light.

In the electronic device to which the pixels 3700 including the pixel driving circuits 3720 and 3730 and the micro LED 3710 according to an embodiment of the disclosure, in an initial operation, the sixth transistor (T6) may start in a non-light emission operation and thus the sixth transistor (T6) may be turned on by the second capacitor (C2) according to time as a sweep signal is applied. According thereto, it is possible to control the grayscale of the micro LED 3710 through a PWM driving scheme.

In the electronic device to which the pixels 3700 including the pixel driving circuits 3720 and 3730 and the micro LED 3710 according to an embodiment of the disclosure, the Vth characteristic compensation operation of the sixth transistor (T6) may be repeatedly performed in every duty driving. The seventh transistor (T7) and the twelfth transistor (T12) are turned on, which enables the gate node of the sixth transistor (T6) to be initialized. The seventh transistor (T7) and the tenth transistor (T10) are turned on, and thus the Vth characteristic compensation operation of the sixth transistor (T6) may be repeatedly performed in every duty.

In the electronic device to which the pixels 3700 including the pixel driving circuits 3720 and 3730 and the micro LED 3710 according to an embodiment of the disclosure, the first pixel driving circuit 3720 (for example, the PWM signal block) and the second pixel driving circuit 3730 (for example, the CCG block) may use in common the VINT voltage by the fifth transistor (T5) of which on/off is controlled by the second light-emitting signal (EM2).

In the electronic device to which the pixels 3700 including the pixel driving circuits 3720 and 3730 and the micro LED 3710 according to an embodiment of the disclosure, the driving transistor (for example, the third transistor (T3)) arranged in the first pixel driving circuit 3720 (for example, PWM signal block) and the driving transistor (for example, the sixth transistor (T6)) arranged in the second pixel driving circuit 3730 (for example, the CCG block) may have different polarity types. As an example, the first transistor to the fifth transistor (T1 to T5) arranged in the first pixel driving circuit 3720 (for example, the PWM signal block) may be NMOS transistors. As an example, the sixth transistor to the twelfth transistor (T6 to T12) arranged in the second pixel driving circuit 3730 (for example, the CCG block) may be PMOS transistors. As another example, the first transistor to the fifth transistor (T1 to T5) arranged in the first pixel driving circuit 3720 (for example, the PWM signal block) may be PMOS transistors. As another example, the sixth transistor to the twelfth transistor (T6 to T12) arranged in the second pixel driving circuit 3730 (for example, the CCG block) may be NMOS transistors.

FIG. 60 is a diagram illustrating comparison between the operation result of pixels of the electronic device and the operation result of pixels in a comparative example according to an embodiment of the disclosure.

Figure 61:
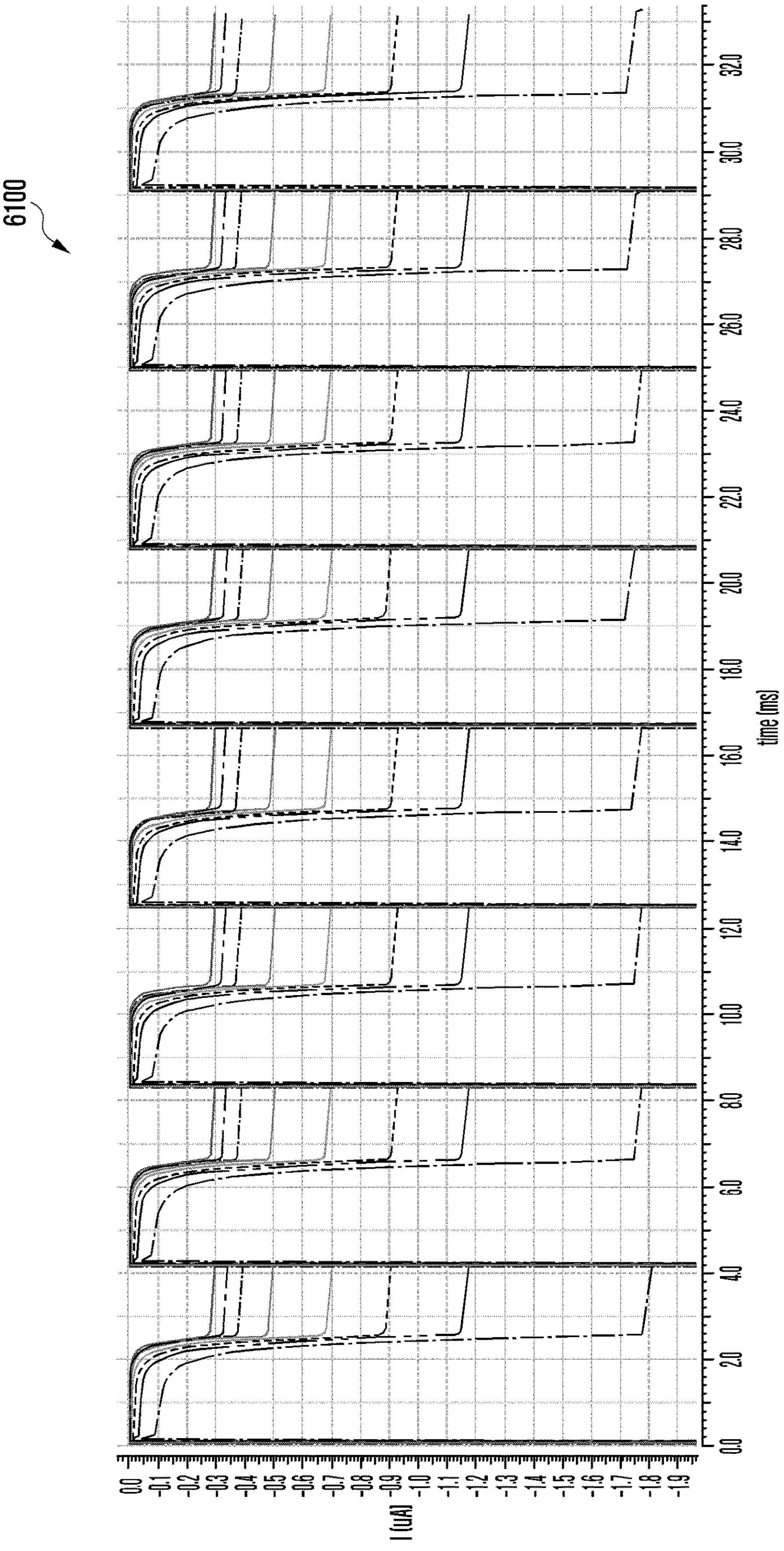
FIG. 61 is a diagram illustrating waveforms of the operation result of pixels of the electronic device according to an embodiment of the disclosure.

FIG. 61 is a diagram 6100 illustrating waveforms of the operation result of pixels of the electronic device according to an embodiment of the disclosure.

Figure 62:
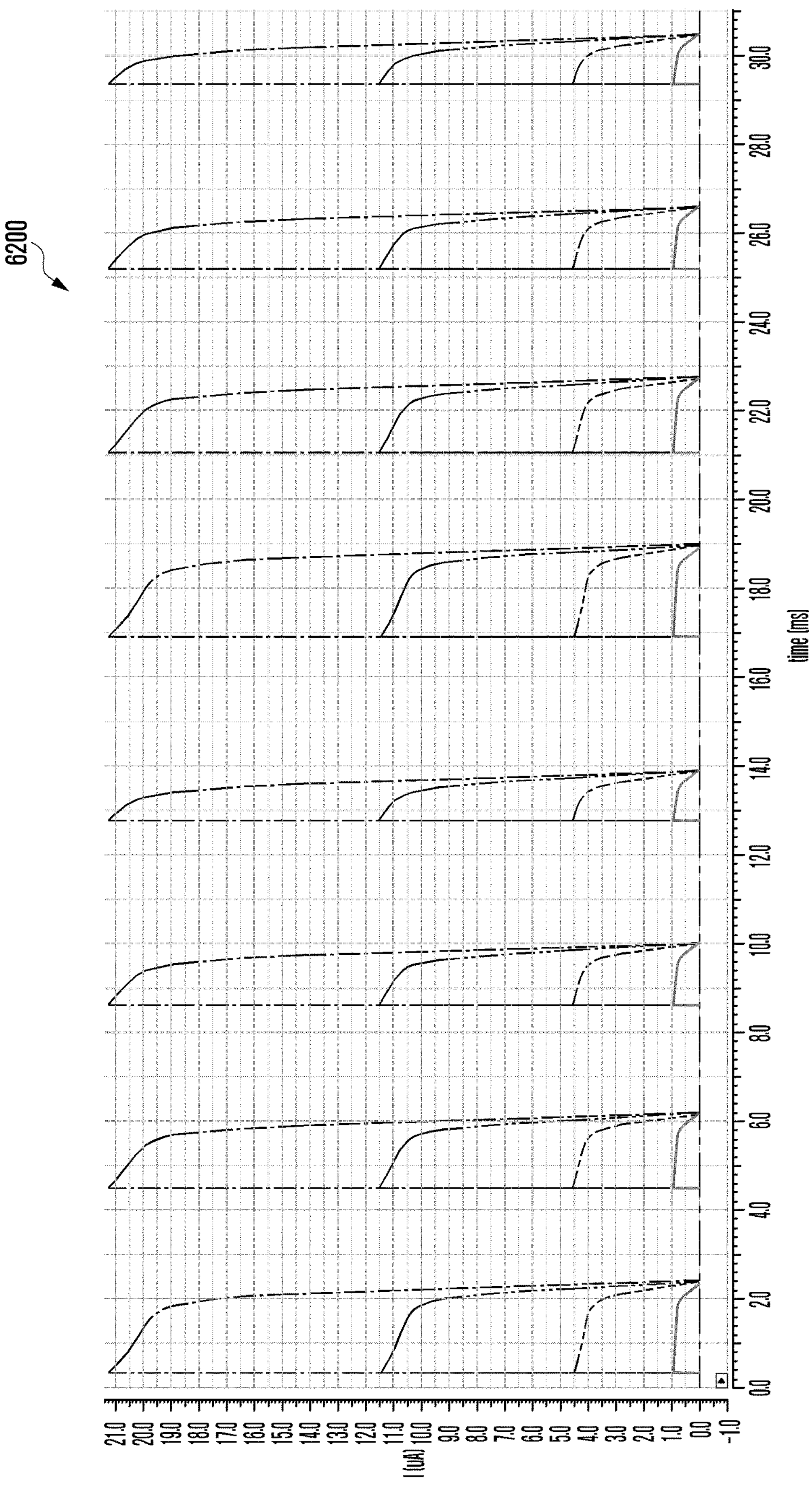
FIG. 62 is a diagram illustrating comparison with the operation result of pixels in the comparative example according to an embodiment of the disclosure.

FIG. 62 is a diagram 6200 illustrating comparison with the operation result of pixels in the comparative example according to an embodiment of the disclosure.

Referring to FIGS. 60 to 62, when the compensation voltage (Vref) is changed to 6V, 7V, 9V, or 11V during the operation of the pixels (for example, the pixels 3700 of FIG. 37) of the electronic device of the disclosure, it may be identified that the luminance of the micro LED (or OLED) is normally controlled. In comparison between the operation result of the pixels 3700 of the electronic device of the disclosure and the operation result of pixels (9TR-2Cap) in the comparative example, it may be identified that while the luminance of the micro LED (or OLED) is normally controlled in the pixels 3700 of the electronic device of the disclosure, the luminance of the micro LED (or OLED) is not normally maintained in the comparative example.

FIG. 63 is a diagram illustrating that the grayscale of the micro LED (or OLED) is normally controlled when the pixels of the electronic device operate according to an embodiment of the disclosure.

Figure 64:
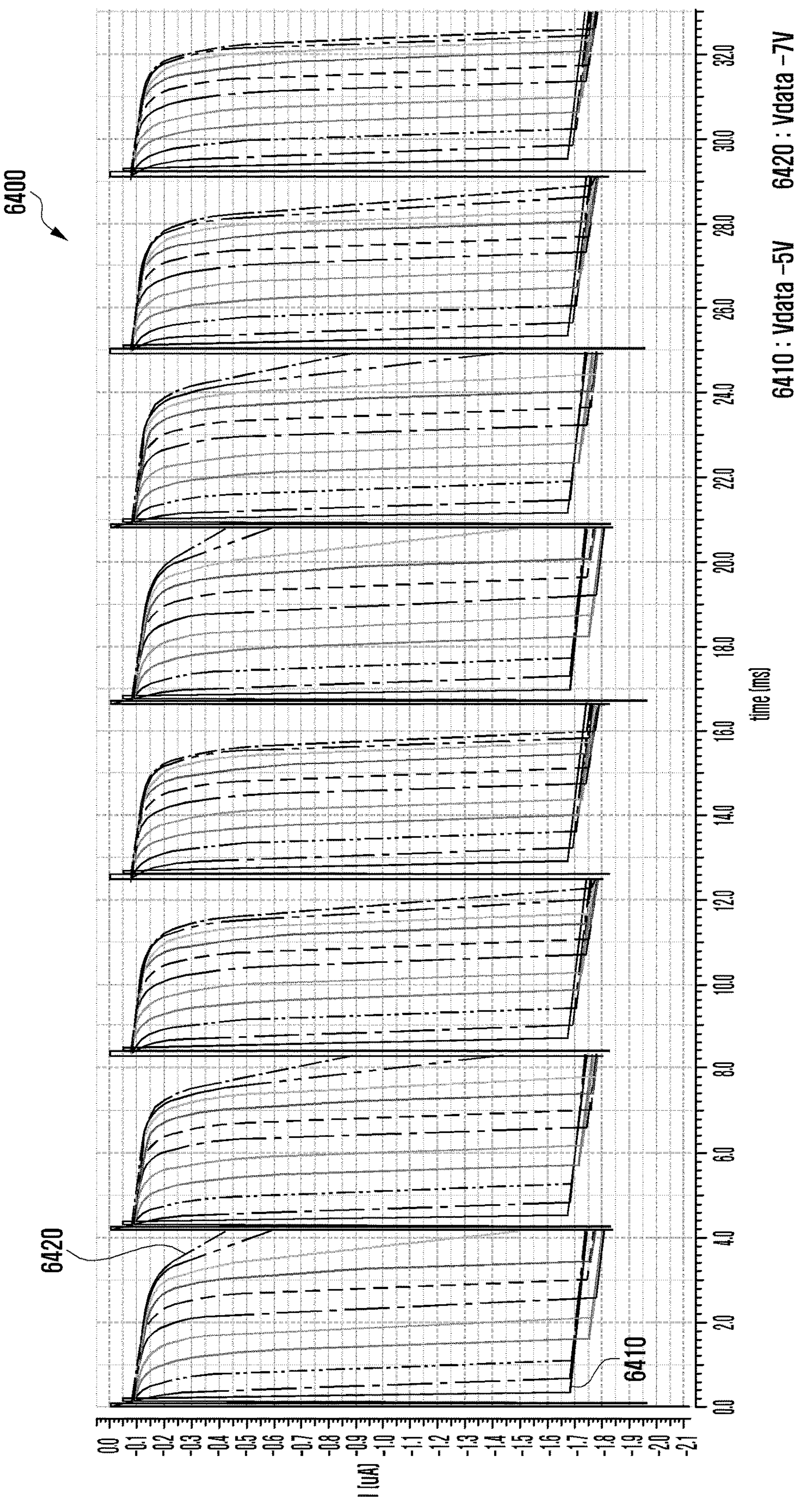
FIG. 64 is a diagram illustrating waveforms of the operation result of pixels of the electronic device according to an embodiment of the disclosure.

FIG. 64 is a diagram illustrating waveforms 6400 of the operation result of pixels of the electronic device according to an embodiment of the disclosure.

Figure 65:
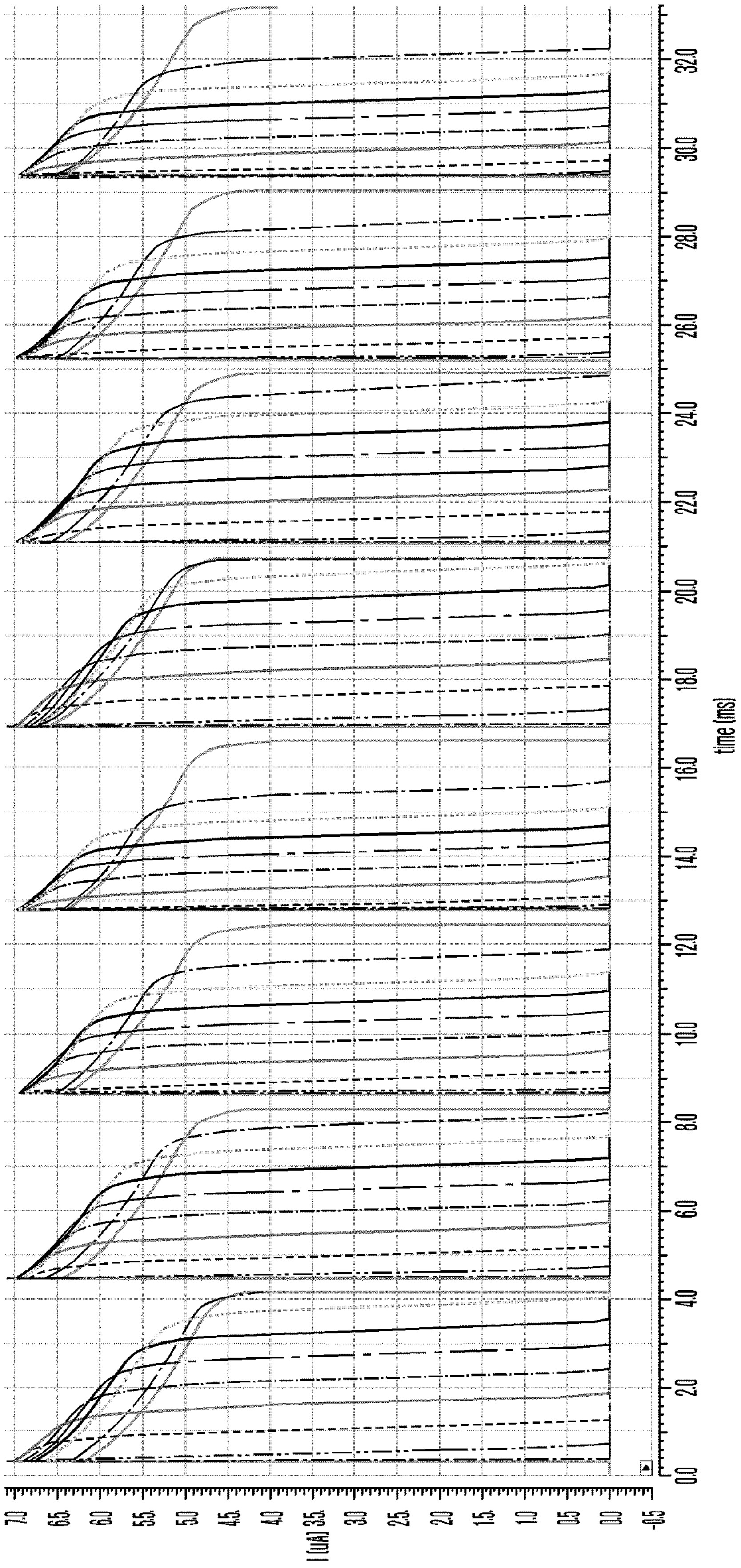
FIG. 65 is a diagram illustrating comparison with the operation result of pixels in the comparative example according to an embodiment of the disclosure.

FIG. 65 is a diagram 6500 illustrating comparison with the operation result of pixels in the comparative example according to an embodiment of the disclosure.

Referring to FIGS. 63 to 65, during the operation of the pixels (for example, the pixels 400 of FIG. 4) of the electronic device of the disclosure, when the compensation voltage (Vref) is supplied with 7 V and the data (for example, grayscale data) voltage is supplied with −5 to 7 V, it may be identified that a target current value is maintained as 1.75 uA and thus the luminance of the micro LED (or OLED) is normally controlled. In comparison between the operation result of the pixels 3700 of the electronic device of the disclosure and the operation result of pixels (9TR-2Cap) in the comparative example, it may be identified that while the luminance of the micro LED (or OLED) is normally controlled in the pixels 3700 of the electronic device of the disclosure, the luminance of the micro LED (or OLED) is not normally maintained in the comparative example. As an embodiment, in FIG. 64, reference numeral 6410 indicates a waveform in the case where the data (for example, grayscale data) voltage (Vdata) is −5 V and reference numeral 6420 indicates a waveform in the case where the data (for example, grayscale data) voltage (Vdata) is −7 V.

FIG. 66 is a diagram illustrating a Vth characteristic compensation value of the driving transistor (for example, the third transistor (T3)) when the pixels of the electronic device operate according to an embodiment of the disclosure.

Figure 67:
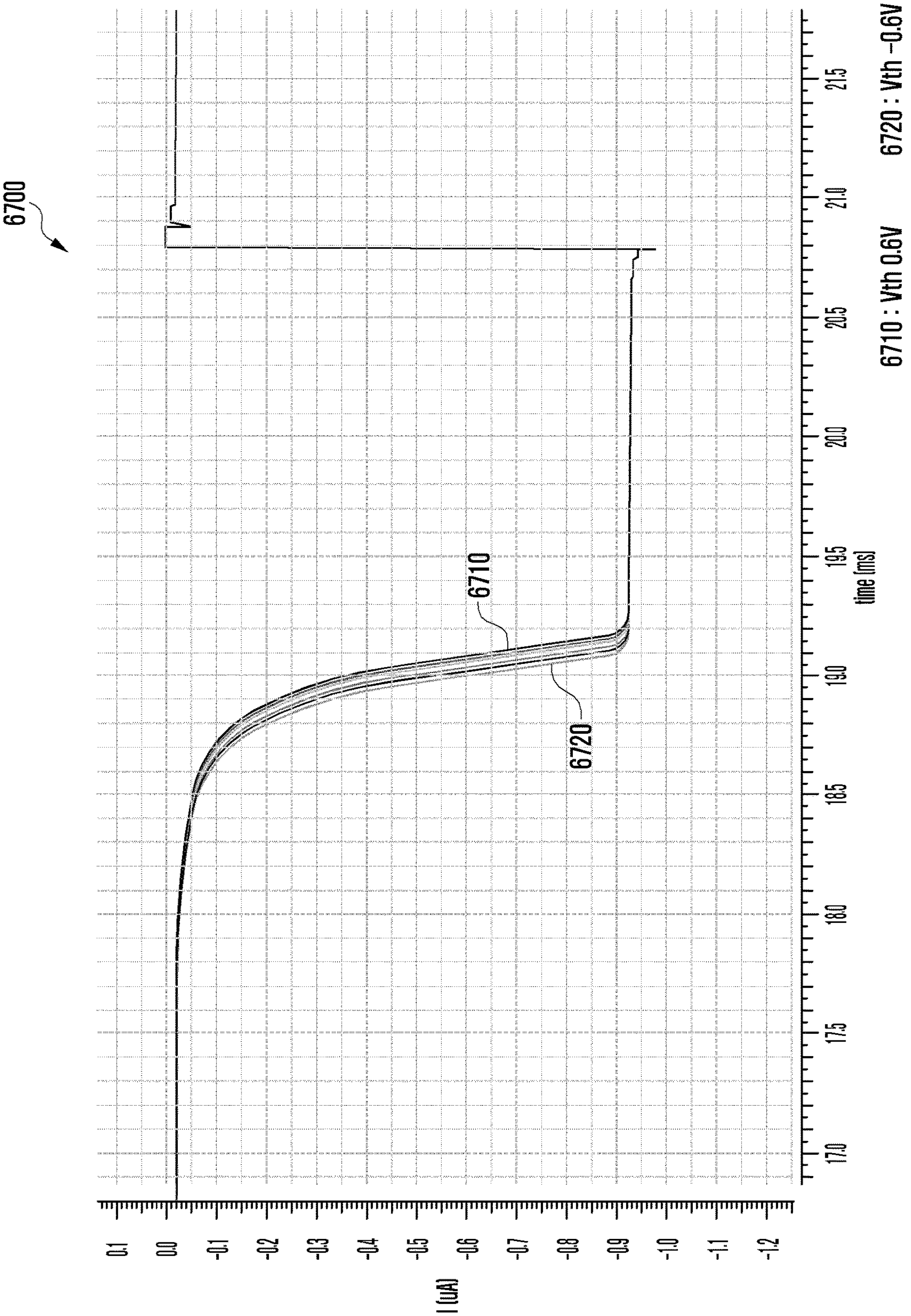
FIG. 67 is a diagram illustrating waveforms of the operation results for Vth characteristic compensation of the driving transistor (for example, the third transistor (T3)) when pixels of the electronic device operate according to an embodiment of the disclosure.

FIG. 67 is a diagram 6700 illustrating waveforms of the operation result for Vth characteristic compensation of the driving transistor (for example, the third transistor (T3)) when the pixels of the electronic device operate according to an embodiment of the disclosure.

FIG. 68 is a diagram illustrating a Vth characteristic compensation value of the driving transistor when the pixels in the comparative example operate according to an embodiment of the disclosure.

Figure 69:
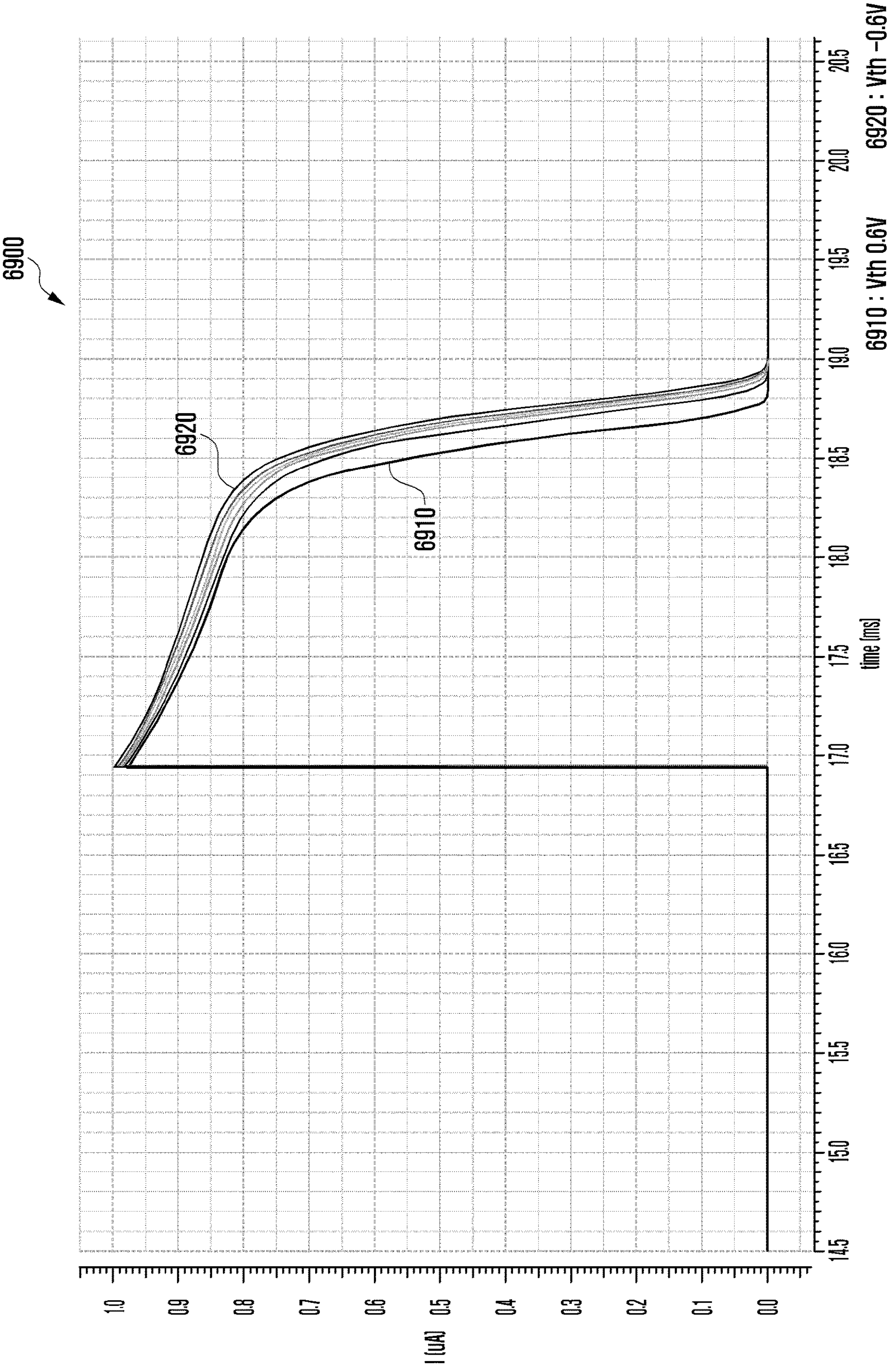
FIG. 69 is a diagram illustrating waveforms of the operation result for Vth characteristic compensation of the driving transistor in the comparative example according to an embodiment of the disclosure.

FIG. 69 is a diagram 6900 illustrating waveforms of the operation result for Vth characteristic compensation of the driving transistor in the comparative example according to an embodiment of the disclosure.

Referring to FIGS. 66 to 69, it may be identified that there is difference in a maximum of Vth deviation equal to or lower than 1.44% as the result of identifying the Vth deviation of the driving transistor (for example, the third transistor (T3)) arranged in the first pixel driving circuit 3720 (for example, the PWM signal block), an average current (I_Avg), and a deviation (del %) when the pixels (for example, the pixels 3700 of FIG. 4) of the electronic device of the disclosure operate. On the other hand, in the comparative example, it may be identified that there is difference in a maximum of Vth deviation corresponding to 18.3% as the result of identifying the Vth deviation of the driving transistor, the average current (I_Avg), and the deviation (del %). As an example, in FIG. 67, reference numeral 6710 indicates a waveform in the case there the Vth deviation of the driving transistor (for example, the third transistor (T3)) is 0.6 V and reference numeral 6720 indicates a waveform in the case where the Vth deviation of the driving transistor (for example, the third transistor (T3)) is −0.6 V. As an example, in FIG. 69, reference numeral 6910 indicates a waveform in the case where the Vth deviation of the driving transistor in the comparative example is 0.6 V, and reference numeral 6920 indicates a waveform in the case where the Vth deviation of the driving transistor in the comparative example is −0.6 V. Accordingly, the Vth deviation of the pixels (for example, the pixels 3700 of FIG. 37) of the electronic device of the disclosure is smaller than that of the pixels in the comparative example, and thus the display quality of the display can be improved.

FIG. 70 is a diagram illustrating a Vth characteristic compensation value of the driving transistor (for example, the sixth transistor (T6)) when the pixels of the electronic device of the electronic device operate according to an embodiment of the disclosure.

Figure 71:
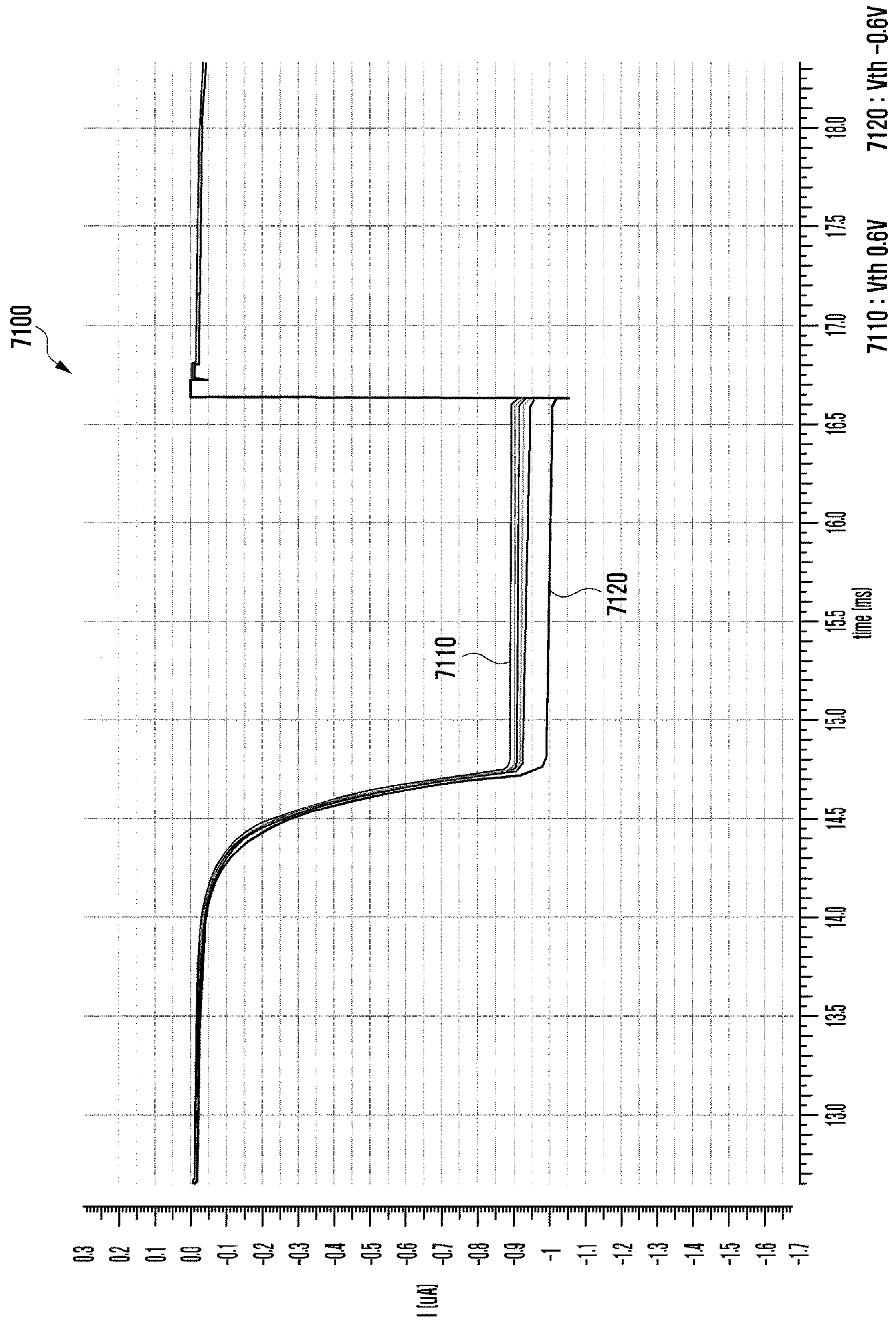
FIG. 71 is a diagram illustrating waveforms of the operation result for Vth characteristic compensation of the driving transistor (for example, the sixth transistor (T6)) when pixels of the electronic device operate according to an embodiment of the disclosure.

FIG. 71 is a diagram 7100 illustrating a waveform of the operation result for Vth characteristic compensation of the driving transistor (for example, the sixth transistor (T6)) when the pixels of the electronic device operate according to an embodiment of the disclosure.

FIG. 72 is a diagram illustrating a Vth characteristic compensation value of the driving transistor when the pixels in the comparative example operate according to an embodiment of the disclosure.

Figure 73:
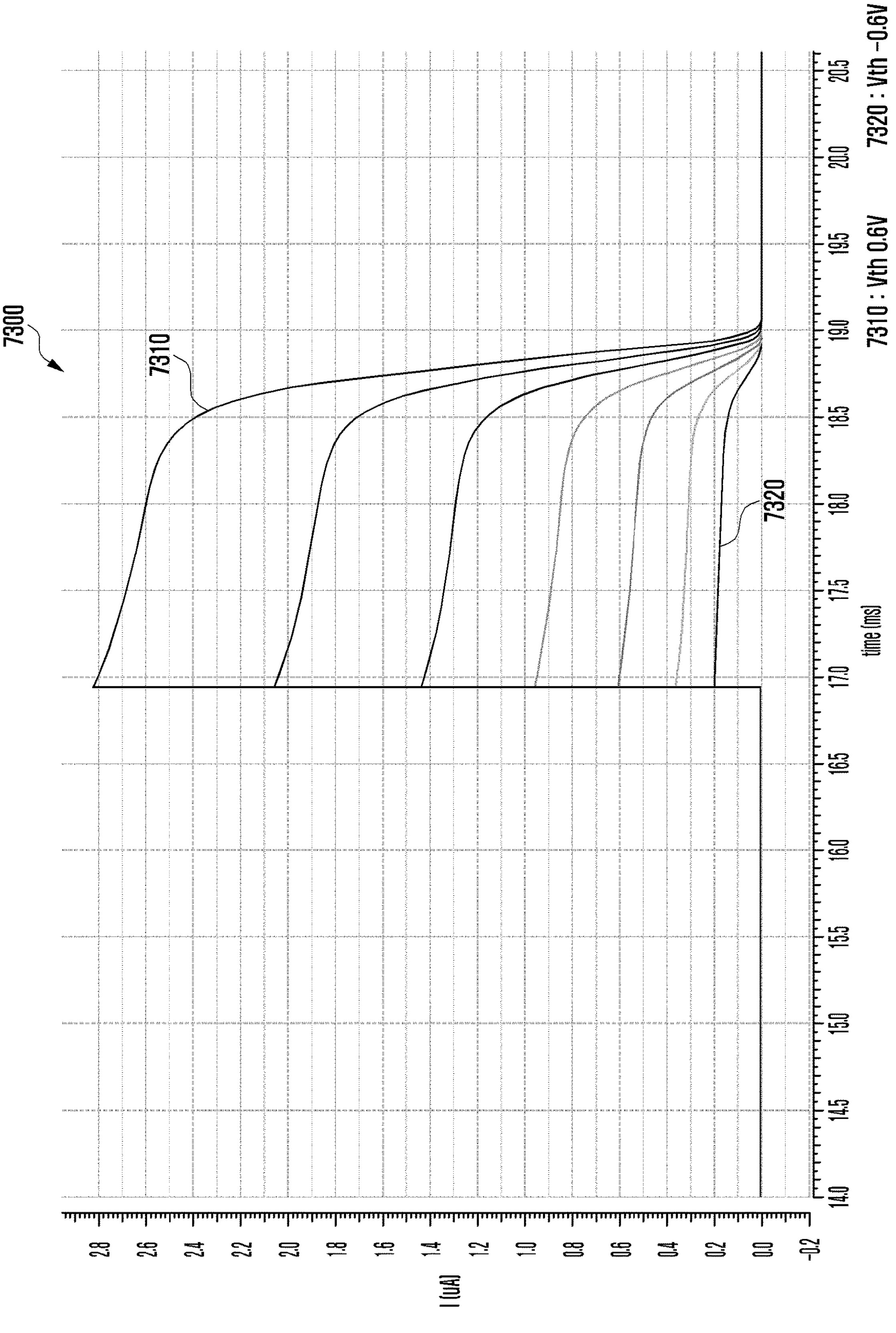
FIG. 73 is a diagram illustrating waveforms of the operation result for Vth characteristic compensation of the driving transistor in the comparative example according to an embodiment of the disclosure.

FIG. 73 is a diagram 7300 illustrating waveforms of the operation result for Vth characteristic compensation of the driving transistor in the comparative example according to an embodiment of the disclosure.

Referring to FIGS. 70 to 73, it may be identified that there is difference in a maximum of Vth deviation equal to or lower than 7.37% as the result of identifying the Vth deviation of the driving transistor (for example, the sixth transistor (T6)) arranged in the second pixel driving circuit 3730 (for example, the CCG block), an average current (I_Avg), and a deviation (del %) when the pixels (for example, the pixels 3700 of FIG. 37) of the electronic device of the disclosure operate. On the other hand, in the comparative example, it may be identified that there is difference in a maximum of Vth deviation corresponding to 80.78% as the result of identifying the Vth deviation of the driving transistor, the average current (I_Avg), and the deviation (del %). As an example, in FIG. 71, reference numeral 7110 indicates a waveform in the case there the Vth deviation of the driving transistor (for example, the sixth transistor (T6)) is 0.6 V and reference numeral 7120 indicates a waveform in the case where the Vth deviation of the driving transistor (for example, the sixth transistor (T6)) is −0.6 V. As an example, in FIG. 73, reference numeral 7310 indicates a waveform in the case where the Vth deviation of the driving transistor in the comparative example is 0.6 V, and reference numeral 7320 indicates a waveform in the case where the Vth deviation of the driving transistor in the comparative example is −0.6 V. Accordingly, the Vth deviation of the pixels (for example, the pixels 400 of FIG. 4) of the electronic device of the disclosure is smaller than that of the pixels in the comparative example, and thus the display quality of the display can be improved.

An electronic device (for example, the electronic device 101 of FIG. 1) according to various embodiments of the disclosure may include a display (for example, the display 210 of FIG. 2) including a plurality of pixels (for example, the plurality of pixels 400 of FIG. 4) including light-emitting diodes (for example, the micro LED 410 of FIG. 4) and pixel driving circuits (for example, the pixel driving circuits 420 and 430 of FIG. 4) for light emission of the light-emitting diodes (for example, the micro LED 410 of FIG. 4), a display driver integrated circuit (DDI) (for example, the display driver IC 230 of FIG. 2) configured to drive the display 210, and a processor (for example, the processor 120 of FIG. 1) operatively connected to the DDI 230, and memory (for example, the memory 130 of FIG. 1) operatively connected to the processor 120, wherein each of the plurality of pixels 400 may include a first pixel driving circuit block (for example, the first pixel driving circuit 420 of FIG. 4) configured to generate a pulse width modulation (PWM) signal for controlling driving timing of the light-emitting diodes (for example, the micro LED 410 of FIG. 4) and a second pixel driving circuit block (for example, the second pixel driving circuit 430 of FIG. 4) configured to control intensity of a current supplied to the light-emitting diodes (for example, the micro LED 410 of FIG. 4), the first pixel driving circuit block (for example, the first pixel driving circuit 420 of FIG. 4) may include a plurality of transistors (for example, T1 to T5 of FIG. 4) and a first capacitor (for example, the first capacitor (C1) of FIG. 4), and the second pixel driving circuit block (for example, the second pixel driving circuit 430 of FIG. 4) may include a plurality of transistors (for example, T6 to T11 of FIG. 4) and a second capacitor (for example, the second capacitor (C2) of FIG. 4).

According to an embodiment, the processor may be configured to control a compensation voltage (Vref) supplied to a source terminal of a driving transistor arranged in the second pixel driving circuit block to be separately input into each of a red pixel, a green pixel, and a blue pixel.

According to an embodiment, the processor may be configured to control a compensation voltage (Vref) supplied to a source terminal of a driving transistor arranged in the second pixel driving circuit block to be input into a red pixel, a green pixel, and a blue pixel in common.

According to an embodiment, the processor may be configured to control a compensation voltage for compensating for a Vth characteristic to be supplied to a source terminal of a driving transistor arranged in the second pixel driving circuit block.

According to an embodiment, the electronic device may include a switching transistor connected to, as a diode connection circuit, a drain terminal and a gate terminal of the driving transistor arranged in the second pixel driving circuit block.

According to an embodiment, the processor may be configured to control an initialization voltage to be supplied to a gate node of a driving transistor arranged in the first pixel driving circuit block and a gate node of the driving transistor arranged in the second pixel driving circuit block.

According to an embodiment, the processor may be configured to control the gate node of the driving transistor arranged in the first pixel driving circuit block and the gate node of the driving transistor arranged in the second pixel driving circuit block to be initialized together.

According to an embodiment, the light-emitting diodes may be located at one place in a light emission path including a second node to which a VSS voltage is supplied from a first node to which a VDD voltage is supplied via the driving transistor arranged in the second pixel driving circuit block.

According to an embodiment, the processor may be configured to initialize the gate node of the driving transistor arranged in the second pixel driving circuit block and control a Vth characteristic compensation operation to be repeatedly performed.

According to an embodiment, the processor may be configured to control Vth characteristic compensation of the driving transistor arranged in the first pixel driving circuit block, and sweep coupling to be repeatedly performed.

According to an embodiment, the processor may be configured to control a voltage stored in the first capacitor to be initialized in units of frames.

According to an embodiment, the processor may be configured to control a voltage value stored in the second capacitor to be initialized in units of duties.

According to an embodiment, the processor may be configured to differently control a number of operations of Vth characteristic compensation of the driving transistor arranged in the first pixel driving circuit block and Vth characteristic compensation of the driving transistor arranged in the second pixel driving circuit block.

According to an embodiment, the processor may be configured to control a Vth characteristic compensation value of the driving transistor arranged in the second pixel driving circuit block to be maintained for a predetermined period.

According to an embodiment, a capacity of the second capacitor may be two times or more larger than a capacity of the first capacitor.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in forms and details may be made therein without departing from the spirit and scope of the disclosure as defined by the appended claims and their equivalents.

What is claimed is:

1. An electronic device comprising:

a display comprising a plurality of pixels comprising light-emitting diodes and pixel driving circuits for light emission of the light-emitting diodes;

a display driver integrated circuit (DDI) configured to drive the display;

memory, comprising one or more storage media, storing instructions; and one or more processors communicatively coupled to the memory and the DDI, wherein each of the plurality of pixels comprises:

a first pixel driving circuit block configured to generate a pulse width modulation (PWM) signal for controlling driving timing of the light-emitting diodes, and a second pixel driving circuit block configured to control an amount of a current supplied to the light-emitting diodes based on the PWM signal, wherein the first pixel driving circuit block comprises a plurality of transistors and a first capacitor, wherein the second pixel driving circuit block comprises a plurality of transistors and a second capacitor, wherein the instructions, when executed by the one or more processors individually or collectively, cause the electronic device to:

control a compensation voltage for compensating for a Vth characteristic to be supplied to a source terminal of a driving transistor arranged in the second pixel driving circuit block, control an initialization voltage to be supplied to a gate node of a driving transistor arranged in the first pixel driving circuit block and a gate node of the driving transistor arranged in the second pixel driving circuit block, control numbers of initializations and a number of operations of Vth characteristic compensation of the driving transistor arranged in the first pixel driving circuit block to be different from numbers of initializations and a number of operations of Vth characteristic compensation of the driving transistor arranged in the second pixel driving circuit block, maintain the compensated Vth characteristic of the driving transistor arranged in the second pixel driving circuit block by configuring a capacity of the second capacitor to be two times or more larger than a capacity of the first capacitor, and prevent voltages at both ends of the second capacitor from floating when the driving transistor remains in an on state during a Vth characteristic compensation operation and an initialization operation of the driving transistor arranged in the second pixel driving circuit block, and wherein a second initialization voltage signal (VINT2) voltage is supplied to one side of the second capacitor during the Vth characteristic compensation operation.

2. The electronic device of claim 1, wherein the instructions, when executed by the one or more processors individually or collectively, further cause the electronic device to control a compensation voltage (Vref) supplied to a source terminal of a driving transistor arranged in the second pixel driving circuit block to be separately input into each of a red pixel, a green pixel, and a blue pixel.

3. The electronic device of claim 1, wherein the instructions, when executed by the one or more processors individually or collectively, further cause the electronic device to control a compensation voltage (Vref) supplied to a source terminal of a driving transistor arranged in the second pixel driving circuit block to be input into a red pixel, a green pixel, and a blue pixel in common.

4. The electronic device of claim 1, further comprising:

a switching transistor connected to, as a diode connection circuit, a drain terminal and a gate terminal of the driving transistor arranged in the second pixel driving circuit block.

5. The electronic device of claim 1, wherein instructions, when executed by the one or more processors individually or collectively, further cause the electronic device to control the gate node of the driving transistor arranged in the first pixel driving circuit block and the gate node of the driving transistor arranged in the second pixel driving circuit block to be initialized together.

6. The electronic device of claim 5, wherein the light-emitting diodes are located at one place in a light emission path comprising a second node to which a VSS voltage is supplied from a first node to which a VDD voltage is supplied via the driving transistor arranged in the second pixel driving circuit block.

7. The electronic device of claim 5, wherein the instructions, when executed by the one or more processors individually or collectively, further cause the electronic device to:

initialize the gate node of the driving transistor arranged in the second pixel driving circuit block in every duty driving, and control a Vth characteristic compensation operation to be repeatedly performed.

8. The electronic device of claim 7, wherein the instructions, when executed by the one or more processors individually or collectively, further cause the electronic device to control Vth characteristic compensation of the driving transistor arranged in the first pixel driving circuit block, and sweep coupling to be repeatedly performed.

9. The electronic device of claim 8, wherein the instructions, when executed by the one or more processors individually or collectively, further cause the electronic device to control a voltage stored in the first capacitor to be initialized in units of frames.

10. The electronic device of claim 8, wherein the instructions, when executed by the one or more processors individually or collectively, further cause the electronic device to control a voltage value stored in the second capacitor to be initialized in units of duties.

11. The electronic device of claim 1, wherein the instructions, when executed by the one or more processors individually or collectively, further cause the electronic device to control a Vth characteristic compensation value of the driving transistor arranged in the second pixel driving circuit block to be maintained for a predetermined period.

* * * * *